US006997036B2

(12) United States Patent  
Kojima et al.

(10) Patent No.: US 6,997,036 B2  
(45) Date of Patent: Feb. 14, 2006

(54) VEHICLE IMPACT TESTING DEVICE

(75) Inventors: Takashi Kojima, Sayama (JP); Makoto Iwazaki, Sayama (JP); Yasuo Odawara, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 48 days.

(21) Appl. No.: 10/482,933

(22) PCT Filed: Jun. 25, 2002

(86) PCT No.: PCT/JP02/06352

§ 371 (c)(1),  
(2), (4) Date: Jan. 5, 2004

(87) PCT Pub. No.: WO03/004985

PCT Pub. Date: Jan. 16, 2003

(65) Prior Publication Data

US 2004/0168503 A1 Sep. 2, 2004

(30) Foreign Application Priority Data

| Jul. 6, 2001 | (JP) | ............................. 2001-206777 |
| Oct. 31, 2001 | (JP) | ............................. 2001-333953 |
| Nov. 26, 2001 | (JP) | ............................. 2001-359885 |
| Nov. 26, 2001 | (JP) | ............................. 2001-359897 |

(51) Int. Cl.  
*G01M 7/00* (2006.01)

(52) U.S. Cl. ............................................. 73/12.09

(58) Field of Classification Search ............... 73/12.01, 73/12.04, 12.07, 12.09, 865.6  
See application file for complete search history.

(56) References Cited

U.S. PATENT DOCUMENTS

| 3,939,691 | A | * | 2/1976 | Stanev et al. ............... 73/12.01 |
| 5,066,150 | A | * | 11/1991 | Babler et al. ............. 400/157.3 |
| 5,608,629 | A | | 3/1997 | Cuddihy et al. ...... 364/423.098 |
| 5,635,624 | A | * | 6/1997 | Cerny ........................ 73/12.01 |
| 6,129,025 | A | * | 10/2000 | Minakami et al. ........ 104/88.01 |
| 6,422,058 | B1 | * | 7/2002 | Myles et al. ................ 73/12.04 |
| 6,604,771 | B1 | * | 8/2003 | Motozawa et al. ......... 296/68.1 |

FOREIGN PATENT DOCUMENTS

| JP | 2006723 | 1/1990 |
| JP | 08145839 | 6/1996 |
| JP | 9133604 | 5/1997 |
| JP | 9236517 | 9/1997 |
| JP | 11118660 | 4/1999 |
| JP | 2001249061 | 9/2001 |
| JP | 2001310732 | 11/2001 |

\* cited by examiner

*Primary Examiner*—Max Noori  
(74) *Attorney, Agent, or Firm*—Standley Law Group LLP

(57) ABSTRACT

A vehicle impact testing device is provided with a towing device for running a test car along a running road surface to collide with a barrier. The towing device is movably suspended from a pair of guide rails received in a recess formed below the running road surface. The towing device is disposed between the guide rails, thereby making effective use of the space between the guide rails. Further, the towing device is disposed at a position below the running road surface, so that it does not interfere with the running of the test car.

24 Claims, 39 Drawing Sheets

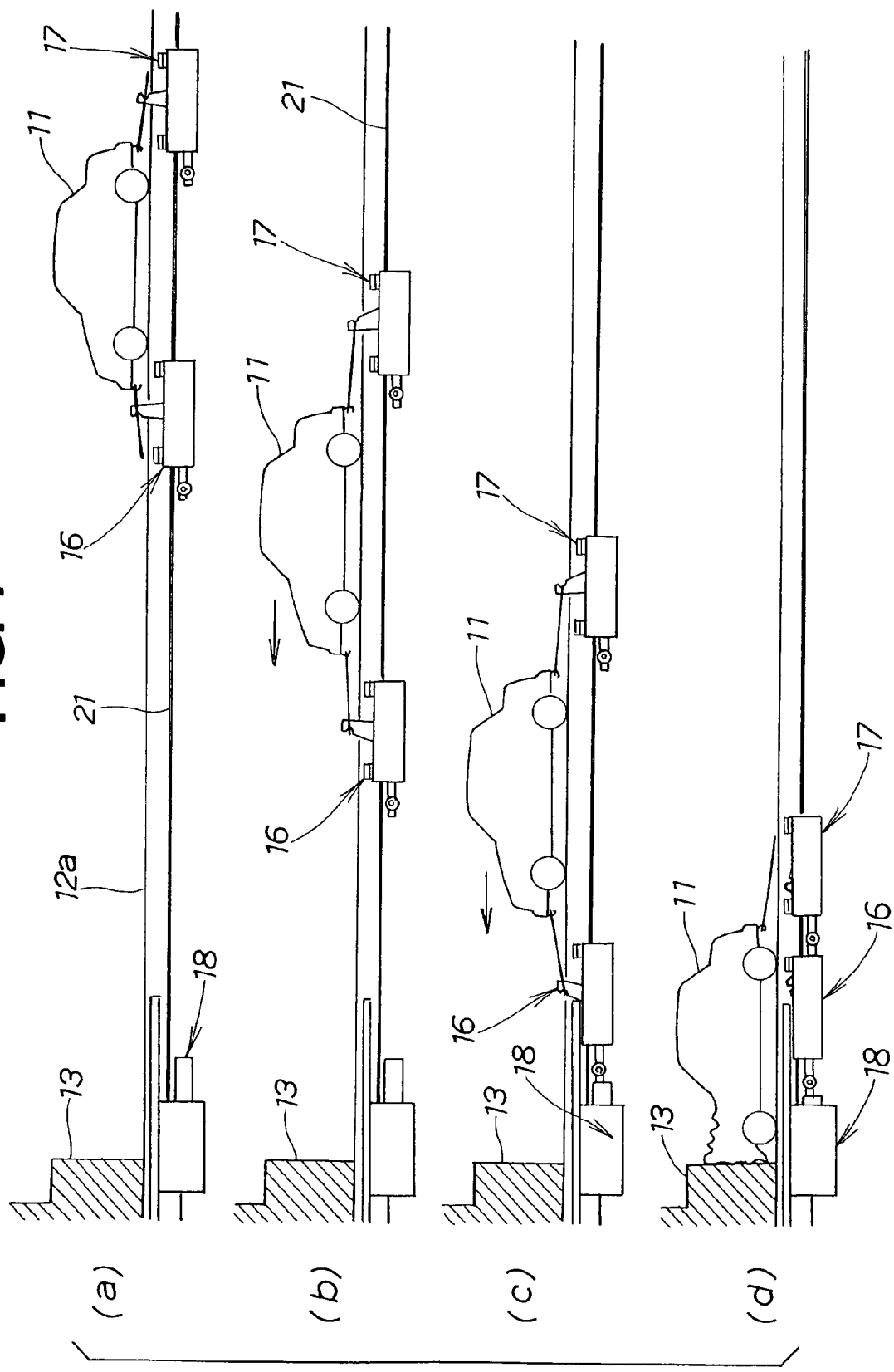

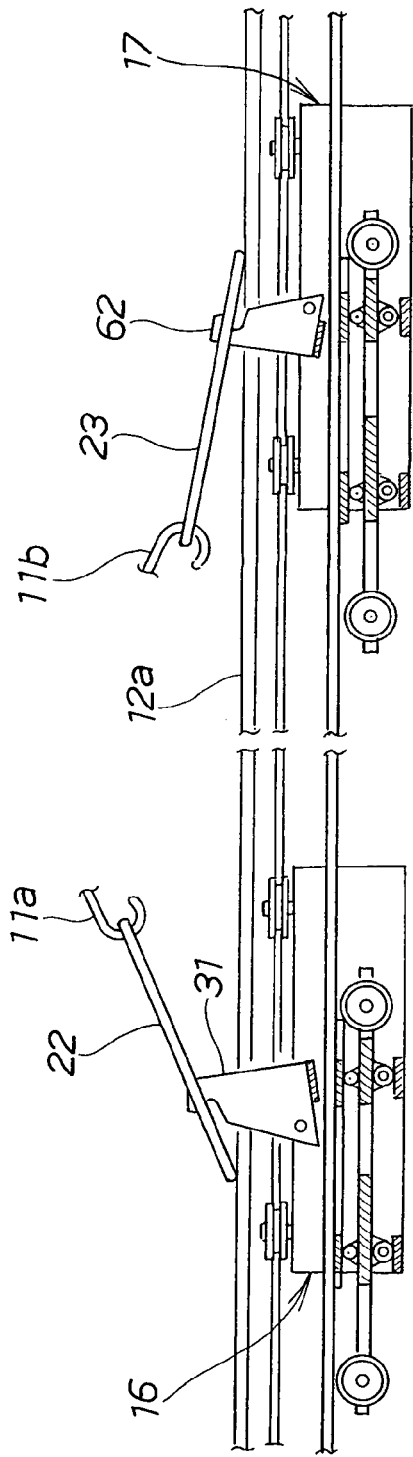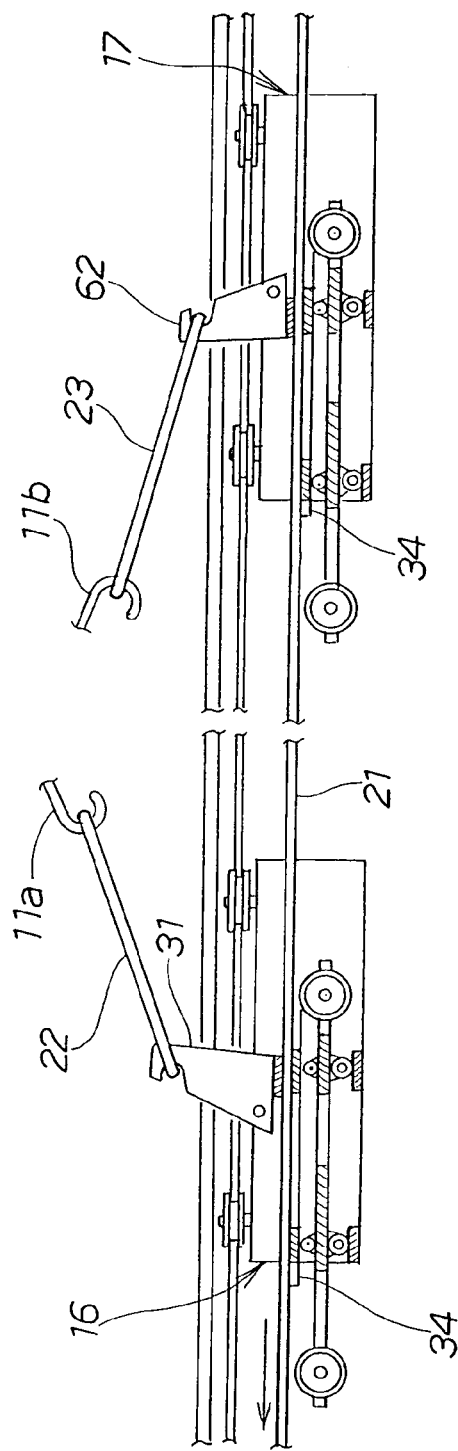

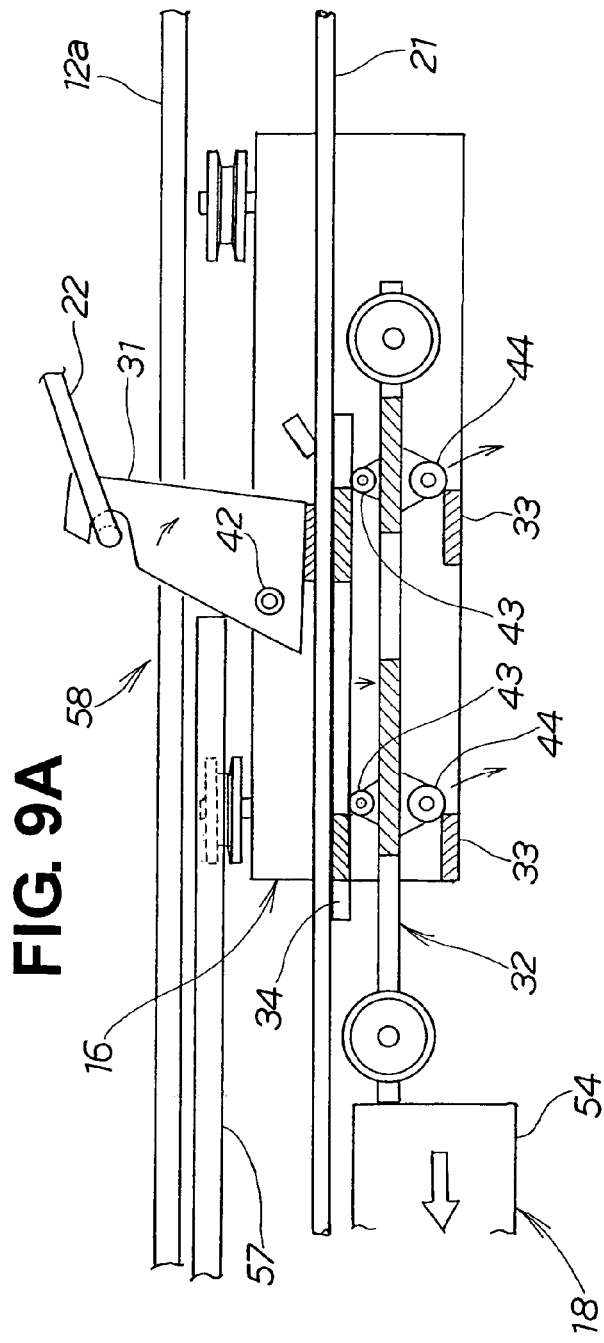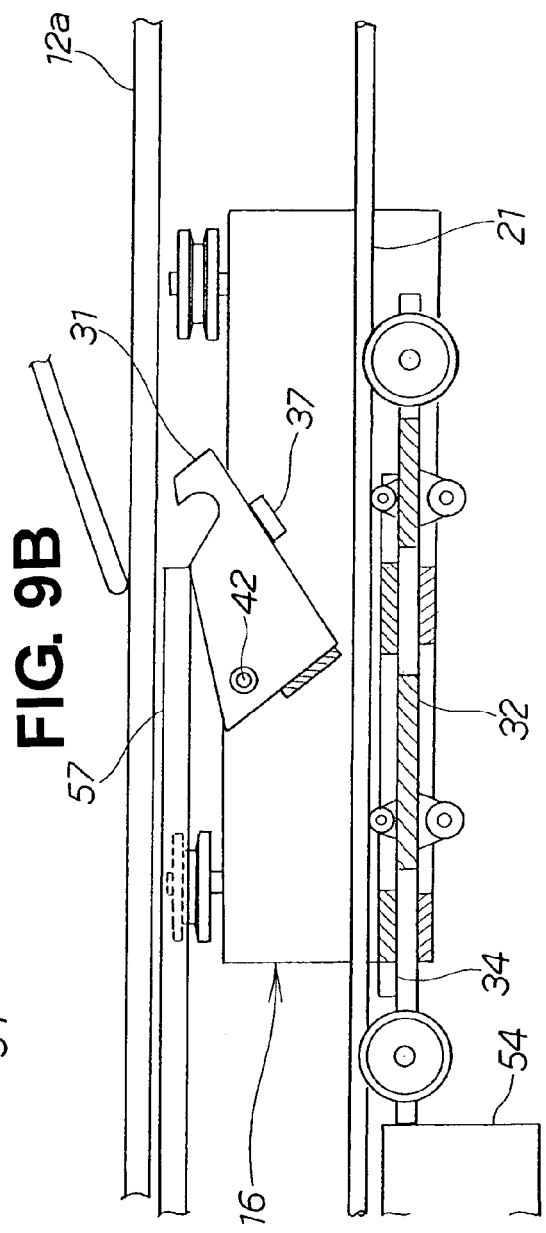

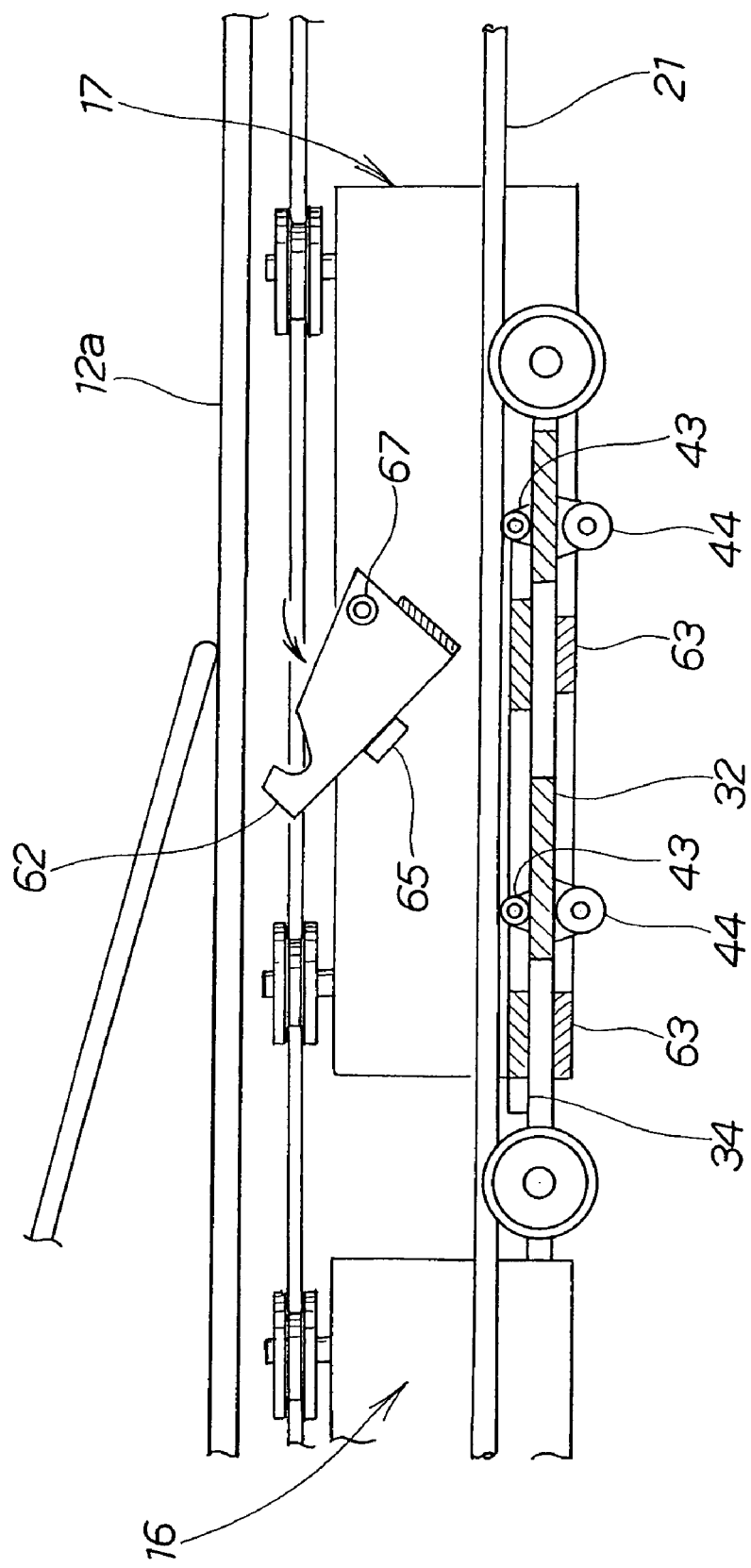

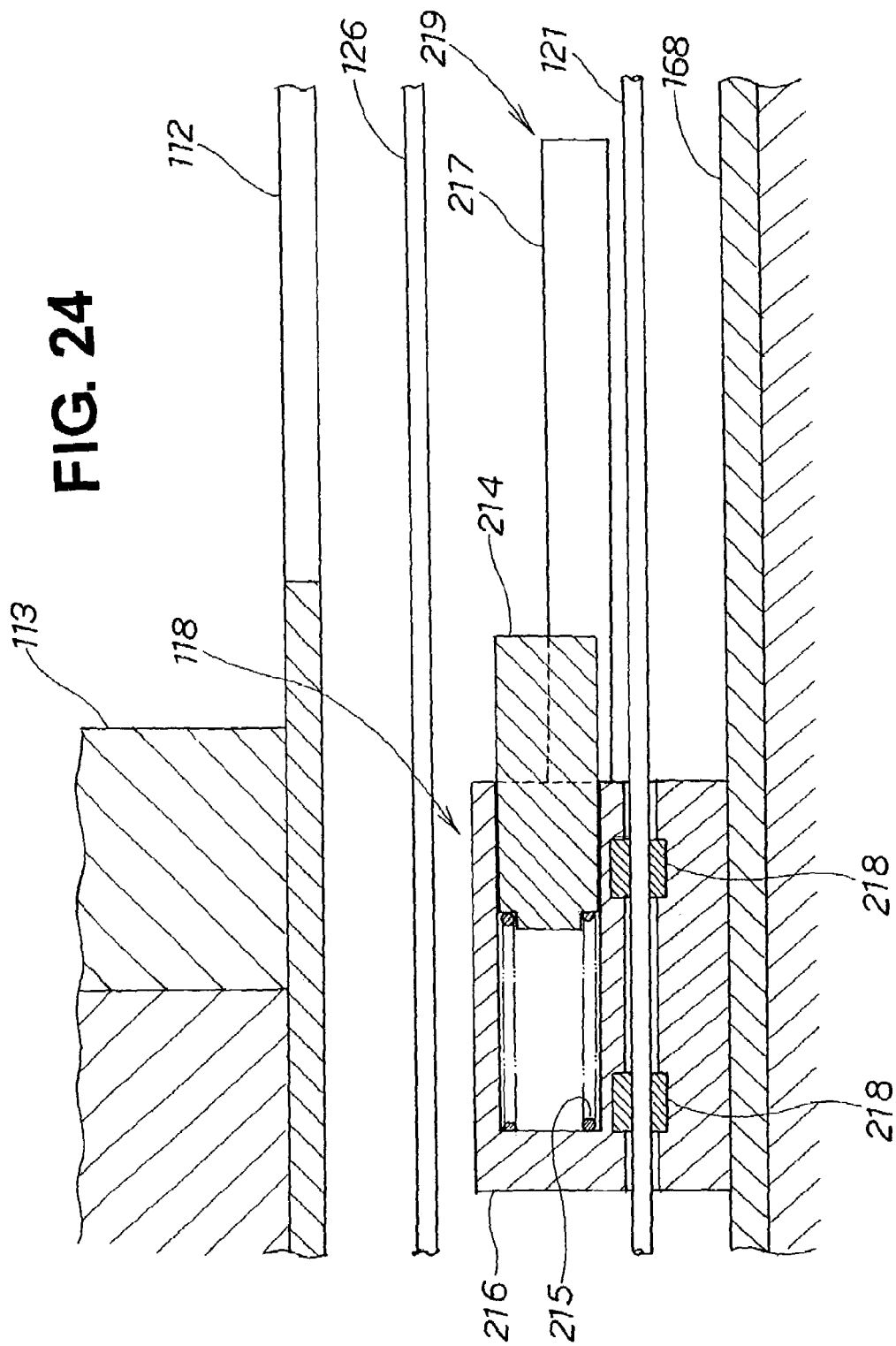

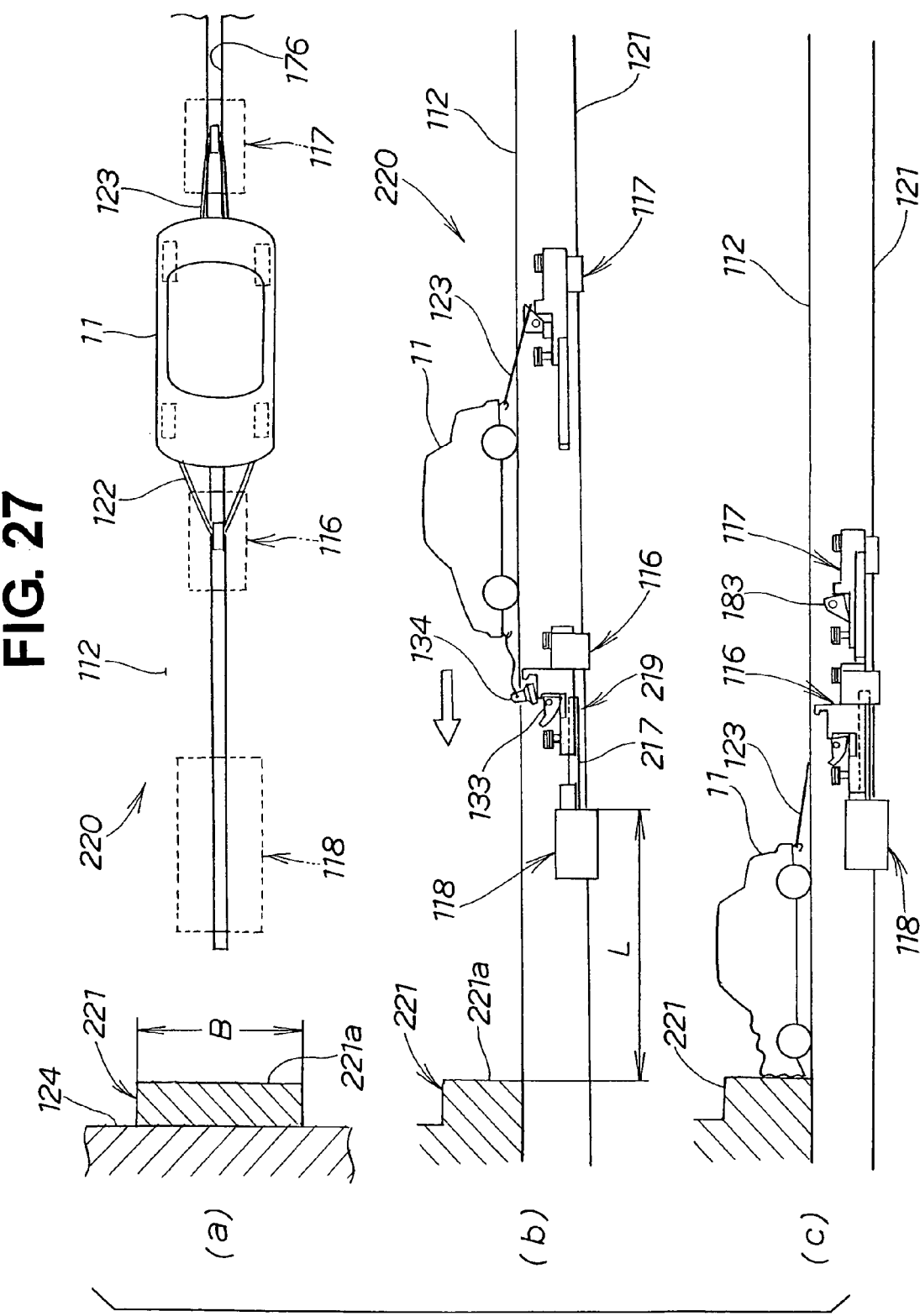

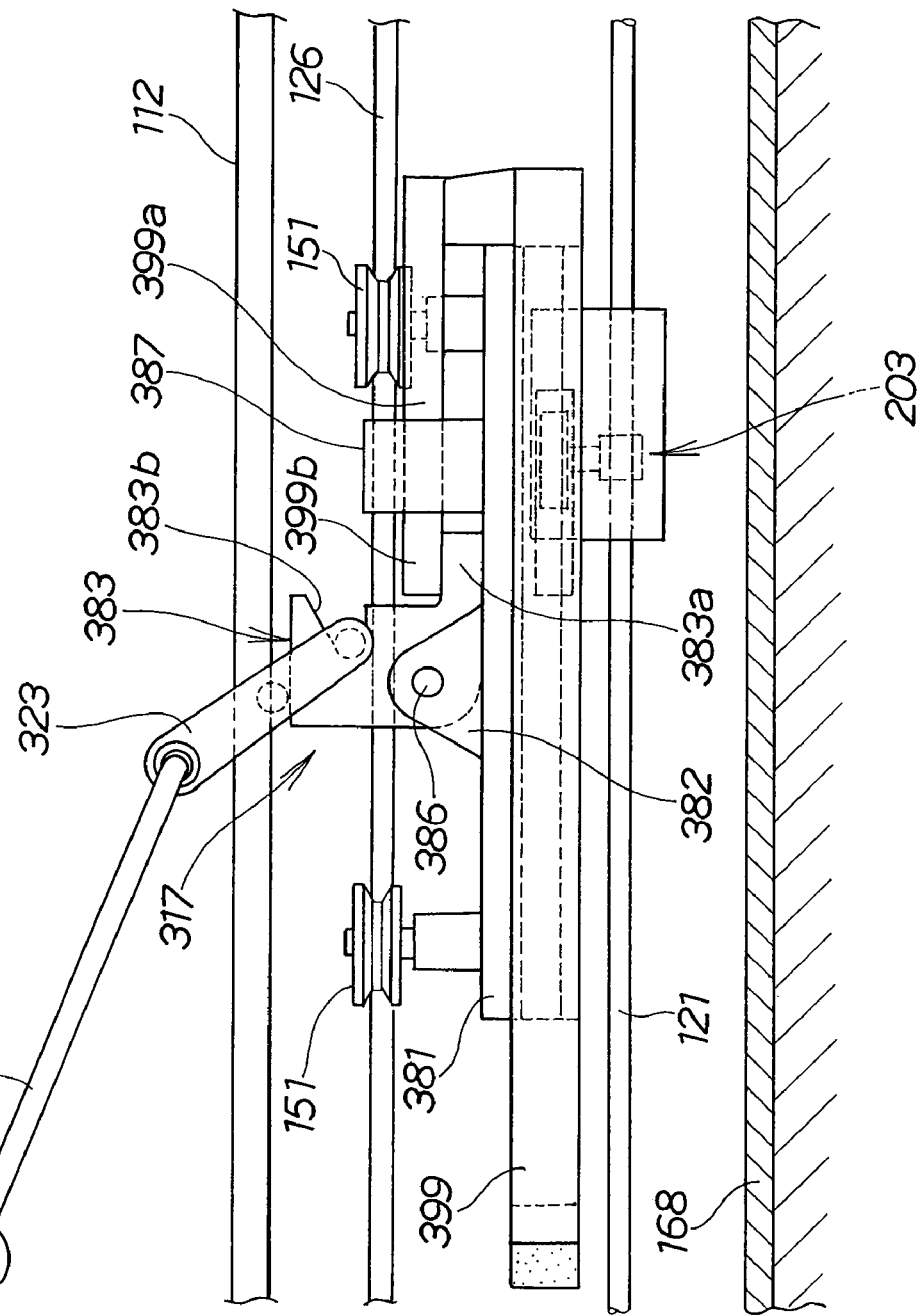

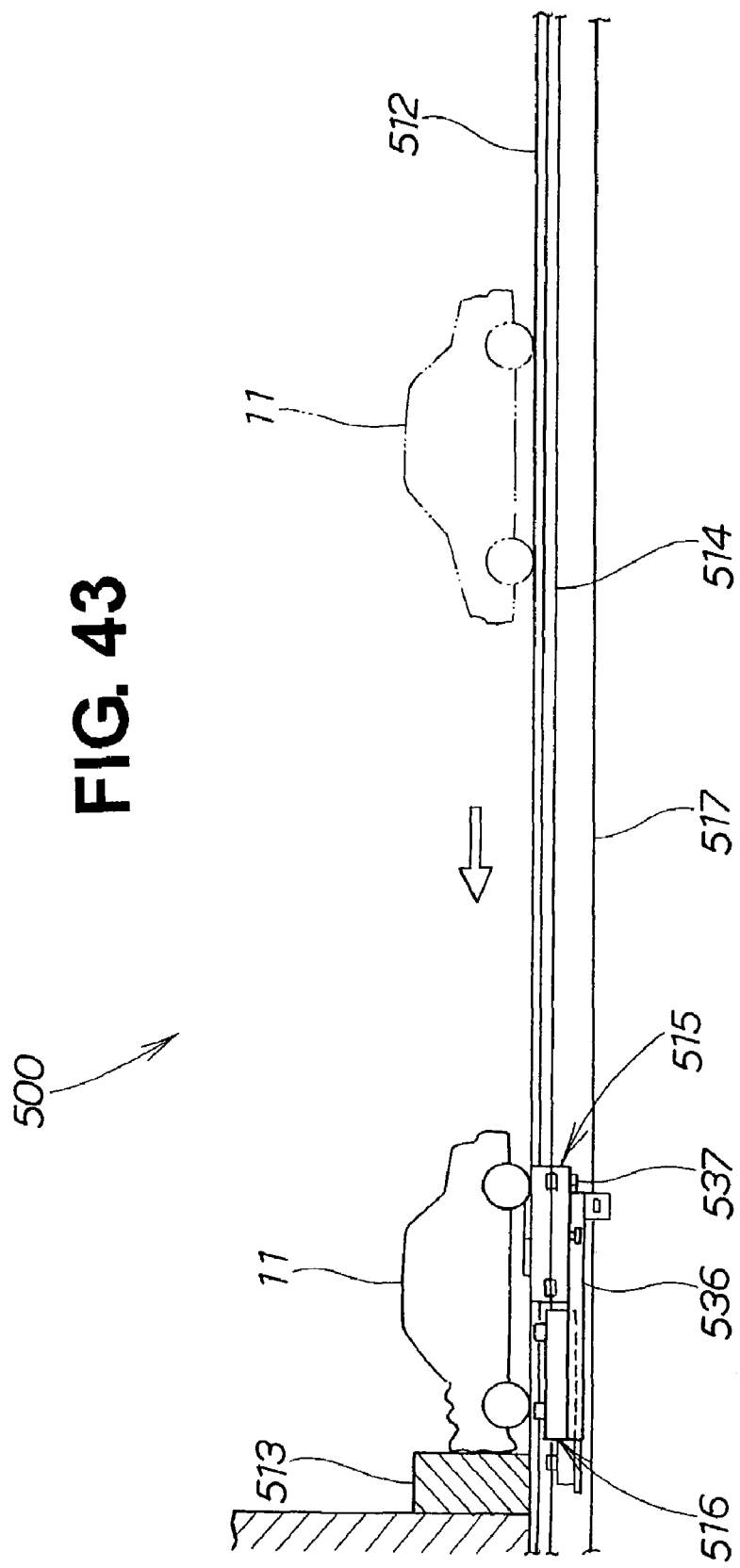

VEHICLE IMPACT TESTING DEVICE

TECHNICAL FIELD

This invention relates to a vehicle crash test apparatus suitable for executing vehicle crash tests with good accuracy.

BACKGROUND ART

Vehicle crash tests are generally carried out as real vehicle tests in which an actual vehicle is caused to crash into a barrier (a fixed wall). A vehicle crash test apparatus for carrying out this kind of test is disclosed for example in JP-A-8-145839, "A Connection Wire Anti-Slip Device in a Vehicle Crash Test Apparatus".

A road surface of this vehicle crash test apparatus has a gutter formed underneath it along the road surface up to in front of an impact barrier, and guide rails are laid in this gutter. A first skater having a connecting part for connecting to it a connecting wire for leading a test vehicle to the impact barrier is fitted movably to the guide rail. A second skater connected to the first skater and having a wire towing rope attached to it is also fitted movably to the guide rail in the same way. A damper which can be connected to the wire towing rope is mounted on the second skater. The first skater is connected to the damper by a connecting belt, and a striker for the first skater and the second skater to hit is provided at the impact barrier end of the guide rail. Also, the damper has a moving gripper and a fixed gripper for gripping the wire towing rope. A second rod part for actuating a trigger lever for releasing the connecting part for connecting the connecting wire connected to the first skater is provided projecting from a main body of the striker which the damper hits.

In this test apparatus, the first skater, the second skater and the striker all project above the test vehicle road surface. For example in an offset crash test, in which the test vehicle is caused to crash into the impact barrier while offset to the right or left with respect to its forward direction, to reduce offset error of the test vehicle with respect to the reference offset amount it is necessary for the test vehicle to be brought as close as possible to the impact barrier with the first skater before it is caused to crash. And it has happened that immediately after the impact the test vehicle hits the first skater, the second skater or the striker, or, because the width of the gutter in the test vehicle road surface is large, a wheel of the test vehicle slips into the gutter after the impact, and the crash test is not carried out precisely, and time and effort is needed to carry out the test again. Because of this, an improvement to a crash test apparatus for executing crash tests with good accuracy has been awaited.

Also, when the trigger lever of the first skater hits the second rod part projecting from the main body of the striker, the connecting wire pulling the test vehicle comes off. As a result, the tension in the connecting belt connecting the damper and the first skater decreases and the moving gripper of the damper turns about a pin under the shock of the impact with the striker. Then, the gripping of the wire towing rope by the moving gripper and the fixed gripper is released; however, when the tension of the connecting belt does not decrease, it becomes difficult for the moving gripper to turn, the gripping of the wire towing rope is not released smoothly, a delay arises in the release of the gripping, and the shock to the striker becomes excessive. Also, because the first skater and the damper are separate and the number of parts is large, the cost of the apparatus itself is high, and there has been a need to reduce the number of parts and achieve a reduction in cost.

DISCLOSURE OF THE INVENTION

According to an aspect of the present invention, the is provided a vehicle crash test apparatus which comprises: a road surface for a test vehicle to travel on; a barrier disposed at one end of the road surface; a left-right pair of guide rails provided in the length direction in the proximity of the road surface; and a towing device suspended movably between the left and right guide rails to lead a test vehicle on the road surface to the barrier, so that the test vehicle is pulled to the proximity of the barrier using the towing device, and partway through the pulling the test vehicle is disconnected from the towing device and the test vehicle is caused to collide with the barrier.

By virtue of the towing device for pulling the test vehicle, disposed between the guide rails, the space between the guide rails can be used effectively.

In a preferred form of the invention, the towing device includes: a main tractor part mounted movably on the left and right guide rails; a hook swingably attached to the main tractor part for hooking a wire for connecting it to the test vehicle; a slide member attached movably through a fixed distance to the main tractor part; and a slide member holding part provided on the main tractor part to hold the slide member in a high position, and a cable drawn toward the barrier to move the towing device toward the barrier is sandwiched by the slide member set on the slide member holding part and the hook, and by the slide member being moved dropped from the slide member holding part the connection of the hook and the wire is released and the connection of the towing device and the cable is released. Because the towing device has mechanisms for releasing both the connection between the hook and the wire and the connection between the towing device and the cable like this, compared to when the respective releasing mechanisms are provided separately the number of parts can be reduced and the cost of the test apparatus can be reduced.

In another aspect of the present invention, there is provided a vehicle crash test apparatus which comprises: a road surface for a test vehicle to travel on; a barrier disposed at one end of the road surface; a towing device disposed below the road surface; a guide rail disposed below the road surface, for guiding the towing device to the barrier; and a braking device disposed below the road surface, for stopping the towing device, such that the test vehicle is pulled to the proximity of the barrier using the towing device, and when the test vehicle is disconnected from the towing device at a position a predetermined distance in front of the barrier to cause the test vehicle to collide with the barrier, the towing device is stopped with the braking device.

With the towing device, the guide rail and the braking device thus disposed below the road surface, travel of the test vehicle is not obstructed, and crash testing of the test vehicle can be carried out with good accuracy.

The towing device may have a test vehicle connecting hook with a width set smaller than the width of the guide rail. For example, when a gap for the hook to move along is provided in the road on which the test vehicle travels, this gap can be made small, and the wheels of the crashed test vehicle can be prevented from slipping into the gap.

Preferably, the road surface has a channel formed to receive at least the towing device, the guide rail and the braking device, and the upper opening of the channel is covered with a removable cover except for at least a part along which the hook moves. By removing the cover, maintenance of the towing device, the guide rail and the braking device inside the channel can be carried out easily.

In a further aspect of the present invention, there is provided a vehicle crash test apparatus which comprises: a road surface for a test vehicle to travel on; a barrier disposed at one end of the road surface; a towing device for pulling the test vehicle; a hook provided on the towing device so that it projects above the road surface, to connect the towing device and the test vehicle; and a hook projection clearing device for clearing the projecting state of the hook when the towing device has reached a position a predetermined distance in front of the barrier, such that the test vehicle is pulled to the proximity of the barrier using the towing device, and part-way through this pulling the test vehicle is disconnected from the towing device and so caused to collide with the barrier.

By providing the hook projection clearing device on the test vehicle, when the towing device has reached a position a predetermined distance in front of the barrier, the hook ceases to project from the road surface, travel of the test vehicle is not obstructed, and the accuracy of the crash testing of test vehicles can be improved.

Preferably, the hook projection clearing device is made up of the hook swingably attached to the towing device and a hook tipping member for tipping the hook to below the road surface when the towing device has reached a position a predetermined distance in front of the barrier. That is, when the towing device has reached a position a predetermined distance in front of the barrier, the hook can be tipped to below the road surface with the hook tipping member, and when the test vehicle hits the barrier, and after it hits the barrier, there are no members projecting from the road surface. Consequently, there is no obstructing of the travel of the test vehicle, and crash testing of test vehicles can be carried out more accurately.

Preferably, a braking device for stopping the towing device has the hook tipping member. When the test vehicle has reached a position a predetermined distance in front of the barrier, the hook can be tipped to below the road surface with the hook tipping member, there is no obstructing of the travel of the test vehicle, and crash testing of test vehicles can be carried out more accurately.

In a still further aspect of the present invention, there is provided a vehicle crash test apparatus which comprises: a road surface for a test vehicle to travel on; a barrier disposed at one end of the road surface; a towing device which pulls the test vehicle to the proximity of the barrier and is disconnected from the test vehicle at a position a predetermined distance in front of the barrier; and a braking device for stopping the towing device, the towing device having a wire connecting member for connecting to it a towing wire for connecting it to the test vehicle, and a holding member for detachably holding an engaging part provided on the wire connecting member, the towing device and the braking device having a release mechanism for releasing the holding of the wire connecting member by the holding member.

With the engaging part of the wire connecting member detachably held to the towing device, when the towing device has reached a position a predetermined distance in front of the barrier, if the holding of the engaging member by the wire connecting member is released, the wire connecting member can be detached from the towing device. As a result, there cease to be any projections above the road surface when the test vehicle hits the barrier and after the impact, and crash testing of test vehicles can be carried out more accurately, without the travel of the test vehicle being obstructed.

It is preferred that the holding member has a claw-shaped member swingably attached to a base part of the towing device, and the claw-shaped member is engagable with the engaging part. By thus swinging the claw-shaped member, it is possible to detach the wire connecting member easily.

Preferably, the release mechanism is constructed so that a swing limiting member for limiting the swing of the claw-shaped member is removably insertable into the swing range of the claw-shaped member. With the simple construction of providing a swing limiting member so that it is removably insertable into the swing range of the claw-shaped member, the holding of the wire connecting member can be released.

Desirably, the holding member is engagable with the engaging part by being removably insertable into the base part of the towing device and the engaging part. When the holding member is made engagable with the engaging part by being made removably insertable into the engaging part like this, the holding member can be made a simple structure and the cost of the holding member can be kept down.

In a preferred form, the towing device has a cable connecting member for connecting it to a cable for conveying it from the test vehicle side to the barrier side, and a cable connection releasing mechanism for releasing the connection to the cable effected by the cable connecting member. The towing device connected to the cable and moved can be disconnected from the cable in the proximity of the barrier and the movement of the towing device can be stopped, and preparation for the next crash test can be carried out.

In a still further aspect of the present invention, there is provided a vehicle crash test apparatus which comprises: a road surface for a test vehicle to travel on; a barrier disposed at one end of the road surface; a towing device which pulls the test vehicle to the proximity of the barrier and is disconnected from the test vehicle at a position a predetermined distance in front of the barrier; and a braking device for stopping the towing device, the towing device comprising: a swingable wire engaging member for engaging with one end of a towing wire for connecting it to the test vehicle; and a slide member having an integral part for engaging and disengaging with respect to an engaging part formed on the wire engaging member so that by the slide member sliding rearward, its engagement with the engaging part is released, and the connection between the test vehicle and the towing device is released.

Because the engagement of the wire engaging member and the engaging part formed integrally with the slide member is thus released just by sliding the slide member rearward, the construction is simple and the cost of the test apparatus is lower.

Preferably, the towing device is disposed so that the top face of the wire engaging member is in a position below the road surface. The wire engaging member, which consists of a hook on the towing device, does not project from the road surface at all, and there is no hindering of the travel of the test vehicle.

In a still further aspect of the present invention, there is provided a vehicle crash test apparatus which comprises: a road surface for a test vehicle to travel on; a barrier disposed at one end of the road surface; a towing device which pulls the test vehicle to the proximity of the barrier and is disconnected from the test vehicle at a position a predetermined distance in front of the barrier; and a braking device for stopping the towing device, the towing device having a wire connecting member for connecting it to a wire connected to the test vehicle for towing, a holding member for detachably holding the wire connecting member to the towing device, and a cable connecting member for connecting the towing device to a cable for conveying it from the test vehicle side to the barrier side, the braking device having a release action starting member for causing both releasing of the holding of the wire connecting member by the holding member and releasing of the connection of the towing device to the cable effected by the cable connecting member.

By thus providing the release action starting member on the braking device, when the towing device is stopped with the braking device, the connection of the towing device to the cable can be surely released with the release action starting member. Also, with one release action starting member, both the releasing of the holding of the wire connecting member by the holding member and the releasing of the connection of the towing device to the cable effected by the cable connecting member can be carried out. Thus, compared to an apparatus wherein the above-mentioned holding release and connection release are carried out with separate release action starting members, the number of parts can be reduced and the cost of the vehicle crash test apparatus can be cut.

In a still further aspect of the present invention, there is provided a vehicle crash test apparatus which comprises: a road surface for a test vehicle to travel on; a barrier disposed at one end of the road surface; a towing device for pulling the test vehicle to the proximity of the barrier; a guide rail for guiding the towing device movably with respect to the barrier; a connection releasing member for disconnecting the test vehicle from the towing device at a position a predetermined distance in front of the barrier; and a braking device for stopping the towing device, the braking device and the connection releasing member being installed integrally, the braking device and the connection releasing member being movably attached to the guide rail.

In this arrangement, with the braking device and the connection releasing member movably attached to the guide rail, it becomes possible to set the braking device and the connection releasing member to a desired position easily and swiftly, thereby enabling handling of various crash test conditions.

Preferably, the towing device includes: a cable connecting member for connecting the towing device to a cable for conveying it from the test vehicle side in the direction of the barrier side; and a cable connection releasing mechanism for releasing the connection of the tractor means to the cable effected by the cable connecting member, such that the connection releasing member provided on the braking device causes the cable connection releasing mechanism to operate, the cable connection releasing mechanism releases the connection of the towing device from the cable, and after the towing device has stopped, the braking device and the towing device are movable in an integral state. In this arrangement, if the connection of the braking device to the cable is released and the towing device is stopped, the braking device and the towing device can be moved integrally, and the work of moving the braking device and the towing device to a desired position can be simplified.

It is desirable that the connection releasing member is provided in a cantilever style so as to project in the direction of the traction device from the braking device, and a weight for balancing the weight of the connection releasing member is provided on the barrier side of the braking device. That is, when with the connection releasing member the towing device is uncoupled from the test vehicle and the cable connection releasing mechanism is operated, the connection releasing member is prevented from vibrating and rattling by the weight.

In a still further aspect of the present invention, there is provided a vehicle crash test apparatus which comprises: a road surface for a test vehicle to travel on; a barrier disposed at one end of the road surface; a towing device for pulling the test vehicle to the proximity of the barrier and then causing the test vehicle to collide with the barrier; and an auxiliary towing device, connectable by a wire to the rear of the test vehicle, for stabilizing the travel of the test vehicle by pulling it rearward by way of the wire, the auxiliary towing device comprising: a wire engaging member, in which is formed a wire catching part having an open space opening to the rear for freeing the wire to the rear, swingable toward the barrier; a swing limiting member for limiting the swing of the wire engaging member; and a limit removing mechanism for removing the limit imposed by the swing limiting member.

Because the wire engaging member has a wire catching part for freeing the wire to the rear, and is swingable to the barrier side, in carrying out an offset crash test of a test vehicle, when at a position near the barrier the connection of the towing device and the test vehicle is released, even if the auxiliary towing device moves further to the barrier side than the test vehicle when the test vehicle crashes, the wire can be easily detached rearwardly from the wire engaging member. Also, in carrying out a head-on crash test of a test vehicle, when the test vehicle is freed from the auxiliary towing device at a position further from the barrier than in an offset crash test, even if the test vehicle moves further to the barrier side than the auxiliary towing device when the test vehicle crashes, the wire engaging member swings to the barrier side and the wire can be easily detached from the wire engaging member. The auxiliary towing device can thus handle both offset collisions and head-on collisions.

Desirably, the swing limiting member is removably insertable into the swing range of the wire engaging member. Thus, swing limiting of the wire engaging member and releasing thereof can be carried out with a simple construction.

Preferably, the auxiliary towing device further includes a cable connecting member for connecting it to a cable for conveying it from the test vehicle side in the direction of the barrier side, and a cable connection releasing mechanism for releasing the connection to the cable effected by the cable connecting member. The auxiliary towing device connected to the cable by the cable connecting member and movable can be disconnected from the cable in the proximity of the barrier by the cable connection releasing mechanism. Consequently, the auxiliary towing device can be moved to a desired position with respect to the cable, and preparation for the next crash test can be carried out.

In a still further aspect of the present invention, three is provided a vehicle crash test apparatus which comprises: a road surface for a test vehicle to travel on; a barrier disposed at one end of the road surface; a cable for conveying the test vehicle toward the barrier; a towing device connected to the cable for pulling the test vehicle to the proximity of the barrier and then causing the test vehicle to collide with the barrier; and an auxiliary towing device connected to the cable and connectable by a wire to the rear of the test vehicle, the auxiliary towing device comprising: a wire engaging member having an wire catching part for catching the wire; a wire connection releasing device for releasing the catching of the wire engaging member and the wire; a cable connecting device for connecting it to the cable; a cable connection releasing device for releasing the connection to the cable effected by the cable connecting device; and a release action starting device for causing the wire connection releasing and cable connection releasing actions to be carried out in succession.

Accordingly, in the test apparatus thus arranged, the catching and the releasing of the catching of the wire engaging member and the connection and the releasing of the connection of the cable can be carried out with one auxiliary towing device, and compared to an apparatus in which these are carried out separately, the number of parts can be reduced and the cost of the vehicle crash test apparatus can be lowered.

Desirably, the release action starting device includes a slide member front-rear slidably attached to guide parts provided on both side faces of a base part of the auxiliary towing device, and has on the rear end of the slide member a release part for actuating the wire connection releasing mechanism and the cable connection releasing device. By this means, the release operation starting device can be made a simple structure and its cost can be lowered.

Preferably, after the release action starting device has operated, the auxiliary towing device is movable along a left-right pair of guide rails provided below the road surface. When the auxiliary towing device is made movable along guide rails like this, the auxiliary towing device can be made to stand by in its original position for the next crash test.

BRIEF DESCRIPTION OF THE DRAWINGS

FIG. 7 is a view showing the course of a test vehicle from being at rest to hitting the barrier, in the vehicle crash test apparatus of the first embodiment of the invention;

FIG. 8A and FIG. 8B are views showing a towing wire and an auxiliary towing wire detached from and hooked upon the towing device and the auxiliary towing device of the first embodiment;

FIG. 9A and FIG. 9B show the towing wire and the towing device of the first embodiment from a hooked state to a detached state;

FIG. 10 is a view showing the auxiliary towing device of the first embodiment detached from the auxiliary towing wire;

FIG. 24 is a sectional view showing in detail a braking device shown in FIG. 12;

FIG. 27 is a view showing the course of a test vehicle from being at rest to crashing, and is another embodiment with respect to the vehicle crash test apparatus of the second embodiment of the invention;

FIG. 30 is a sectional view showing a further embodiment of the auxiliary towing device of the second embodiment;

FIG. 43 is a view showing a test vehicle having hit a barrier in the vehicle crash test apparatus according to the third embodiment of the invention.

BEST MODE FOR CARRYING OUT THE INVENTION

A number of preferred embodiments of the invention will now be described, on the basis of the accompanying drawings. FIG. 1 through FIG. 11 show a vehicle crash test apparatus of a first embodiment of the invention.

Figure 1:
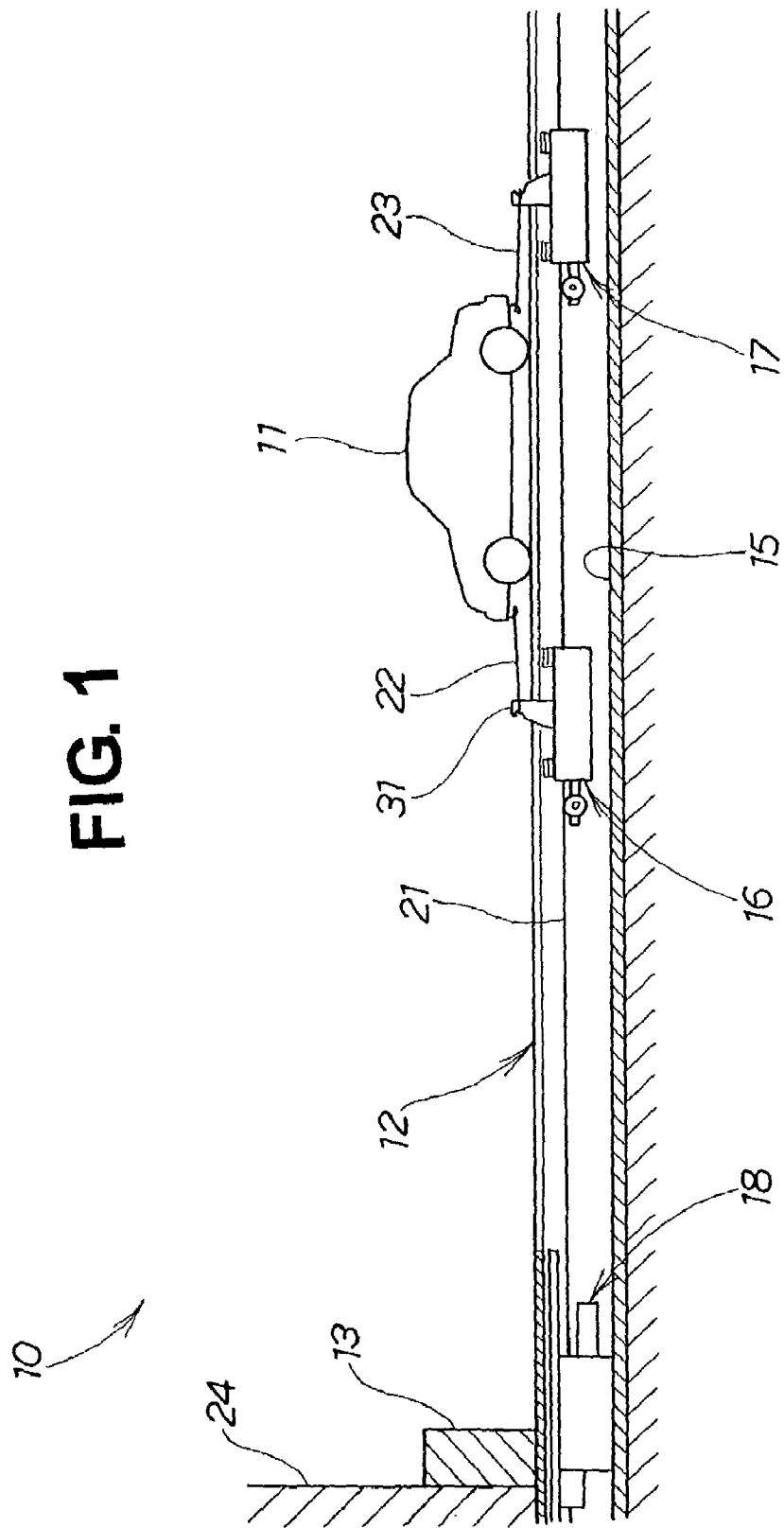
FIG. 1 is a schematic view of a vehicle crash test apparatus of a first embodiment of the invention.

Referring to FIG. 1, the vehicle crash test apparatus 10 of this first embodiment has a road surface 12 on which travels a vehicle 11 serving as a test vehicle. At one end of this road surface 12 there is a barrier 13. A channel 15 is provided below the road surface 12. A towing device 16 for pulling the vehicle 11 is mounted movably in the channel 15. An auxiliary towing device 17 for applying a tensile force to the rear of the vehicle 11 to raise the straightness of travel of the vehicle 11 is also mounted movably in the channel 15. To stop the towing device 16 and the auxiliary towing device 17, a braking device 18 is provided in the channel 15 roughly below the barrier 13. To move the towing device 16 and the auxiliary towing device 17 toward the barrier 13, a cable 21 which can be wound in by a winding device (not shown) is provided.

A towing wire 22 connects the vehicle 11 and the towing device 16. An auxiliary towing wire 23 connects the vehicle 11 and the auxiliary towing device 17. As the towing wire 22 and the auxiliary towing wire 23, for example a Kevlar rope or a resin chain is suitable. The barrier 13 is fixed by a fixed wall 24.

Figure 2:
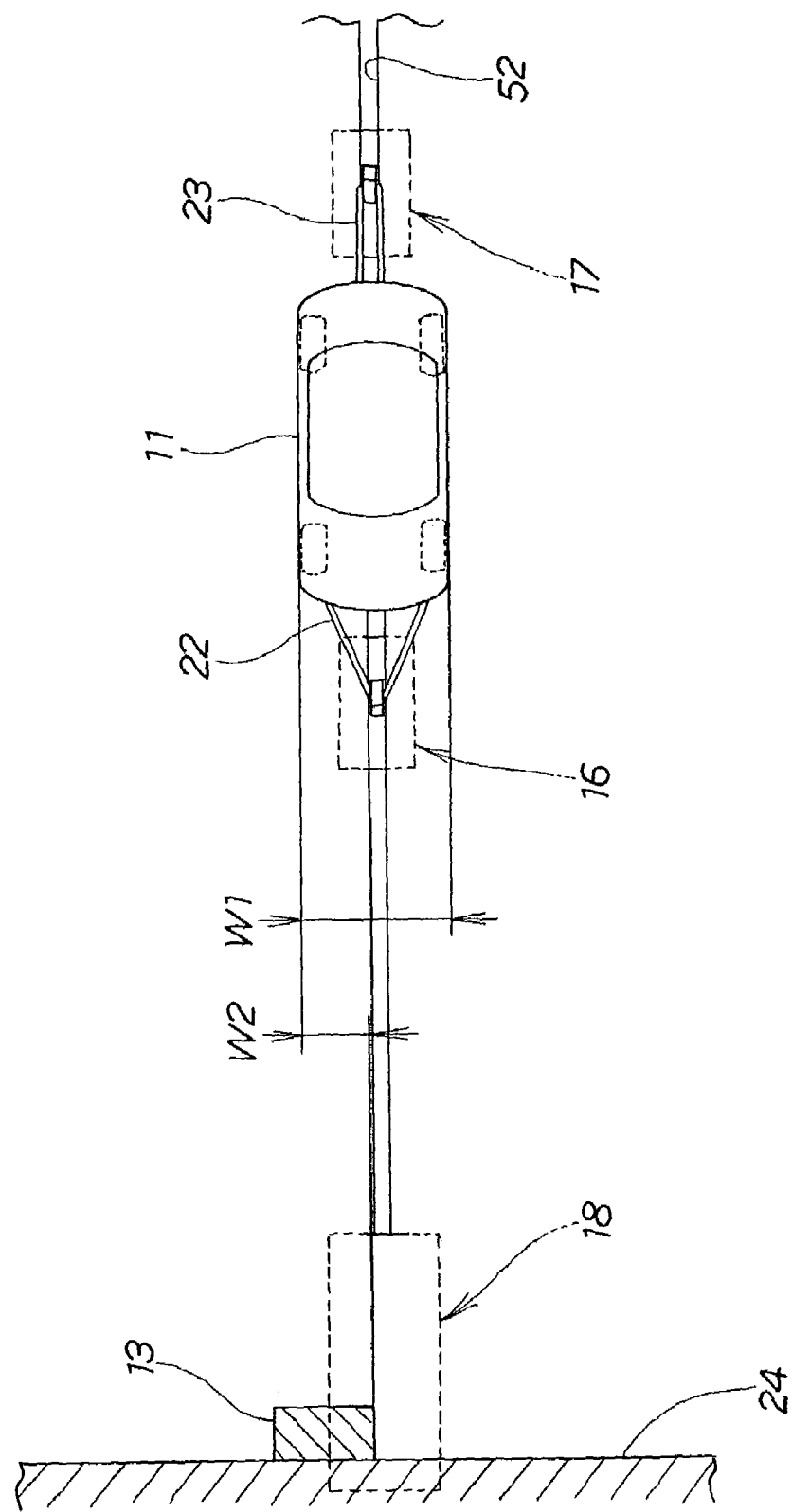
FIG. 2 is a plan view of the vehicle crash test apparatus shown in FIG. 1.

As shown in FIG. 2, conditions are set for an offset collision in which the vehicle 11 will be made to collide with a barrier 13 which it overlaps from the driver's side (in this case the right side of the vehicle 11) by an overlap amount W2, which is a predetermined proportion of the maximum width W1 of the vehicle 11 (excluding door mirrors). The towing wire 22 is connected to the towing device 16 from two locations on the front of the vehicle 11. The auxiliary towing wire 23 is connected to the auxiliary towing device 17 from one location on the rear of the vehicle 11.

Figure 3:
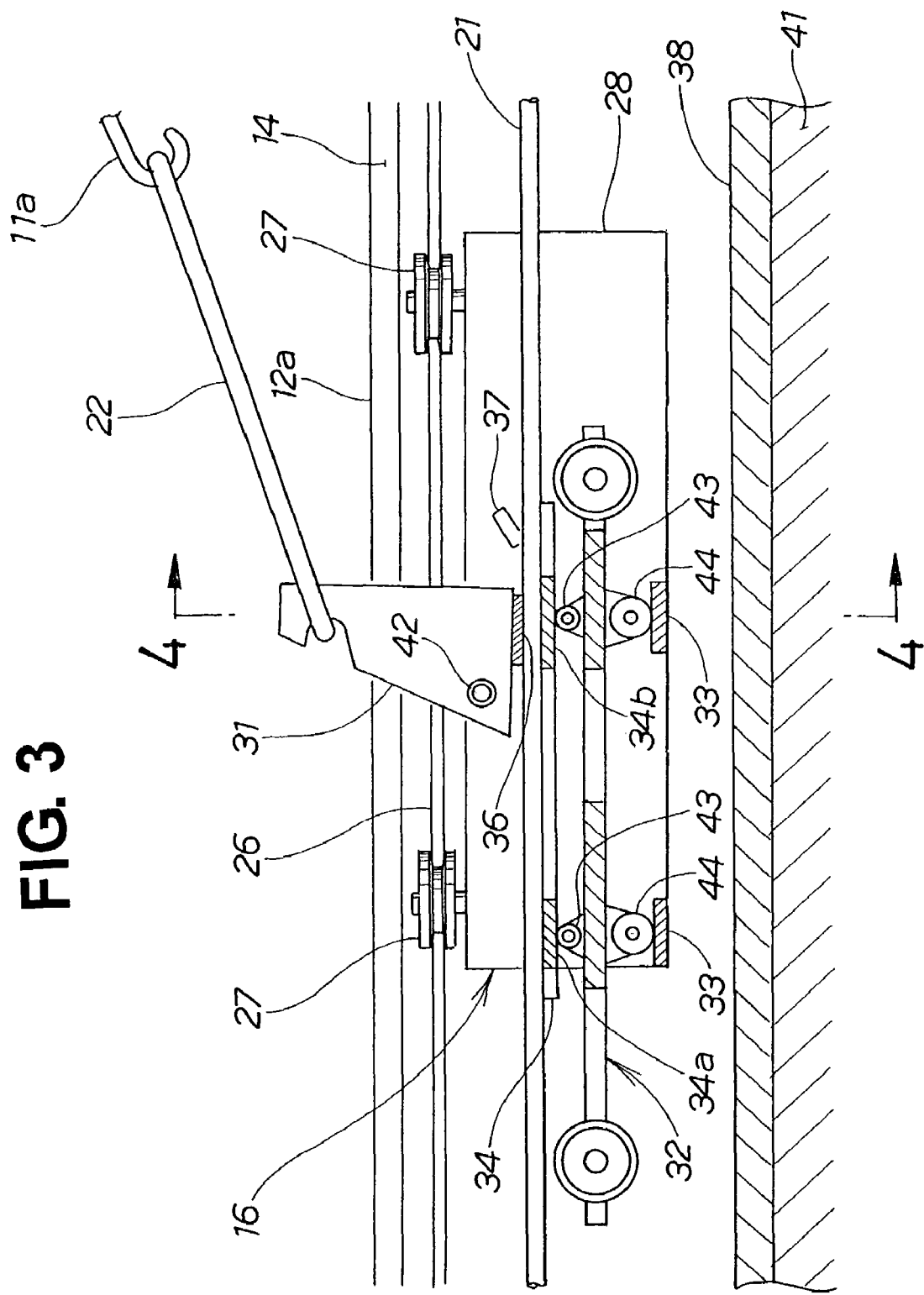
FIG. 3 is a detail view of a towing device shown in FIG. 1.
Figure 4:
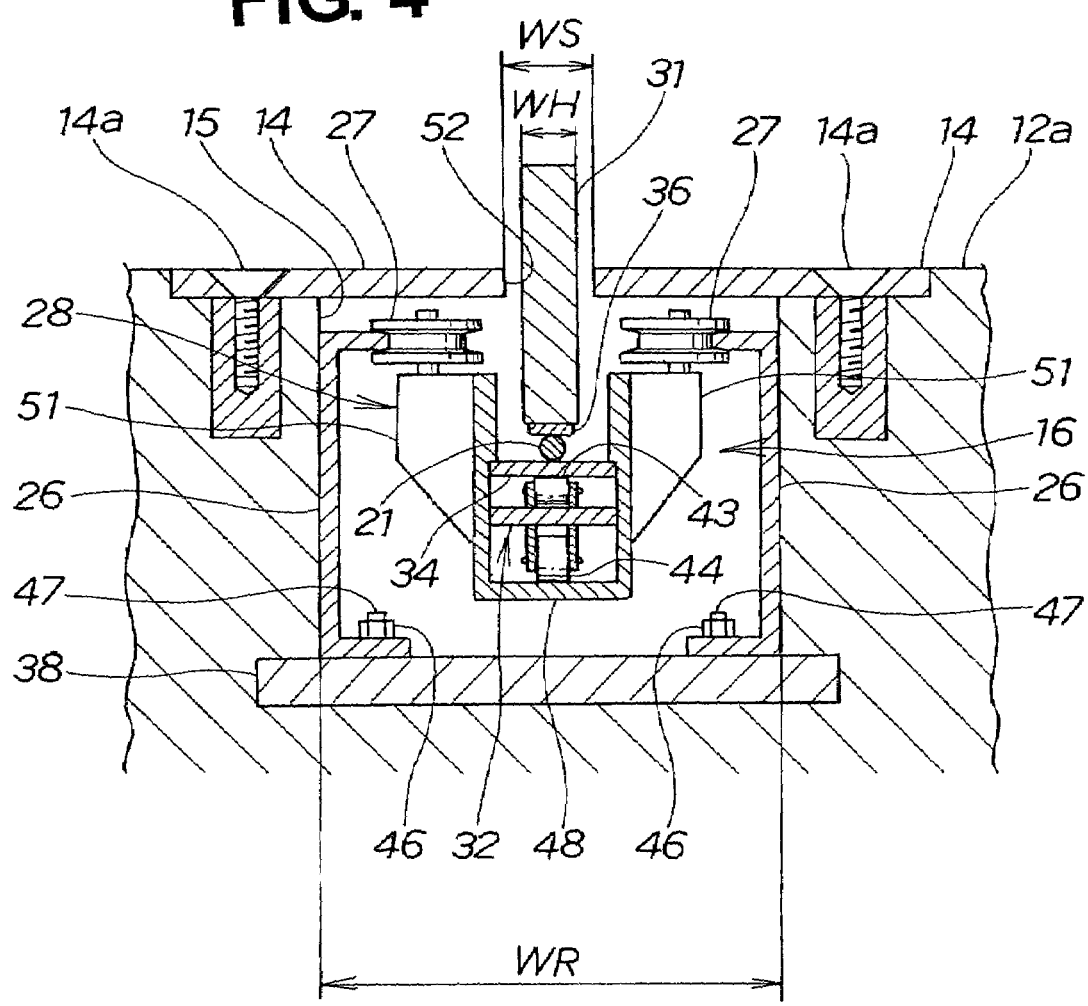
FIG. 4 is a sectional view taken along line 4—4 of FIG. 3.

As shown in FIG. 3 and FIG. 4, the towing device 16 has a left-right pair of guide rails 26 provided below the road surface 12. A main pulling part 28 is movably mounted on these guide rails 26 in a hanging state by way of wheels 27, 27. The towing device 16 and also has a hook 31 serving as a test vehicle connection hook for hooking the towing wire 22, swingably attached to the main pulling part 28. A slide member 32 movable through a fixed distance in the travel direction of the main pulling part 28 is mounted on the main pulling part 28. The slide member 32 is held in a high position by slide member holding parts 33, 33 provided on the main pulling part 28. The reference numeral 11a denotes a front hook on the vehicle 11 side, shown in FIG. 1. The reference numeral 36 denotes a presser plate provided on the bottom of the hook 31 to contact the cable 21. Clockwise rotation of the hook 31 is limited by a stopper piece 37. The reference numeral 38 denotes a bottom plate of the channel 15, and 41 a bed.

The cable 21 is gripped by the hook 31 and, via an intermediate member 34, the slide member 32 set on the slide member holding parts 33, 33.

The hook 31 is swingable about a pivot 42 provided on the main pulling part 28.

On the upper side of a plate member thereof the slide member 32 has rollers 43, 43 which contact the intermediate member 34, and on the lower side it has rollers 44, 44 which contact the slide member holding parts 33, 33. The intermediate member 34 has roller contacting parts 34a, 34b which contact the rollers 43, 43.

As shown in FIG. 4, the left and right guide rails 26, 26 are cross-sectionally C-shaped. The left and right guide rails 26, 26 are fixed to the bottom plate 38 of the channel 15 by multiple nuts 46 and multiple bolts 47. The main pulling part 28 is suspended from the left and right guide rails 26, 26 on the wheels 27, 27.

The main pulling part 28 has a cross-sectionally C-shaped body 48. This body 48 has strengthening plates 51, 51 fixed to both its sides. The wheels 27, 27 are rotatably attached to these strengthening plates 51, 51.

Covers 14, 14 for covering the top opening of the channel 15 are removably fixed to the road surface 12 with multiple bolts 14a. These covers 14, 14 are disposed so that they project from the sides of the channel 15 toward the hook 31 and lie side by side in the front-rear direction of the paper.

The width WH of the hook 31 is smaller than the width WR of the guide rails 26, 26. The width WS of a slit 52 formed between the covers 14, 14 is set slightly larger than the width WH of the hook 31 but smaller than the tire width of the vehicle 11.

Figure 5:
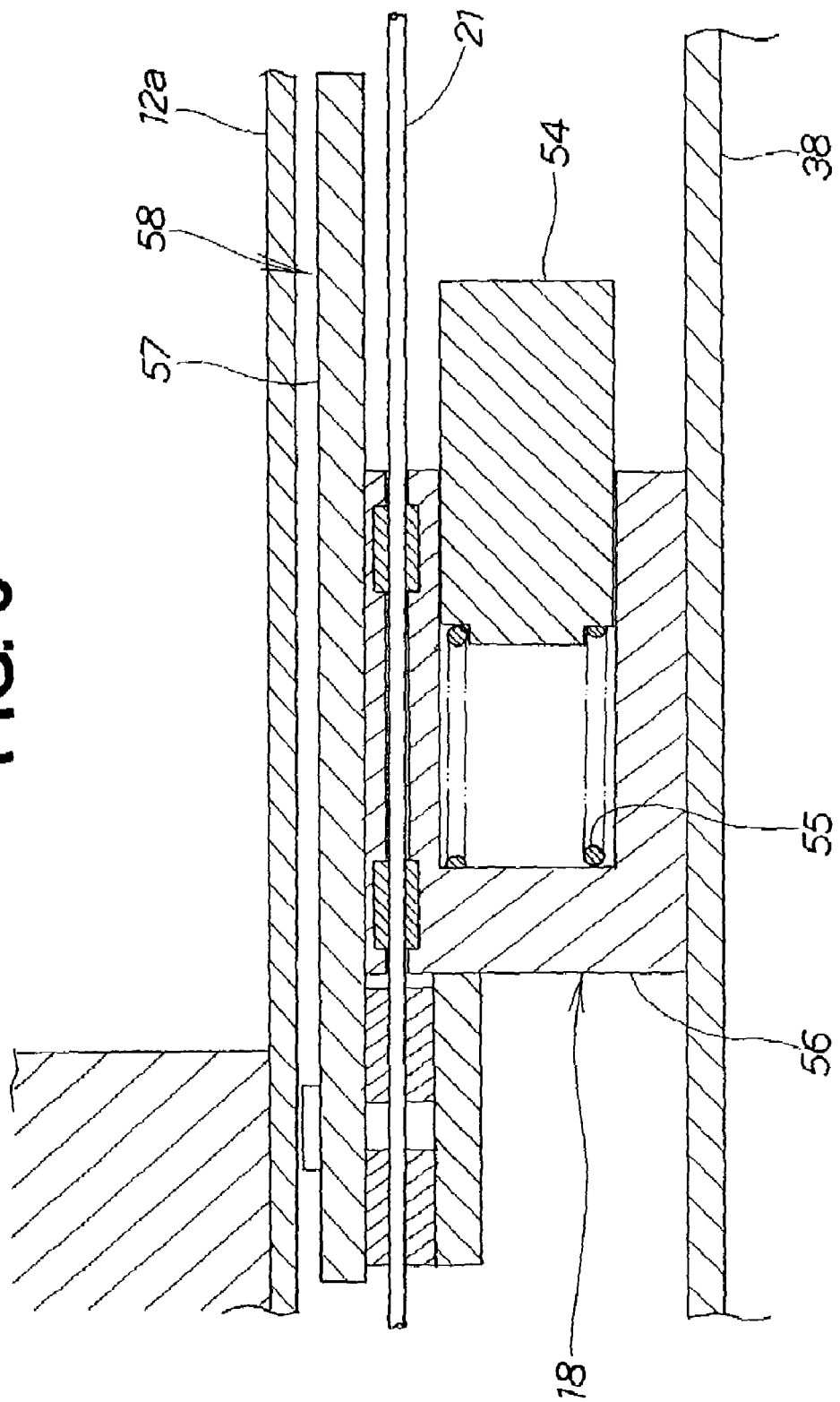
FIG. 5 is a sectional view showing a detail of a braking device shown in FIG. 1.

FIG. 5 shows a braking device 18. This braking device 18 has a mass 54 serving as a stopper for the slide member 32 (see FIG. 3) of the towing device 16 (see FIG. 3) to hit. This mass 54 is supported by a spring 55 in a receiving case 56. The mass 54 is urged by the spring 55 in a direction in which it projects from the receiving case 56. A hook tipping member 57 consisting of a bar for tipping the hook 31 of the towing device 16 shown in FIG. 3 is provided above the receiving case 56. The hook 31 and the hook tipping member 57 constitute a hook projection clearing member 58.

Figure 6:
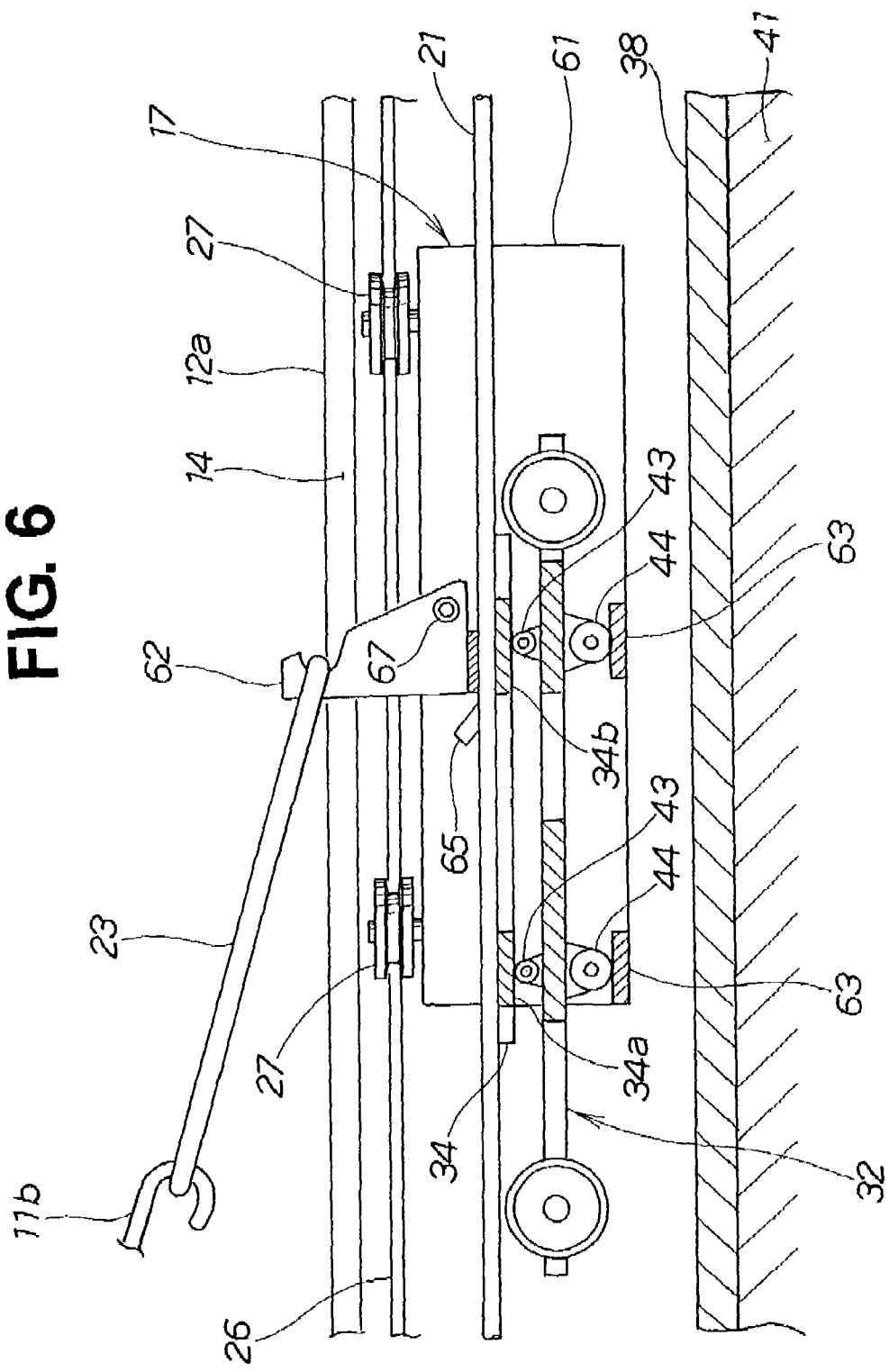
FIG. 6 is a view showing a detail of an auxiliary towing device shown in FIG. 1.

As shown in FIG. 6, the auxiliary towing device 17 has a main dragging part 61 movably mounted by way of wheels 27, 27 on the guide rails 26, 26 (see FIG. 4), a hook 62 for hooking one end of the rear connecting wire 23, a slide member 32 mounted movably through a fixed distance in the travel direction of the main dragging part 61, and slide member holding parts 63, 63 provided on the main dragging part 62 to hold the slide member 32 in a high position. The hook 62 swings about a pivot 67 provided on the main dragging part 61. The other end of the rear connecting wire 23 is hooked onto a rear hook 11b attached to the vehicle 11. Counterclockwise rotation of the hook 62 is limited by a stopper piece 65.

Next, the operation of the vehicle crash test apparatus of the first embodiment described above will be described, on the basis of FIG. 7 through FIG. 11.

FIGS. 7(a) through (d) show in order the course of a vehicle from being at rest to crashing.

FIG. 7(a) shows the vehicle at rest. The vehicle 11 is not connected to the towing device 16 or the auxiliary towing device 17.

FIG. 7(b) shows winding of the cable 21 toward the barrier 13 having started and the vehicle 11 being pulled with the towing device 16 and a rearward drag force being applied to the vehicle 11 with the auxiliary towing device 17.

FIG. 7(c) shows a state immediately before the vehicle 11 hits the barrier 13. The towing device 16 strikes the braking device 18 at a position a predetermined distance in front of the barrier 13. The braking device 18 starts braking the towing device 16, and uncouples the vehicle 11 from the towing device 16.

FIG. 7(d) shows the vehicle 11 having hit the barrier 13. The braking device 18 continues braking the towing device 16 and also causes the auxiliary towing device 17 to hit the towing device 16 and uncouples the vehicle 11 from the auxiliary towing device 17.

FIG. 8A is a detailed enlarged view of the towing device 16 and the auxiliary towing device 17 as they are shown in FIG. 7(a). FIG. 8B is a detailed enlarged view of the towing device 16 and the auxiliary towing device 17 as they are shown in FIG. 7(b).

In FIG. 8A, the hook 31 of the towing device 16 is disengaged from the towing wire 22, and the hook 62 of the dragging device 17 is disengaged from the auxiliary towing wire 23.

In FIG. 8B, when the cable 21 is moved forward, frictional forces arise between the cable 21 and the intermediate members 34, 34 due to the weight of the cable 21. At this time, if the intermediate member 34 of the auxiliary towing device 17 is made lower than the intermediate member 34 of the towing device 16, the frictional force between the cable 21 and the intermediate member 34 of the auxiliary towing device 17 can be made small and the speed of advance toward the barrier 13 of the auxiliary towing device 17 can be made slower than the speed of advance of the towing device 16 toward the barrier 13. Because of this, by the towing device 16 advancing, the hook 31 can be hooked onto the towing wire 22, and, as a result, the vehicle 11 is pulled by the towing device 16 (see FIG. 7(b)). By the vehicle 11 being pulled, the auxiliary towing wire 23 can be hooked onto the hook 62, and a rearward drag force can be applied to the vehicle 11 by the auxiliary towing device 17.

FIG. 9A shows the relationship between the towing device 16 and the braking device 18 in the state immediately before the vehicle 11 hits the barrier 13, shown in FIG. 7(c). FIG. 9B shows the relationship between the towing device 16 and the braking device 18 in the state after the vehicle has hit the barrier, shown in FIG. 7(d).

In FIG. 9A, when the leading end of the slide member 32 of the towing device 16 strikes the mass 54 of the braking device 18, the mass 54 moves in the direction of the white arrow against the elastic force of the spring 55, and the braking device 18 softens the shock of the impact of the towing device 16. At the same time, the slide member 32 starts to drop from the slide member holding parts 33, 33 in the direction of the arrows. As a result, the intermediate member 34, which had been resting on the rollers 43, 43 of the slide member 32, starts to descend along with the cable 21. Because the stopper bar 57 of the braking device 18 hits the front of the hook 31, the hook 31, while also assisting the descent of the cable 21, starts to turn in the clockwise direction about the pivot 42 as shown with an arrow, and so starts to tip. In this way, the hook 31 starts to disengage from the towing wire 22.

In FIG. 9B, when the towing device 16 moves further in the direction of the barrier, the leading end of the slide member 32 moves the mass 54 further forward, and also the slide member 32 drops, and along with this the intermediate member 34 and the cable 21 descend further. Because the hook tipping member 57 pushes over the hook 31 further rearward, the hook 31 disappears below the road surface 12 immediately before the vehicle crashes, and both during the collision and after the collision the hook 31 remains in that state.

FIG. 10 shows the relationship between the towing device 16 and the auxiliary towing device 17 shown in FIG. 7(d).

From immediately before the vehicle crashes and thereafter, the leading end of the slide member 32 of the auxiliary towing device 17 strikes the rear part of the towing device 16. Consequently, the slide member 32 drops from the slide member holding parts 63, 63, and along with this the intermediate member 34 and the cable 21 drop. As a result, there ceases to be anything below the hook 62 limiting rotation of the hook 62, and an inertia force of the collision acts on the hook 62. The hook 62 rotates and tips counterclockwise about the pivot 67 as shown with an arrow, and disappears below the road surface 12.

Figure 11:
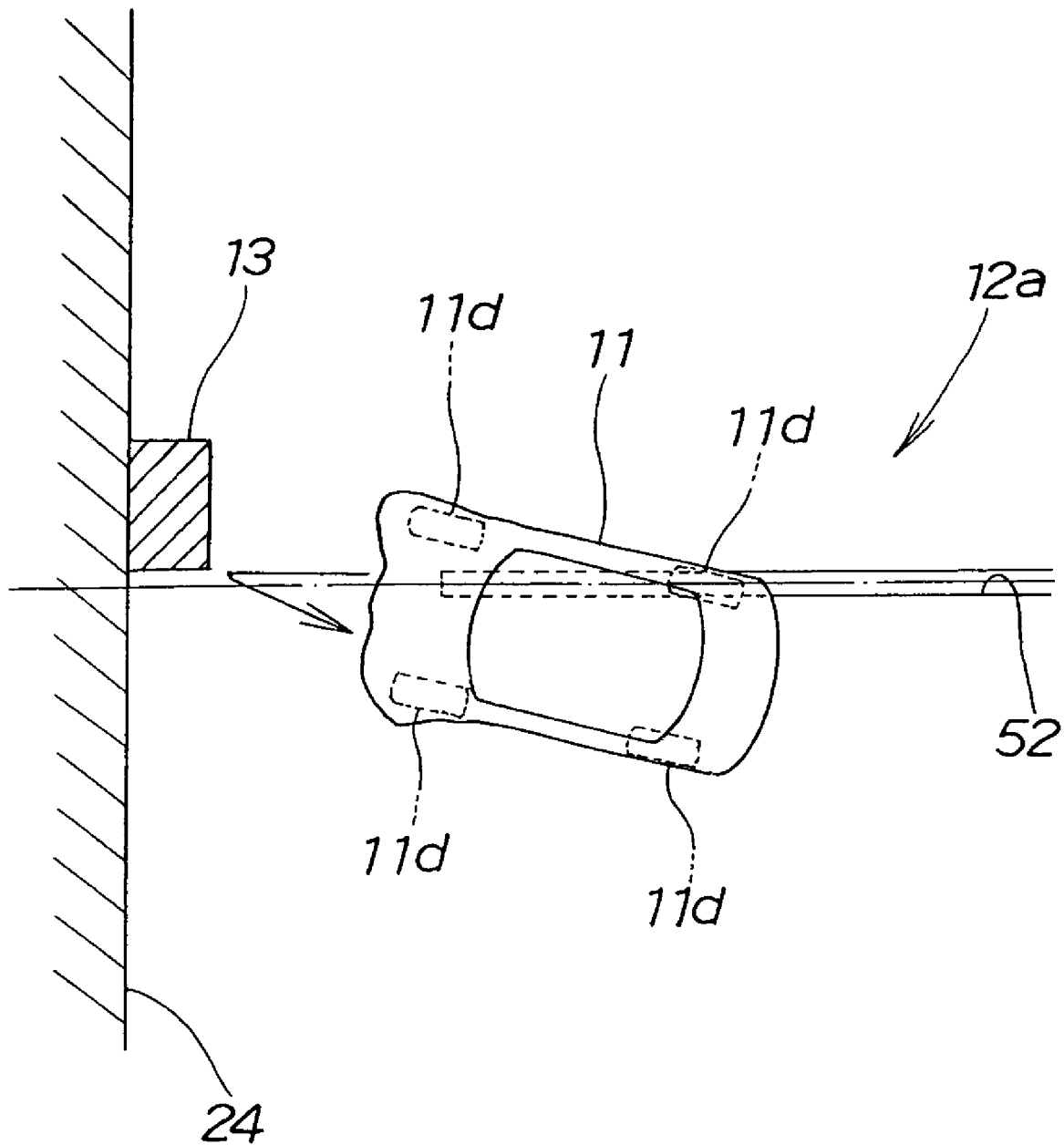
FIG. 11 shows a state immediately after a test vehicle hits a barrier.

FIG. 11 shows the vehicle 11 having collided with the barrier 13 and then immediately bounced back off the barrier 13 diagonally. At this time, because the hooks 31, 62 do not project from the road surface 12, they do not contact the vehicle 11 immediately after the collision. Because the width of the slit 52 is small, the wheels 11d do not go into the slit 52.

Next, a second embodiment of a vehicle crash test apparatus according to the invention will be described, on the basis of FIG. 12 through FIG. 26C.

Figure 12:
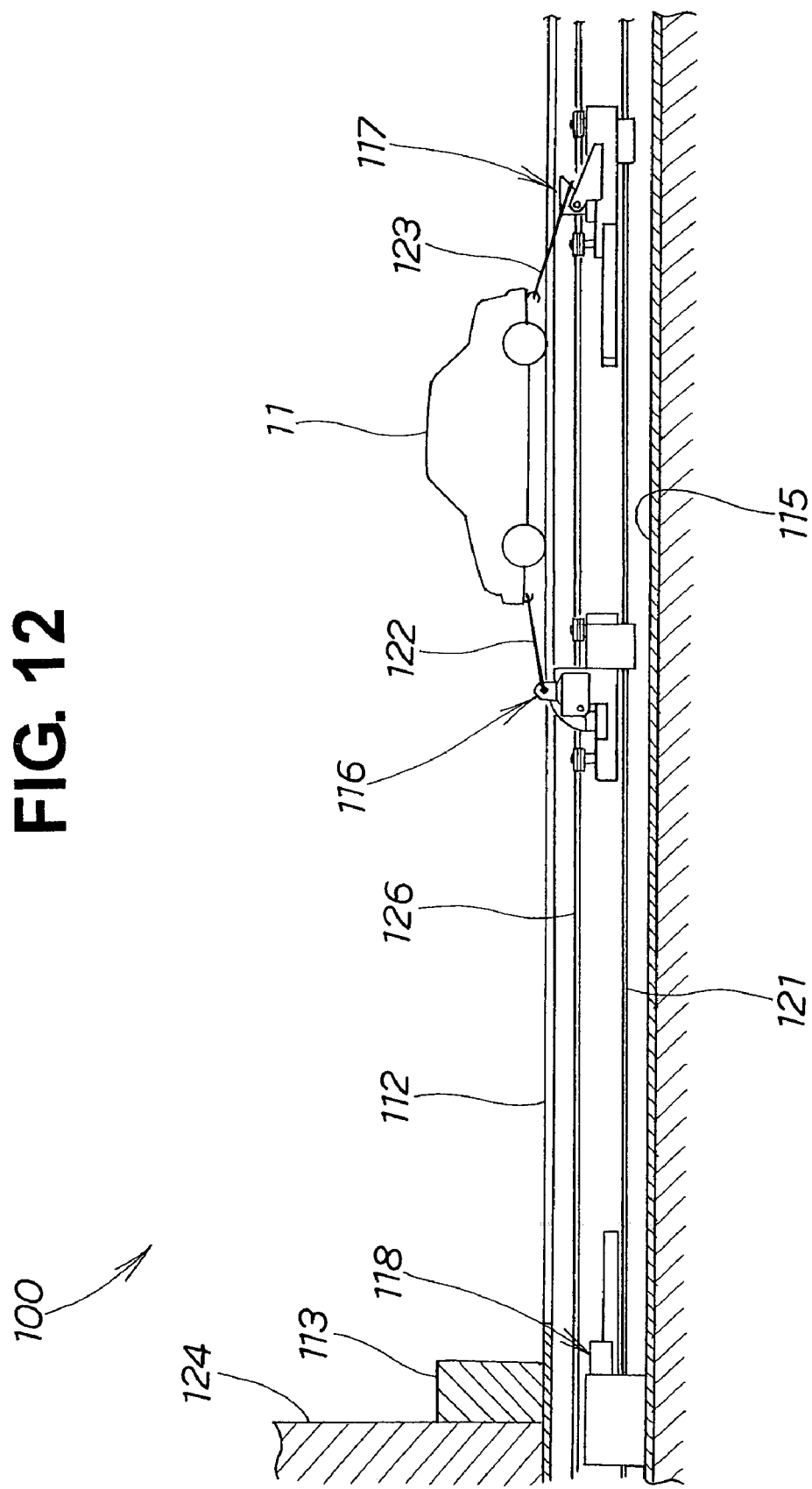
FIG. 12 is a schematic view of a vehicle crash test apparatus according to a second embodiment of the invention.

The vehicle crash test apparatus 100 of a second embodiment shown in FIG. 12 has a barrier 113 for a test vehicle 11 to collide with. The test vehicle 11 is pulled toward this barrier 113 by a towing device 116. An auxiliary towing device 117 is connected to the rear of the test vehicle 11. The towing device 116 and the auxiliary towing device 117 are moved toward the barrier 113 by a cable 121 which can be wound in by a winding device (not shown). When the towing device 116 has been moved toward the barrier 113, the towing device 116 is stopped by a braking device 118.

The test vehicle 11 travels on a road surface 112. The towing device 116 and the auxiliary towing device 14 are guided toward the barrier 113 by guide rails 126. The barrier 113 is fixed by a fixed wall 124. The test vehicle 11 and the towing device 116 are connected by a towing wire 122. The test vehicle 11 and the auxiliary towing device 117 are connected by an auxiliary towing wire 123. As the towing wire 122 and the auxiliary towing wire 123, for example a Kevlar rope or a resin chain is suitable.

Figure 13:
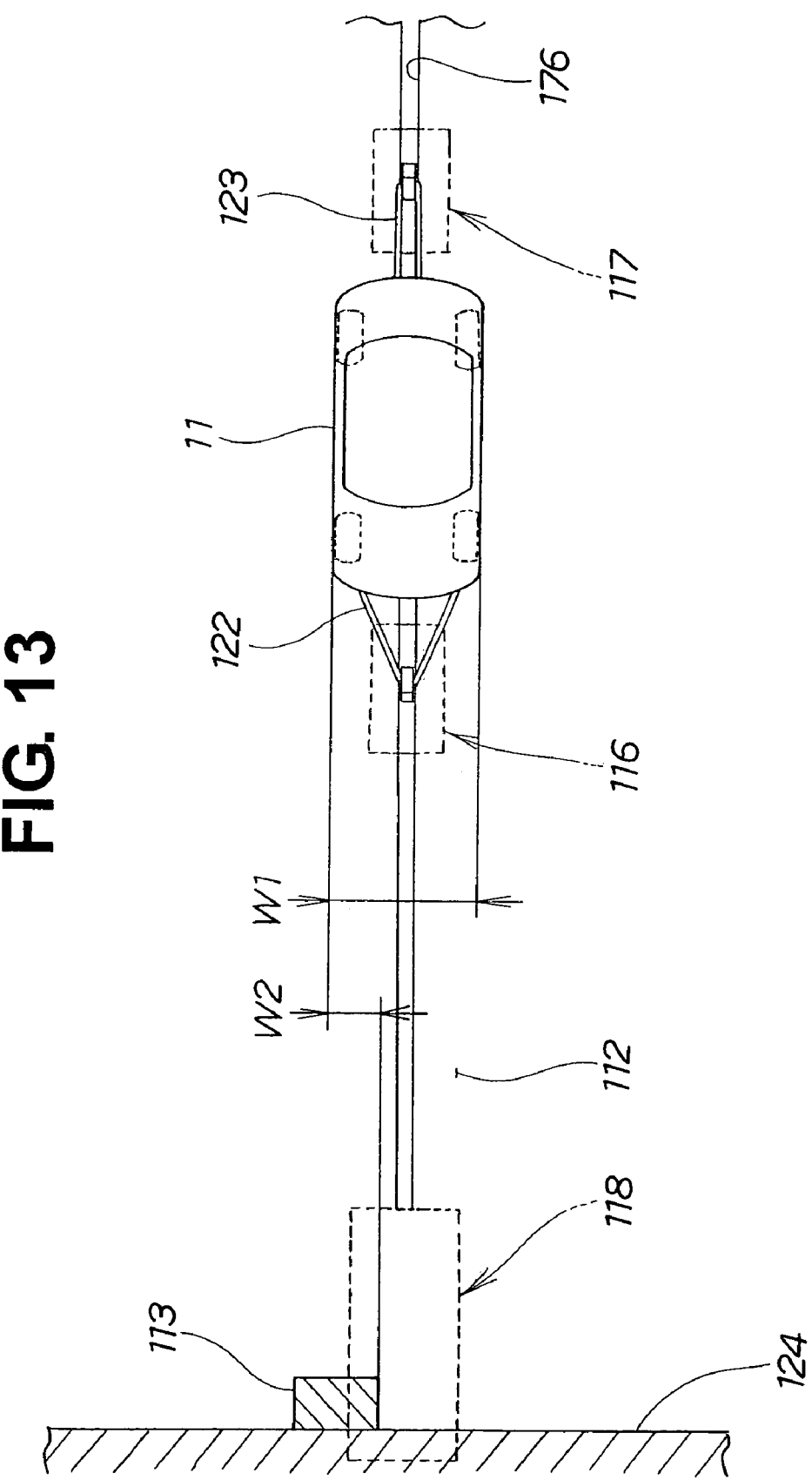
FIG. 13 is a plan view of the vehicle crash test apparatus shown in FIG. 12.

As shown in FIG. 13, conditions are set for an offset collision in which the test vehicle 11 will be made to collide with a barrier 113 which it overlaps from the driver's side (in this case the right side of the test vehicle 11) by an overlap amount W2, which is a predetermined proportion of the maximum width W1 of the vehicle 11 (excluding door mirrors). The towing wire 122 is connected to the towing device 116 from two locations on the front of the test vehicle 11. The auxiliary towing wire 123 is connected to the auxiliary towing device 117 from one location on the rear of the test vehicle 11.

Figure 14:
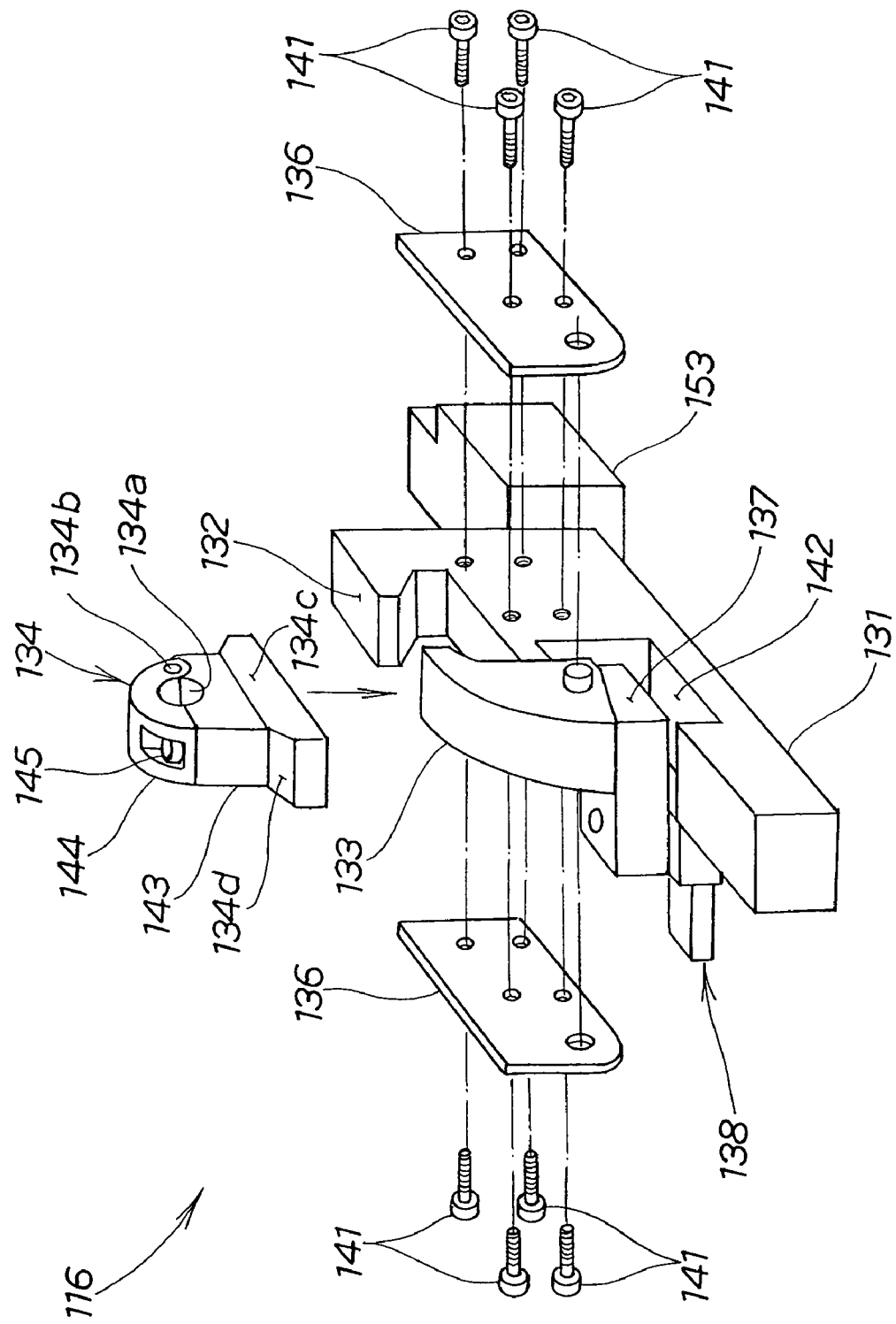
FIG. 14 is a. perspective view of a towing device of the second embodiment of the invention.
Figure 15:
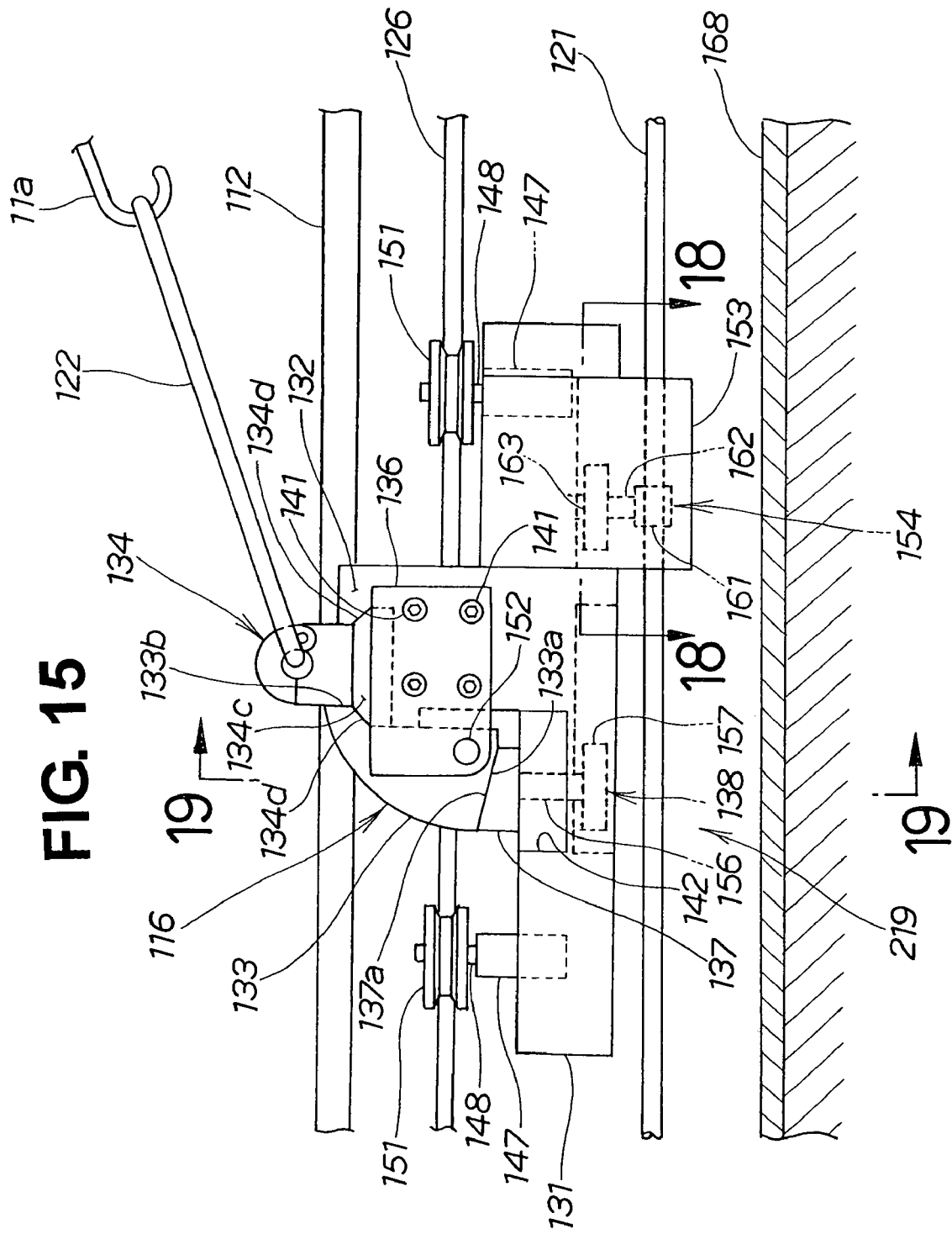
FIG. 15 is a side view of the towing device shown in FIG. 14.

As shown in FIG. 14 and FIG. 15, the towing device 116 has a claw part 133 serving as holding means facing a hook part 132 formed at the top of a base member 131. A wire connecting member 134 is detachably retained by this hook part 132 and the claw part 133. The claw part 133 is swingably supported by side plates 136, 136 fixed with multiple bolts 141 to the base member 131. A swing limiting member 137 interposed between the base member 131 and the claw part 133 limits the swing of the claw part 133. A limit removing mechanism 138 serving as a wire connection releasing mechanism removes the swing limiting of the swing limiting member 137. Connecting and disconnecting of the towing device 116 and the cable 121 (see FIG. 12) are carried out by a cable gripping mechanism 154. A plurality of rollers 151, 151 roll along the guide rail 126 (see FIG. 12). The reference number 142 denotes a recess into which the claw part 133 falls when the swing limiting of the claw part 133 has been canceled.

The wire connecting member 134 has a base part 143 and a semi-circular part 144 open/closably attached to the base part 143. The semi-circular part 144 can be fixed to the base part 143 with a bolt 145. A wire retaining hole 134a for retaining the towing wire 122 (see FIG. 13) is formed by the base part 143 and the semi-circular part 144. The reference numeral 134b denotes a swing pivot for swingably attaching the semi-circular part 144 to the base part 143.

The wire releasing device 138 includes an arm tipping member consisting of a bar member, which will be further discussed later, which is a part of the braking device 118 shown in FIG. 12.

As shown in FIG. 15, the base member 131 has multiple supporting parts 147 to which are attached multiple support shafts 148. The above-mentioned rollers 151 are rotatably attached to these support shafts 148. The claw part 133 is swingably attached to the side plates 136, 136 by a pivot 152. An engaging part 134c provided at the bottom of the wire connecting member 134 is retained by the hook part 132 of the base member 131 and the claw part 133. This engaging part 134c has two sloping faces 134d, 134d at its top.

An upper face 137a of the swing limiting block 137 is a sloping face shaped like a wedge. By this upper face 137a being pressed against a lower face 133a of the claw part 133, a front end part 133b of the claw part 133 is pressed against the wire connecting member 134 and surely retains the wire connecting member 134. The reference number 153 denotes a downward projecting part projecting downward from the base member 131 and receiving the cable gripping mechanism 154. The reference numeral 11a denotes a front hook provided on the front of the test vehicle 11 (see FIG. 12) for hooking the towing wire 122.

Figure 16:
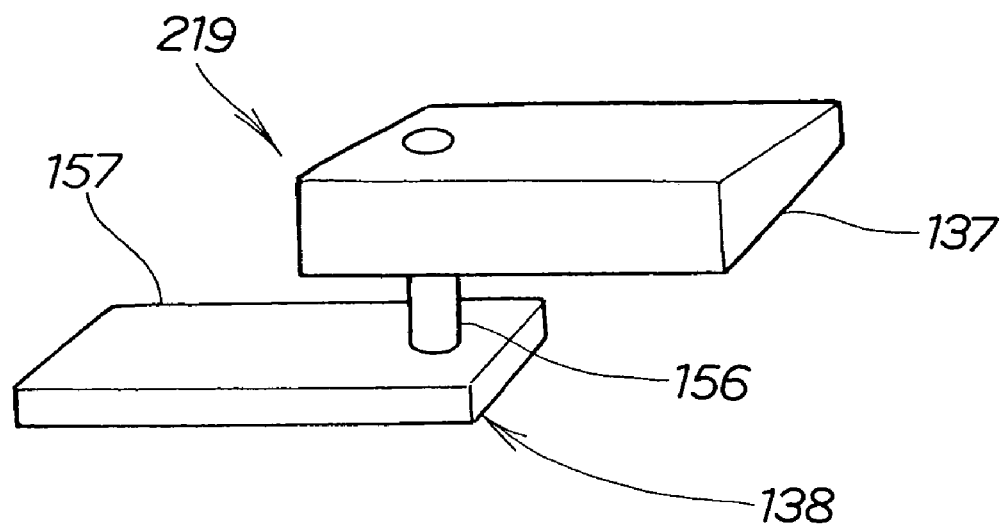
FIG. 16 is a perspective view of a swing limiting block and a limit removing mechanism of a claw part constituting the towing device of the second embodiment.

FIG. 16 shows the swing limiting block 137 of the claw part and the limit removing mechanism 138. A pivot 156 is attached to the swing limiting block 137, and a releasing arm 157 is attached to this pivot 156. The pivot 156 and the releasing arm 157 constitute the above-mentioned limit removing mechanism 138.

Figure 17:
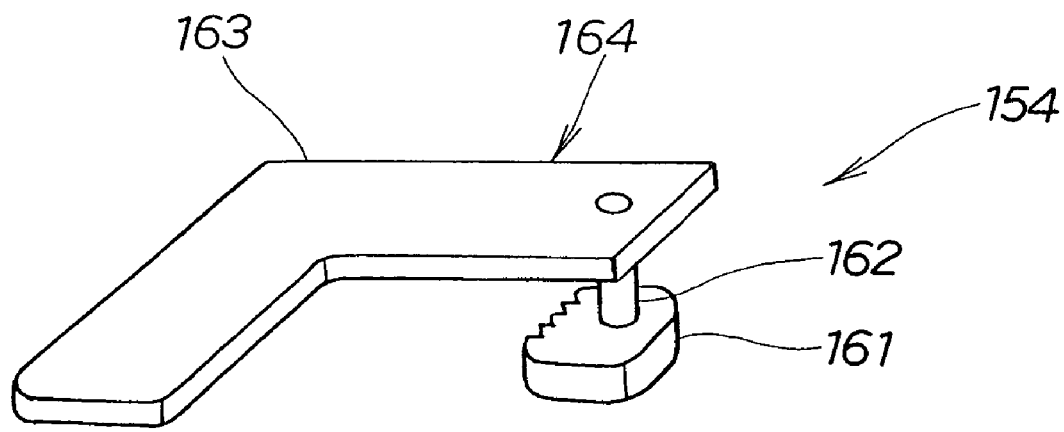
FIG. 17 is a perspective view of a cable gripping mechanism according to the second embodiment.

FIG. 17 shows the cable gripping mechanism 154. This cable gripping mechanism 154 is made up of a cable pressing member 161 for pressing the cable 121 (see FIG. 15), a pivot 162 attached to the cable pressing member 161, and an L-shaped releasing arm 163 attached to the pivot 162.

The pivot 162 and the releasing arm 163 constitute a cable connection releasing mechanism 164 for releasing the connection of the cable 121 and the towing device 116 (see FIG. 15).

Figure 18A:
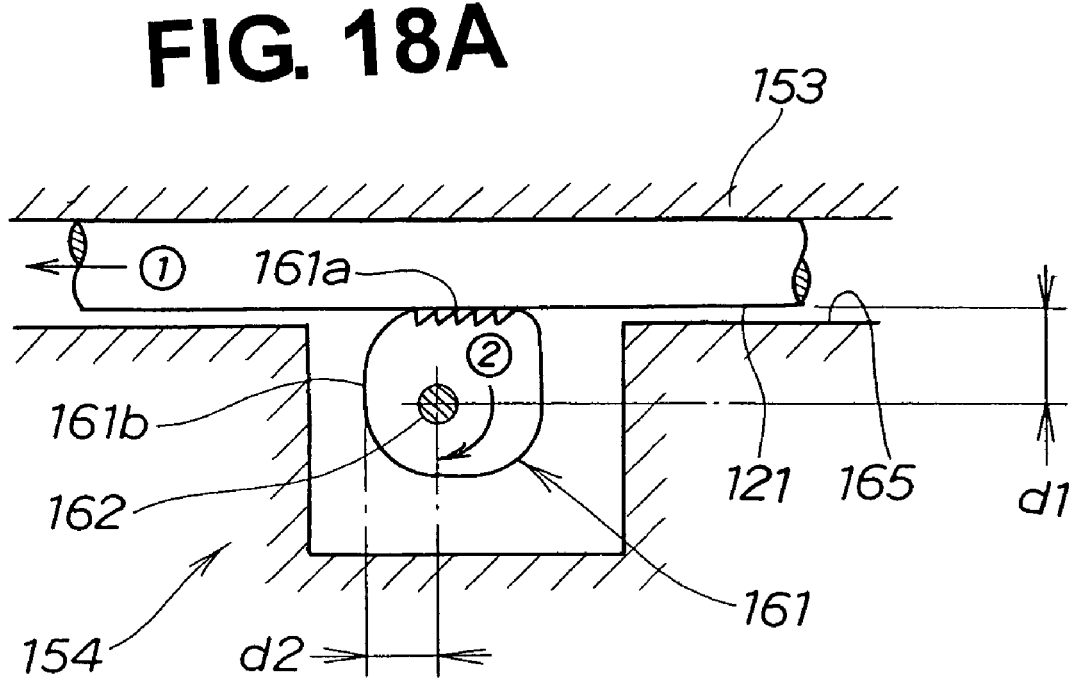
FIG. 18A and FIG. 18B are views showing the operation of the cable gripping mechanism shown in FIG. 17.
Figure 18B:
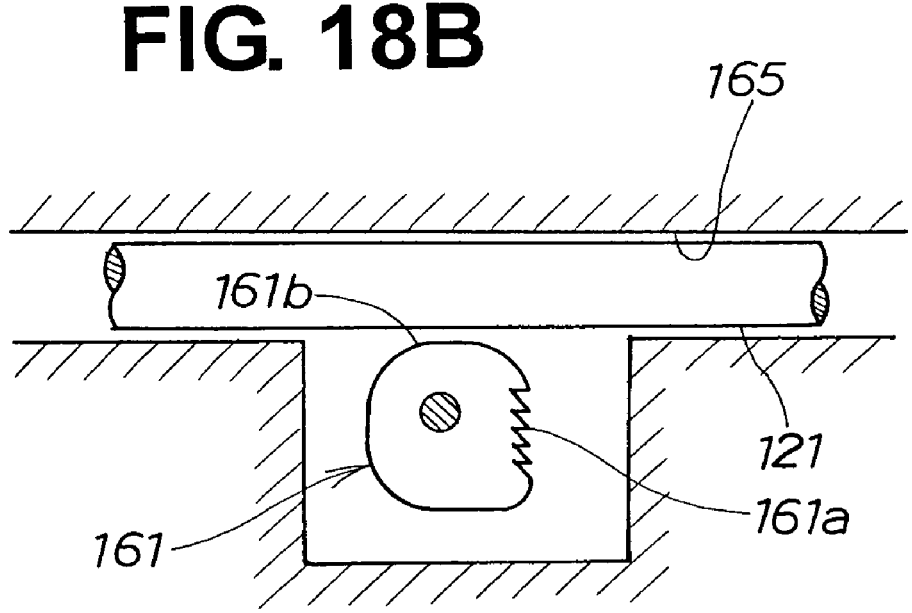

The operation of the cable gripping mechanism 154 is shown in FIG. 18A and FIG. 18B.

In FIG. 18A, the cable pressing member 161 has a rectangular shape with its four corners rounded. If the distance from the center of the pivot 162 to a first side 61a formed in the shape of saw teeth is written d1 and the distance from the center of the pivot 62 to a second side 61b is written d2, d1 and d2 are set so that they have the relationship d1>d2. A cable hole 165 for the cable 121 to pass through is formed in the downward projecting part 153 (see FIG. 15). FIG. 18A shows a state wherein the cable 121 is pressed against the inner face of the cable hole 165 with the first side 161a of the cable pressing member 161 and the cable 121 and the traction device 13 (see FIG. 15) are thereby connected. When the cable 121 is pulled in the direction of the arrow ①, the first side 161a shaped like saw teeth bites into the cable 121, and the connection becomes strong.

When from this state the cable pressing member 161 is turned through 90° in the direction of the arrow ②, the state shown in FIG. 18B is reached. That is, the second side 161b of the cable pressing member 161 faces the cable 121. Because, as mentioned above, d1>d2, a gap forms between the second side 161b of the cable pressing member 161 and the cable 121, and the cable 121 moves away from the inner face of the cable hole 165. Consequently, the connection between the cable 121 and the towing device 116 (see FIG. 15) is released.

Figure 19:
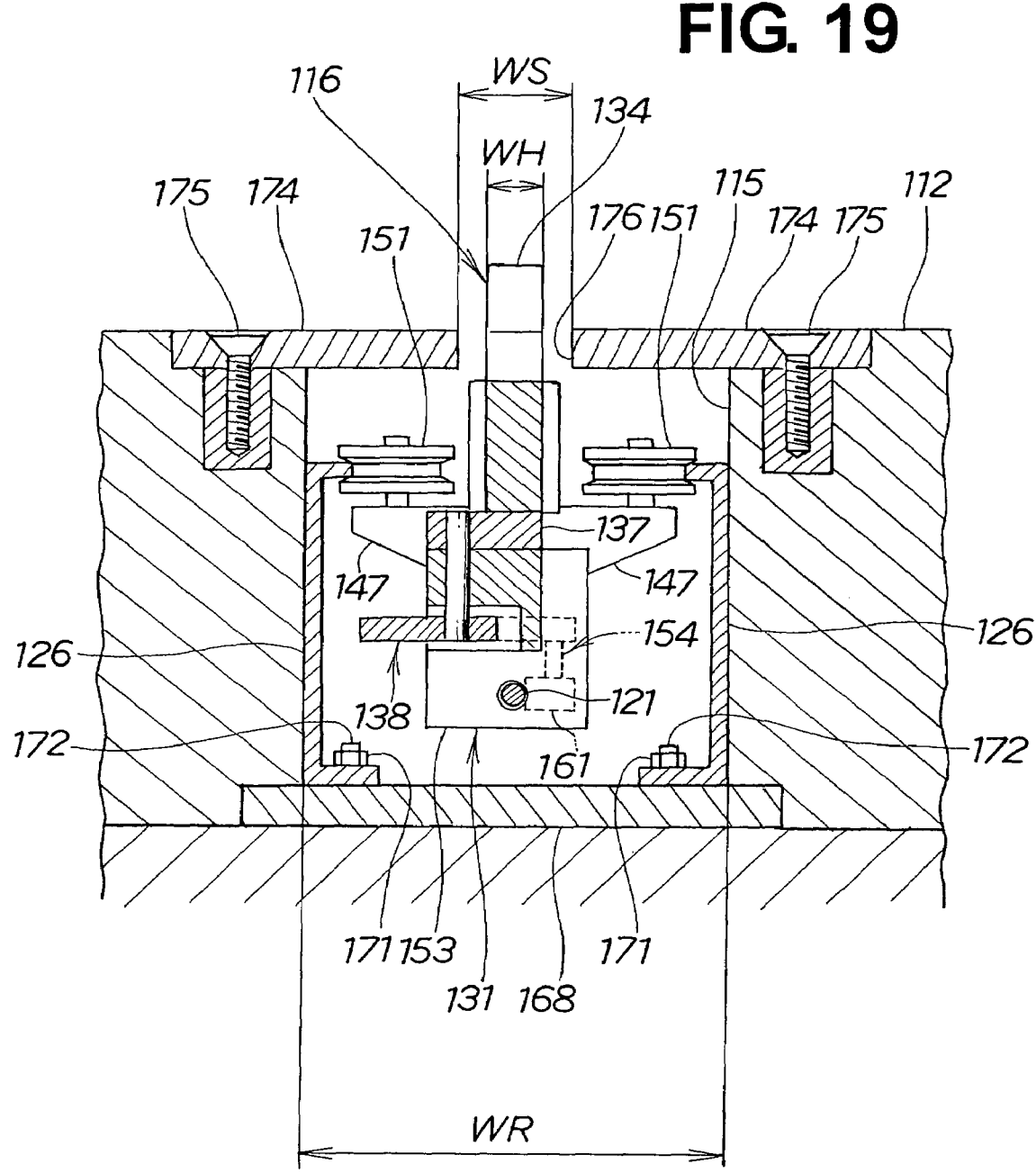
FIG. 19 is a sectional view taken along line 19—19 of FIG. 15.

As shown in FIG. 19, the towing device 116, the auxiliary towing device 117 (see FIG. 12) and the braking device 118 (see FIG. 12) are received in a channel 115 formed in the road surface 112. Cross-sectionally C-shaped guide rails 126, 126 are fixed to a bottom plate 168 of the channel 115 with multiple nuts 171 and bolts 172. The base member 131 is movably suspended from these guide rails 126, 126 by way of the rollers 151, 151.

Covers 174, 174 for covering the top opening of the channel 115 are removably fixed to the road surface 112 with multiple bolts 175. These covers 174, 174 are disposed so that they project from the sides of the channel 115 toward the wire connecting member 134 and lie side by side in the front-rear direction of the paper.

The width WH of the wire connecting member 134 is set to be smaller than the width WR of the guide rails 126, 126. The width WS of a slit 176 formed between the covers 174, 174 is set slightly larger than the width WH of the wire connecting member 134 but smaller than the tire width of the test vehicle 11 (see FIG. 3).

Figure 20:
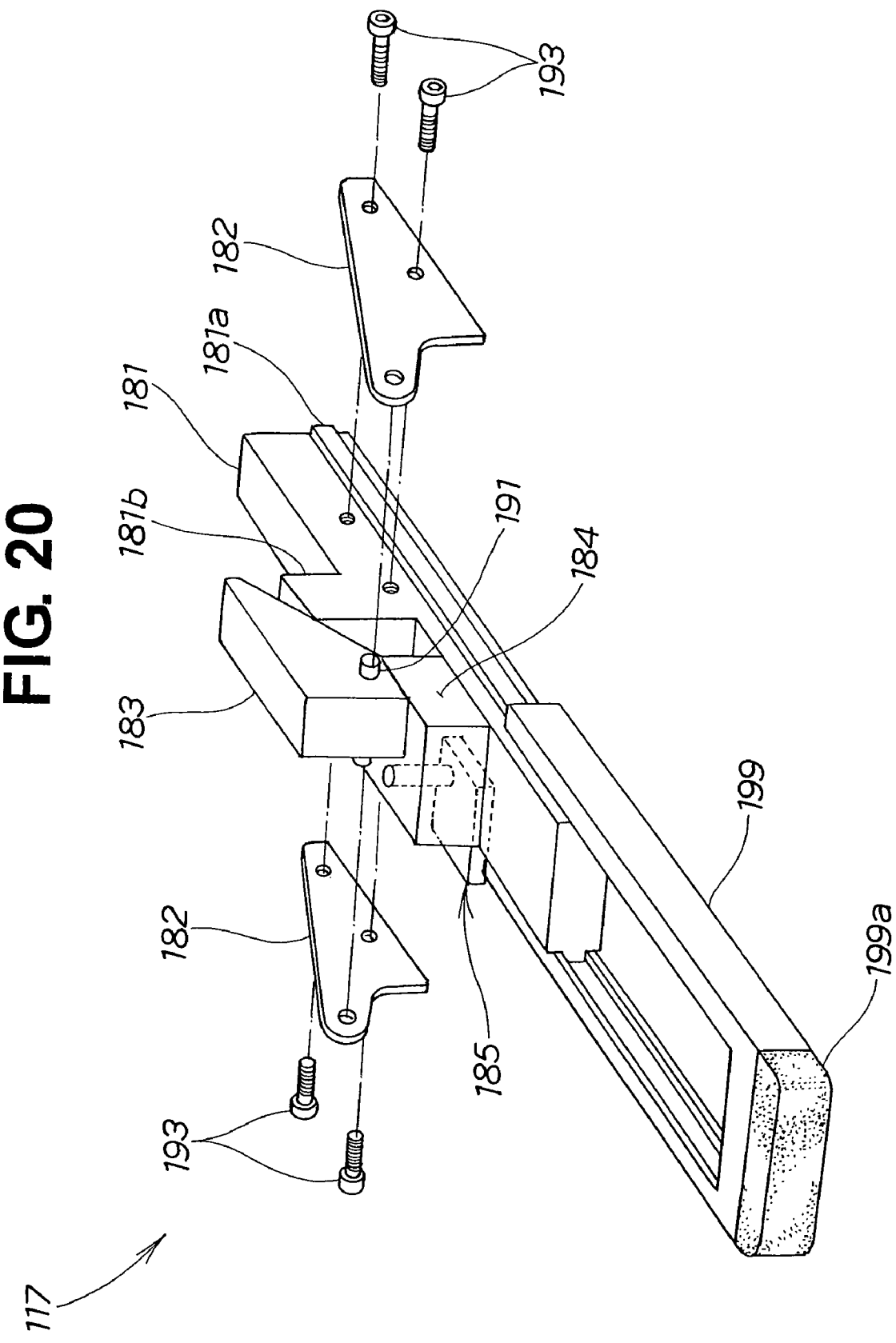
FIG. 20 is a perspective view of an auxiliary towing device according to the second embodiment of the invention.
Figure 21:
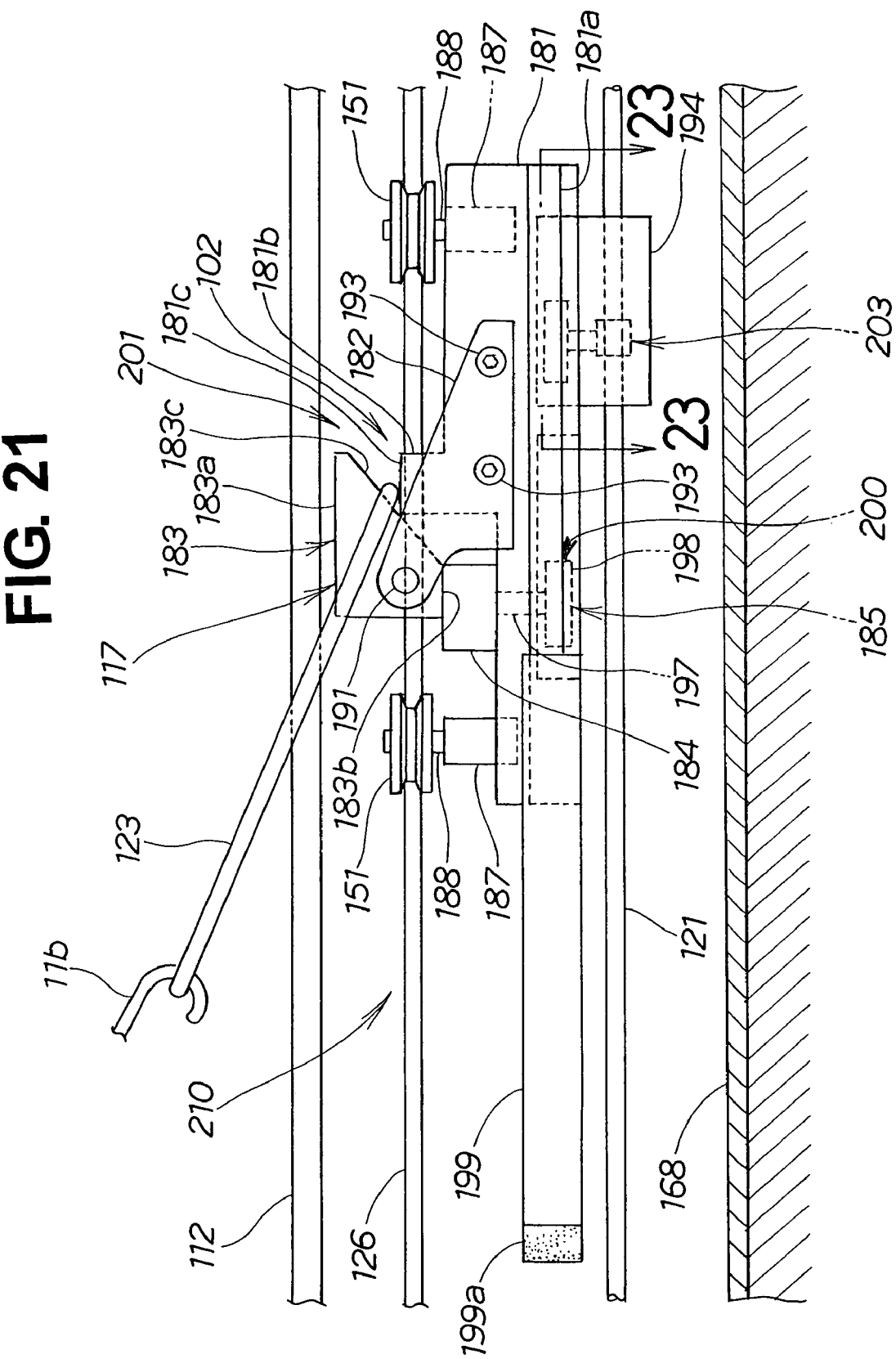
FIG. 21 is a side view of the auxiliary towing device shown in FIG. 20.

FIG. 20 and FIG. 21 show the auxiliary towing device 117 shown in FIG. 13. This auxiliary towing device 117 is made up of a base member 181, a wire engaging member 183 swingably supported by side plates 182, 182 on this base member 181, a swing limiting block 184 interposed between the wire engaging member 183 and the base member 181 to limit the swing of the wire engaging member 183, a limit removing mechanism 185 for removing the limit of the swing limiting block 184, and a cable gripping mechanism 203.

As shown in FIG. 21, the base member 181 has a plurality of support parts 187 having a plurality of support shafts 188. A roller 151 is attached to each of these support shafts 188. The wire engaging member 183 is supported on the side plates 182, 182 by way of a pivot 191. The side plates 182, 182 are fixed to the base member 181 with multiple bolts 193. The base member 181 has a downward projection 194 projecting downward from the base member 181. This downward projection 194 has the cable gripping mechanism 203 on its inner side.

The limit removing mechanism 185 of the swing limiting block 184 is made up of a pivot 197 attached to the swing limiting block 184, a releasing arm 198 attached to the pivot 197, and a slide member 199 movably attached to the side faces of the base member 181 so that it can swing the releasing arm 198.

The pivot 197 and the releasing arm 198 constitute a wire connection releasing mechanism 200 serving as a wire connection releasing device.

Tongue parts 181a, 181a serving as guide parts are formed in the side faces of the base member 181, to guide the slide member 199. A cushion material 199a is provided on the front end of the slide member 199 to soften the impact when the auxiliary towing device 117 hits the rear of the towing device 116. The base member 181 has at its top a top projecting part 81b.

The wire engaging member 183 is a trapezoidal member of which the length of an upper face 183a is longer than the length of a lower face 183b in side view. A sloping face 183c thereof and an upper face 181c of the top projecting part 181b of the above base member 181 form a wire catching hook 201 serving as a wire catching part having an acute-angled hook shape. One end of the auxiliary towing wire 123 is hooked on this wire catching hook 201. The reference numeral 11b denotes a rear hook provided on the test vehicle 11 for hooking the other end of the auxiliary towing wire 123 upon. The reference number 202 denotes a free space for the auxiliary towing wire 123 to be freed rearward (i.e. to the right of the wire catching hook 201 in the figure) into.

Although in this second embodiment an example has been described wherein a slide member 199 is movably attached to the auxiliary towing device 117, the invention is not limited to this, and alternatively a member performing the same function as the slide member 199 may be provided on the front of the towing device 116 (see FIG. 15), i.e. projecting toward the braking device 118 or the barrier 113.

Figure 22:
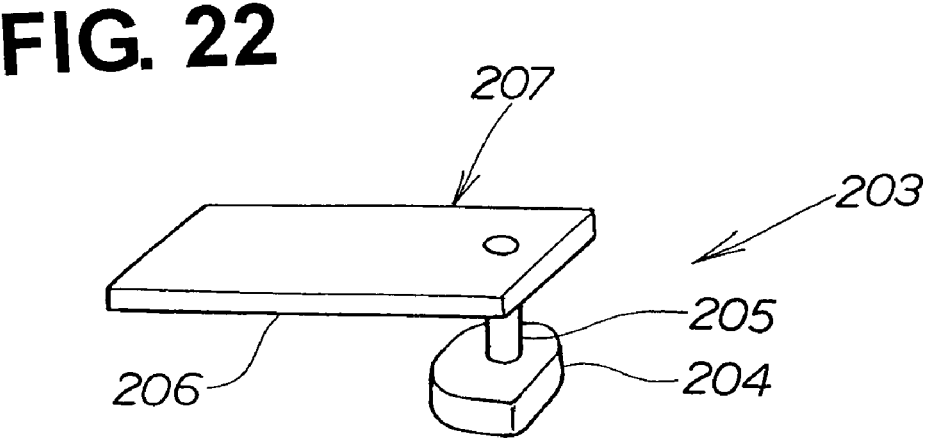
FIG. 22 is a perspective view of a cable gripping mechanism of the auxiliary towing device of the second embodiment of the invention.

FIG. 22 shows the cable gripping mechanism 203 of the auxiliary towing device. This cable gripping mechanism 203 is made up of a cable pressing member 204 for pressing the cable 121 (see FIG. 15), a pivot 205 attached to the cable pressing member 204, and a releasing arm 206 attached to the pivot 205. The pivot 205 and the releasing arm 206 constitute a cable connection releasing mechanism 207 for disconnecting the towing device 117 (see FIG. 21) from the cable 121.

Figure 23A:
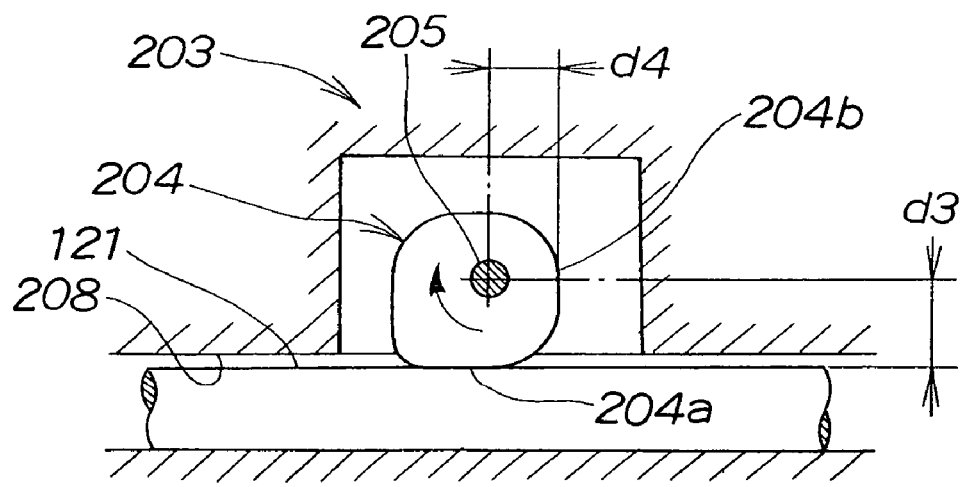
FIG. 23A and FIG. 23B are views showing the movement of the cable gripping mechanism of the auxiliary towing device shown in FIG. 22.
Figure 23B:
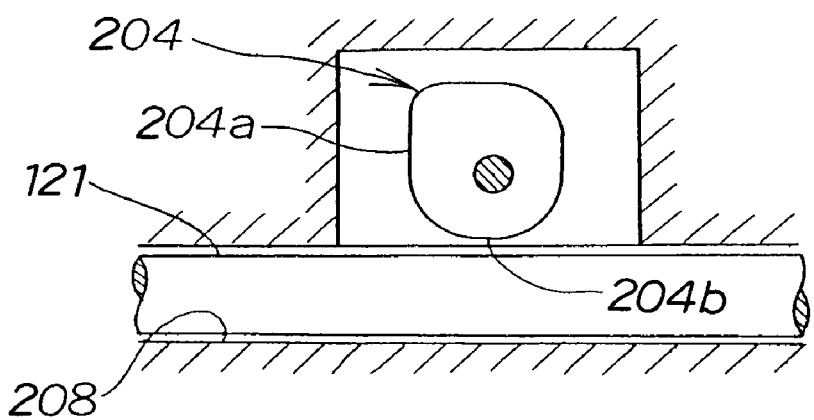
Figure 25:
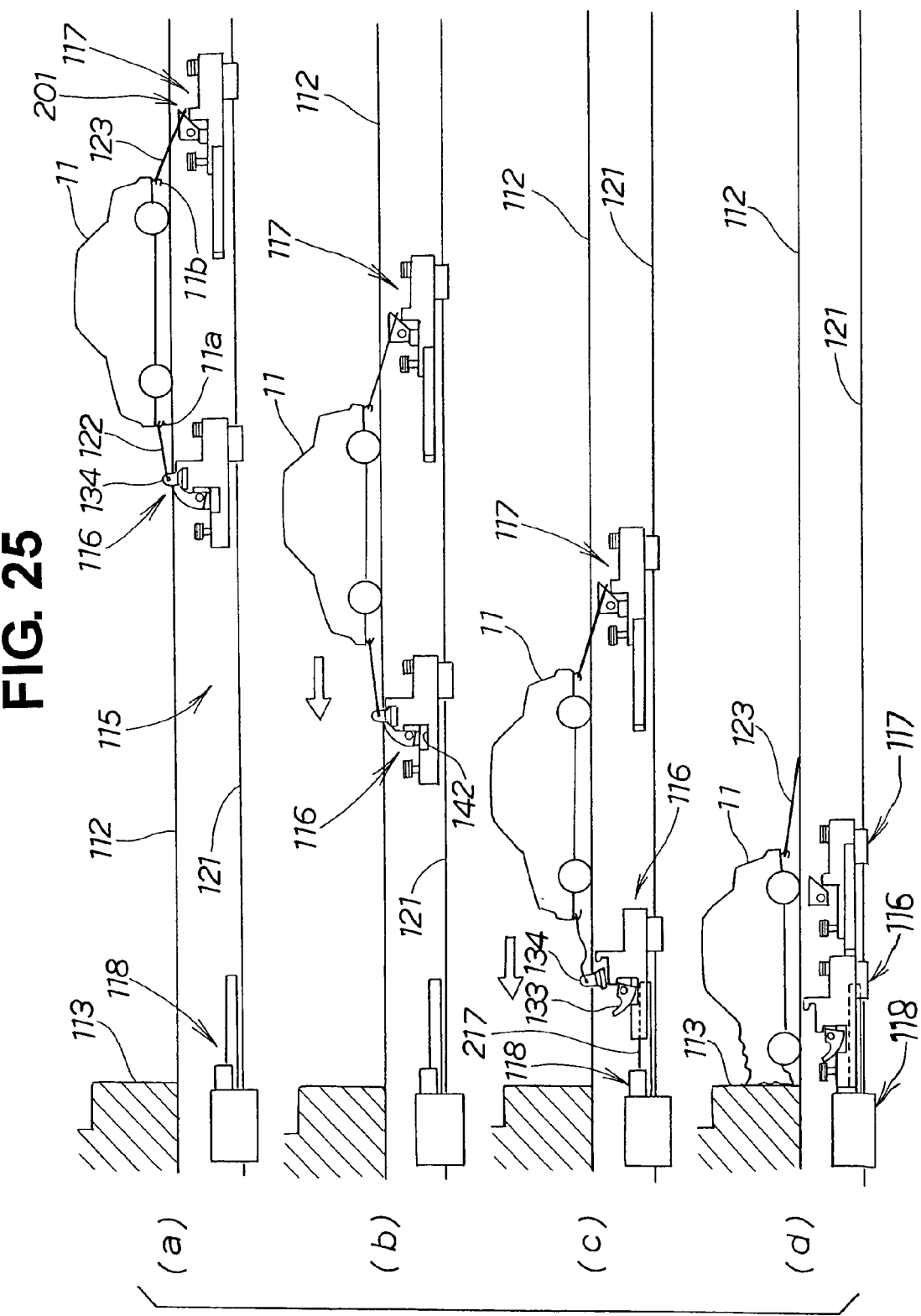
FIG. 25 is a view showing the course of a test vehicle from being at rest to hitting the barrier, in the vehicle crash test apparatus of the second embodiment of the invention.

FIG. 23A and FIG. 23B show the operation of the cable gripping mechanism 203 of the auxiliary towing device of this second embodiment.

In FIG. 23A, the cable pressing member 204 has a rectangular shape with its four corners rounded. If the distance from the center of the pivot 205 to a first side 204a is written d3 and the distance from the center of the pivot 205 to a second side 204b is written d4, d3 and d4 are set so that they have the relationship d3>d4. The reference number 208 denotes a cable hole formed in the downward projection 194 (see FIG. 21) for the cable 121 to pass through. FIG. 23A shows a state wherein the cable 121 is pressed against the inner face of the cable hole 208 with the first side 204a of the cable pressing member 204 and the cable 121 and the auxiliary towing device 117 (see FIG. 21) are thereby connected.

When from this state the cable pressing member 204 is turned through 90° in the direction of the arrow, the state shown in FIG. 23B is reached. That is, the second side 204b of the cable pressing member 204 faces the cable 121. Because, as mentioned above, d3>d4, a gap forms between the second side 204b of the cable pressing member 204 and the cable 121, and the cable 121 moves away from the inner face of the cable hole 208. Consequently, the connection between the cable 121 and the auxiliary towing device 117 (see FIG. 21) is released.

As shown in FIG. 21, the auxiliary towing device 17 has a release operation starting device 210 for effecting release of the connection to the auxiliary towing wire 123 and release of the connection to the cable 121. That is, the release operation starting device 210 is made up of the slide member 199 movable along the tongue parts 181a, 181a provided on the side faces of the base member 181, the cushion material 199a provided on the front end of the slide member 199, and a rear end part 199b (see FIG. 28A) provided on the other end of the slide member 199.

The braking device 118 is shown in FIG. 24. This braking device 118 is a device which the towing device 116 (see FIG. 12) collides with and is stopped by and which softens the impact of this collision. This braking device 118 is made up of a mass 214 serving as a stopper for the towing device 116 to hit, a spring 215 for producing an elastic force in a direction in which it pushes out the mass 214, a case 216 for receiving the mass 214 and the spring 215, and, on a side face of this 216, an arm tipping member 217 consisting of a bar member provided on the case 216 for tipping the release arms 157, 163 (see FIG. 16 and FIG. 17) of the towing device 116. Bushes 218, 218 are provided inside the case 216 to suppress vibration of the cable 121.

The limit releasing device 138 shown in FIG. 15 and the arm tipping member 217 shown in FIG. 24 constitute a releasing mechanism 219.

The operation of a vehicle crash test apparatus 100 according to this second embodiment will now be described, on the basis of FIG. 25 and FIG. 26A through FIG. 26C.

FIGS. 25(a) to (d) show in order the course of a vehicle from being at rest to hitting the barrier, in the vehicle crash test apparatus of the second embodiment.

FIG. 25(a) shows a test vehicle 11 at rest on the road surface 112. The towing device 116 is disposed in the channel 115 in front of and below this test vehicle 11. The front hook 11a provided at the bottom of the front of the test vehicle 11 and the wire connecting member 134 of the towing device 116 are connected by the towing wire 122. The auxiliary towing device 117 is disposed in the channel 115 behind and below the test vehicle 11. The rear hook 11b provided at the bottom of the rear of the test vehicle 11 and the wire catching hook 201 of the auxiliary towing device 117 are connected by the auxiliary towing wire 123. At this time, the towing device 116 and the auxiliary towing device 117 are connected to the cable 121, which is at rest.

In FIG. 25(b), the cable 121 starts to be wound by a winding device not shown in the figures. As a result, the towing device 116 pulls the test vehicle 11, and the auxiliary towing device 117 applies a drag force to the rear of the test vehicle 11 and stabilizes the direction in which the test vehicle 11 is pulled by the towing device 116.

FIG. 25(c) shows a state wherein the arm tipping member 217 of the braking device 118 has hit the releasing arm 157 (see FIG. 16) of the towing device 116 and tipped over the releasing arm 157, and consequently the claw part 133 has swung forward and there has ceased to be any restraint on the wire connecting member 134.

FIG. 25(d) shows the test vehicle 11 having advanced further and the auxiliary towing wire 123 having detached from the auxiliary towing device 117 and the test vehicle 11 having hit the barrier 113. At this time, the towing device 116 is stopped by the braking device 118 and also the auxiliary towing device 117 hits and is stopped by the rear of the towing device 116.

Figure 26A:
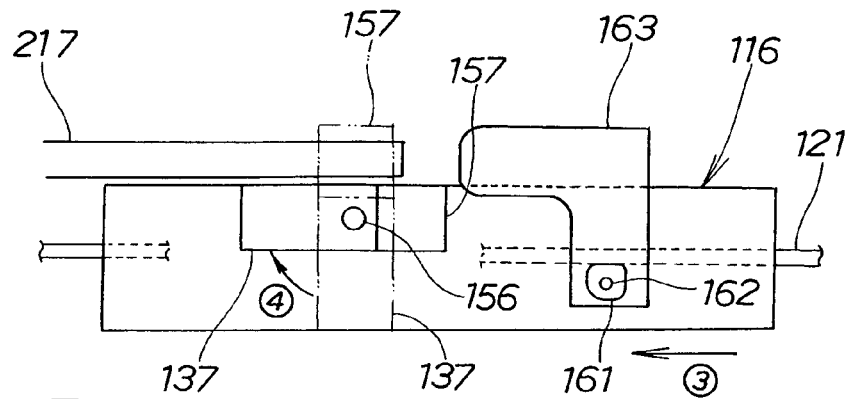
FIG. 26A to FIG. 26C are views showing the connection and release of a towing wire before the crashing of a test vehicle in a vehicle crash test apparatus according to the second embodiment.
Figure 26B:
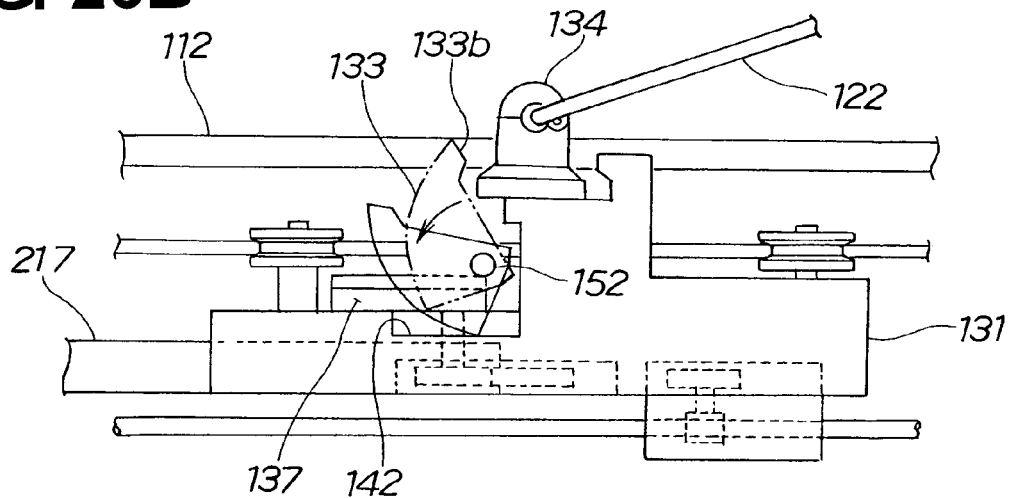
Figure 26C:
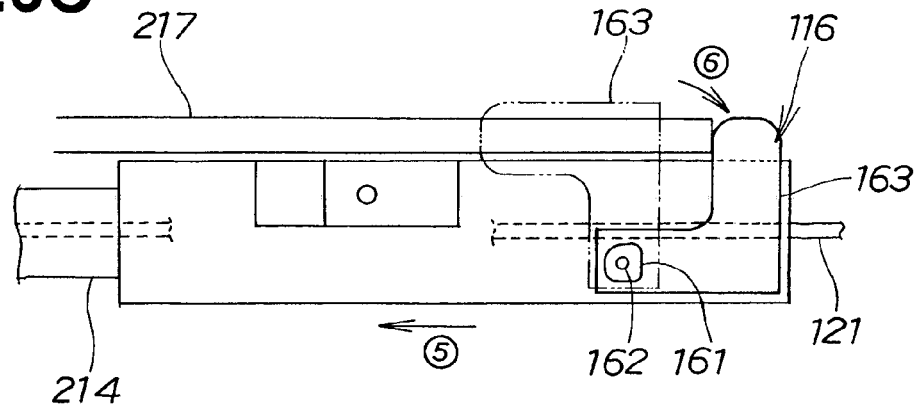

FIG. 26A though FIG. 26C show the state shown in FIG. 25(c) in further detail.

In FIG. 26A, the towing device 116 advances in the direction of the arrow ③, and when the arm tipping member 217 of the braking device 118 (see FIG. 25(c)) strikes the releasing arm 157 of the towing device 116, the releasing arm 157 turns through about 90° from the position shown with double-dotted lines to the position shown with solid lines, and along with this the swing limiting block 137 moves in the direction of the arrow ④.

In FIG. 26B, when the swing limiting block 137 has moved out from below the claw part 133, the claw part 133 tips in the direction of the arrow about the pivot 152. The restraining of the wire connecting member 134 by the front end part 133b of the claw part 133 is released. The wire connecting member 134 moves away from the base member 131 together with the towing wire 122, for example moves to in front of the base member 131, and further moves to below the road surface 112.

In FIG. 26C, when the towing device 116 advances further in the direction of the arrow ⑤ and the arm tipping bar 217 strikes the releasing arm 163 of the towing device 116, the releasing arm 163 turns through about 90° in the direction of the arrow ⑥. As a result, the cable pressing member 161 attached to the releasing arm 163 by the pivot 162 turns and ceases to press the cable 121, and consequently the towing device 116 is disconnected from the cable 121.

FIG. 27 and FIG. 28A through FIG. 28C show an example of a vehicle crash test apparatus for crashing a vehicle into a barrier head-on. Parts the same as parts in the embodiment shown in FIG. 13 have been given the same reference numerals and a detailed description thereof will be omitted.

A vehicle crash test apparatus 220 shown in FIG. 27(a) releases the test vehicle 11 at a position further from the barrier 221 than the vehicle crash test apparatus 100 shown in FIG. 13 (an apparatus for offset collisions). That is, in a head-on collision, because the width B of the barrier 221 is large, it is not necessary for the accuracy of the impact position to be as high as with an offset collision, and therefore the test vehicle 11 does not have to be released in position close to the barrier 221. In construction, the vehicle crash test apparatus 220 differs from the vehicle crash test apparatus 100 in the positions of the barrier 221 and the braking device 118.

In FIG. 27(b), to release the test vehicle 11 in a position further from the barrier 221 than in the case of an offset crash test, as mentioned above, the braking device 118 is disposed not immediately below the barrier 221 but a predetermined distance L away from immediately below the barrier 221 (more precisely, from the impact face 221a of the barrier 221).

The operation of the vehicle crash test apparatus 220 will now be explained.

First, in FIG. 27(a), the test vehicle 11 starts to move, then as shown in FIG. 27(b) the test vehicle 11 advances in the direction of the arrow, and the arm tipping member 217 of the braking device 118 hits the releasing arm 157 of the towing device 116 (see FIG. 26A), and as described earlier the claw part 133 swings forward and the restraining of the wire connecting member 134 by the top of the claw part 133 is released.

As shown in FIG. 27(c), the auxiliary towing device 117 hits the towing device 116, the auxiliary towing wire 123 comes off the wire engaging member 183 of the auxiliary towing device 117, and the test vehicle 11 hits the barrier 221.

Figure 28A:
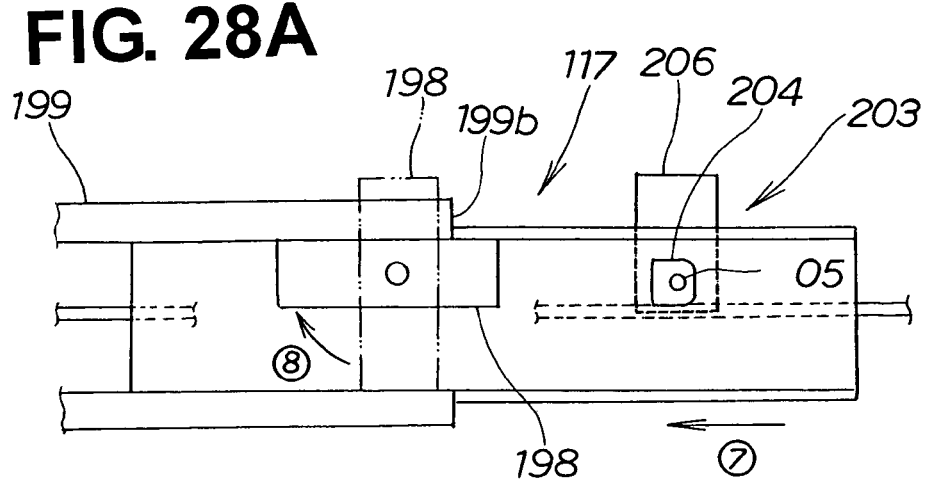
FIG. 28A to FIG. 28C are views showing the operation of another embodiment of the auxiliary towing device of the second embodiment of the invention.
Figure 28B:
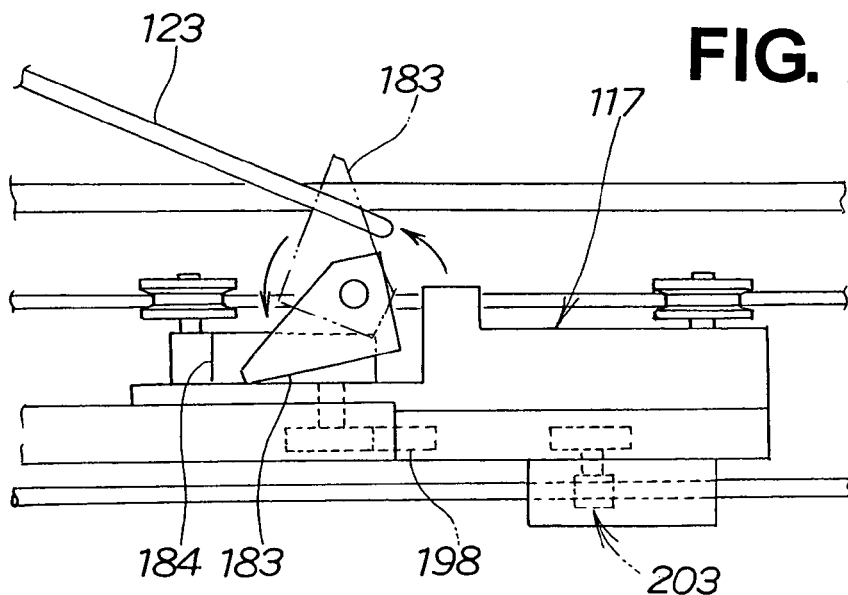
Figure 28C:
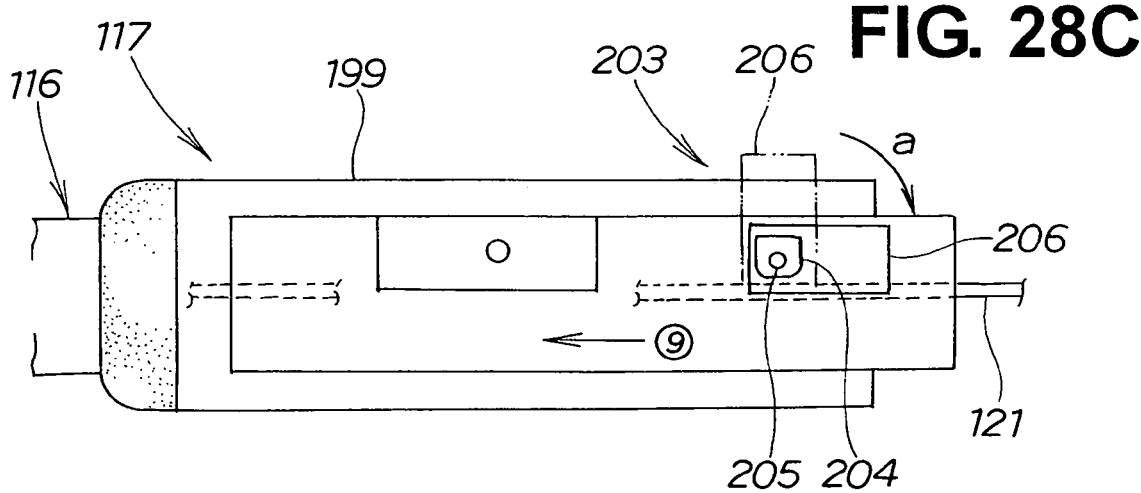

FIG. 28A through FIG. 28C illustrate the operation of FIG. 27(c) specifically.

In FIG. 28A, when the auxiliary towing device 117 collides with the towing device 116 (see FIG. 27(c)) in the direction of the arrow ⑦, the slide member 199 of the auxiliary towing device 117 hits the releasing arm 198 (shown with broken lines), and turns the releasing arm 198 through about 90° in the direction of the arrow ⑧. (The releasing arm 198 shown with solid lines is the arm after turning.) The rear end part 199b serving as a releasing part, as mentioned above, is a part provided on the slide member 199 to release the connection of the auxiliary towing wire 123 (see FIG. 21) and, as will be further discussed later, release the connection of the cable 121.

In FIG. 28B, when the releasing arm 198 turns, because the swing limiting block 184 moves from under the wire engaging member 183 and the wire engaging member 183 turns forward, i.e. in the direction of the arrow, the auxiliary towing wire 123 detaches from the wire engaging member 183. Because the auxiliary towing device 117 thus is disconnected from the test vehicle 11, it has no affect on the further travel of the test vehicle 11.

In FIG. 28C, the auxiliary towing device 117 advances further in the direction of the arrow ⑨, and the slide member 199 of the auxiliary towing device 117 hits the releasing arm 206 of the cable gripping mechanism 203 and tips the releasing arm 206 in the direction of the arrow a. As a result, the cable pressing member 204 of the cable gripping mechanism 203 ceases to press the cable 121, and the auxiliary towing device 117 is separated from the cable 121.

As described above, the towing device 116 and the auxiliary towing device 117 can be used in both a head-on crash test and an offset crash test. Also, if the braking device 118 is made movable, it can be used for both of the tests described above in the vehicle crash test apparatus 100, and compared to when different test equipment is used for head-on crash tests and offset crash tests the cost of the equipment can be reduced.

As described above with reference to FIG. 15 and FIG. 24, in the vehicle crash test apparatus 100 of the second embodiment, the engaging part 134c of the wire connecting member 134 is held removably by the towing device 116. Consequently, when the towing device 116 reaches a position a predetermined distance in front of the barrier 113, if the holding of the wire connecting member 134 by the claw part 133 is released by the releasing mechanism 219 the wire connecting member 134 can be detached from the towing device 116, and it can be ensured that there is nothing projecting from the road surface 112 when and after the test vehicle 11 hits the barrier 113. Consequently, there is no obstructing of the travel of the test vehicle 11, and crash testing of the test vehicle 11 can be carried out much more accurately.

Also, in the second embodiment, as described above with reference to FIG. 15, by the claw part 133 being attached swingably to the base member 131 of the towing device 116, the wire connecting member 134 can be attached and detached easily. Therefore, freeing and attachment of the wire connecting member 134 become easy, and the ease of use of the apparatus is improved.

Also, in the second embodiment, by the simple construction of removably providing a swing limiting block 137 for limiting the swing of the claw part 133 in the range of swing of the claw part 133, the holding of the wire connecting member 34 can be released easily.

And, in the second embodiment, by the towing device 116 moving in connection with the cable 121 being freed from the cable 121 in the proximity of the barrier 113 by the cable releasing mechanism 164, the movement of the towing device 13 can be stopped and preparation for the next test can be carried out.

And, in the second embodiment, by the arm tipping member 217 being provided on the braking device 118, when the towing device 116 is stopped by the braking device 118, the connection of the towing device 116 to the cable 121 can be disconnected without fail by the arm tipping member 217. Therefore, damage suffered when the towing device 116 stops can be suppressed.

Also, with one arm tipping member 217 it is possible to carry out both releasing of the holding of the wire connecting member 134 by the claw part 133 and releasing of the connection of the towing device 116 to the cable 121 made by the cable pressing member 161, and compared to a case where the above-mentioned holding release and connection release are carried out with different arm tipping members, the number of parts can be reduced and the cost of the vehicle crash test apparatus 100 can be cut.

Figure 29A:
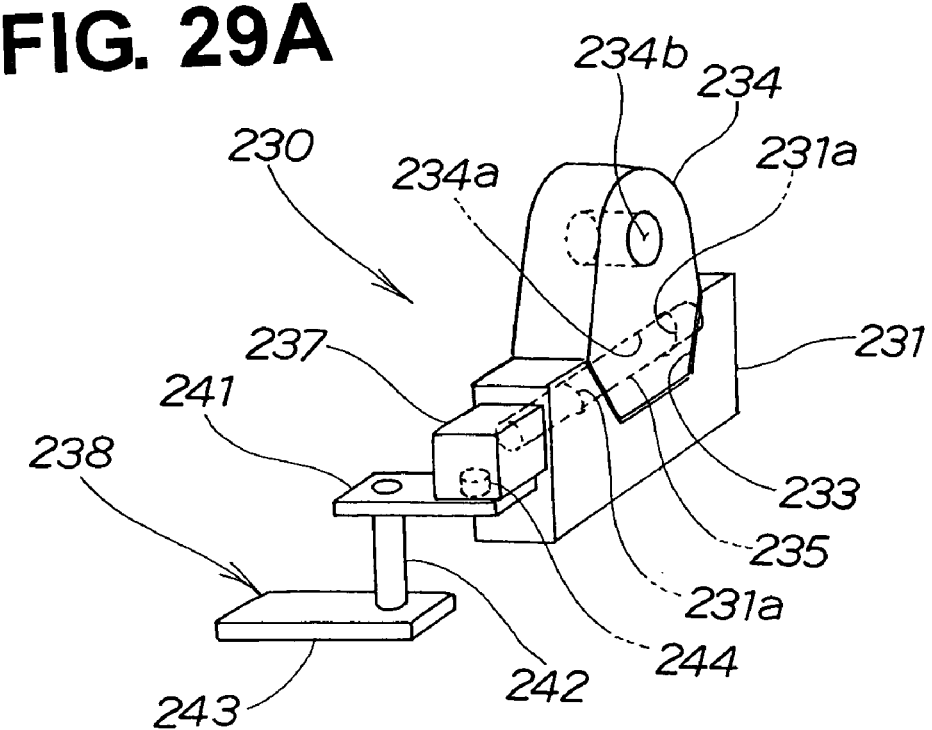
FIG. 29A and FIG. 29B are perspective views showing another embodiment with respect to the towing device of the second embodiment.
Figure 29B:
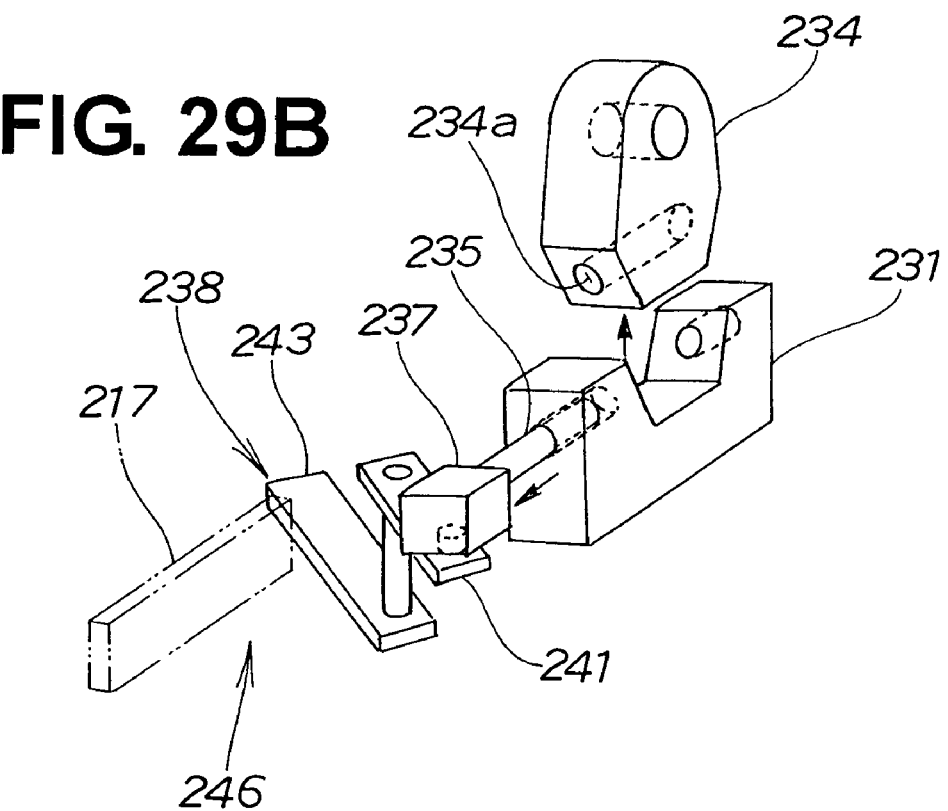

FIG. 29A and FIG. 29B show a towing device of another embodiment of the invention.

In FIG. 29A, a towing device 230 has a base member 231 serving as a base part, a wire connecting member 234, a rod 235 serving as a holding member for holding the wire connecting member 234 on the base member 231, and a freeing mechanism 238 serving as a wire connection releasing mechanism for separating the wire connecting member 234 from the base member 231.

The wire connecting member 234 is fitted in a cutaway part 233 formed in the top of the base member 231. Two through holes 231a, 231a are formed in the base member 231 so that they face each other across the cutaway part 233. A through hole 234a which is continuous with the through holes 231a, 231a formed in the base member 231 when the wire connecting member 234 is fitted in the cutaway part 233 of the base member 231 is formed in the wire connecting member 234. The rod 235 is passed through these through holes 231a, 231a, 234a and holds the wire connecting member 234 to the base member 231. The through hole 234a functions as an engaging part. A block part 237 is attached to one end of the rod 235. This block part 237 is connected to the freeing mechanism 238. The wire connecting member 234 has a wire hole 234b for connecting a towing wire for pulling a test vehicle.

The freeing mechanism 238 is made up of an upper arm 241 connected swingably about a link pin 244 to the block part 237, and a freeing arm 243 attached to the other end of the upper arm 241 by a pivot 242.

As shown in FIG. 29B, if the arm tipping member 217 of the braking device, also shown in FIG. 26A, hits the freeing arm 243, the freeing arm 243 is pushed rearward. Along with this, the upper arm 241 swings and by way of the block part 237 pulls the rod 235 forward. As a result, the rod 235 is pulled out of the through hole 234a of the wire connecting member 234 and the wire connecting member 234 is released from the base member 231.

The freeing mechanism 238 and the arm tipping member 217 provided on the braking device constitute a release mechanism 246.

Thus, in this other embodiment, by the rod 235 being made insertable into through holes 231a, 234a in the base member 231 and the wire connecting member 234 of the towing device 230 to make it engage-able with the through hole 234a, the rod 235 can be made a simple construction and the cost of the rod 135 can be kept down.

Besides head-on crash tests and offset crash tests, the vehicle crash test apparatus of the second embodiment described above can also be applied to tests wherein as the barrier a diagonal barrier is used such that the collision face is slanting with respect to the direction of travel of the test vehicle, and tests wherein a fixed pole is used as the collision object.

The wire catching part shown in the second embodiment does not have to be of an acute angle shape and may alternatively be C-shaped or of an inverted L-shape or an F-shape, and basically may be any shape which is open to the rear.

Figure 31:
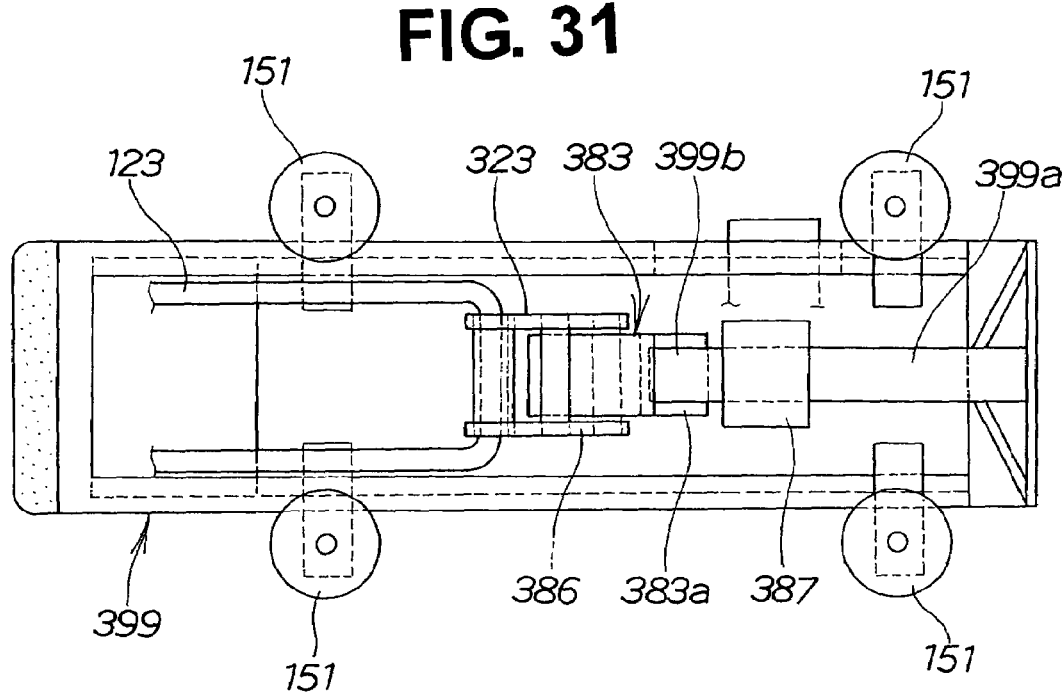
FIG. 31 is a plan view of the auxiliary towing device shown in FIG. 30.
Figure 32:
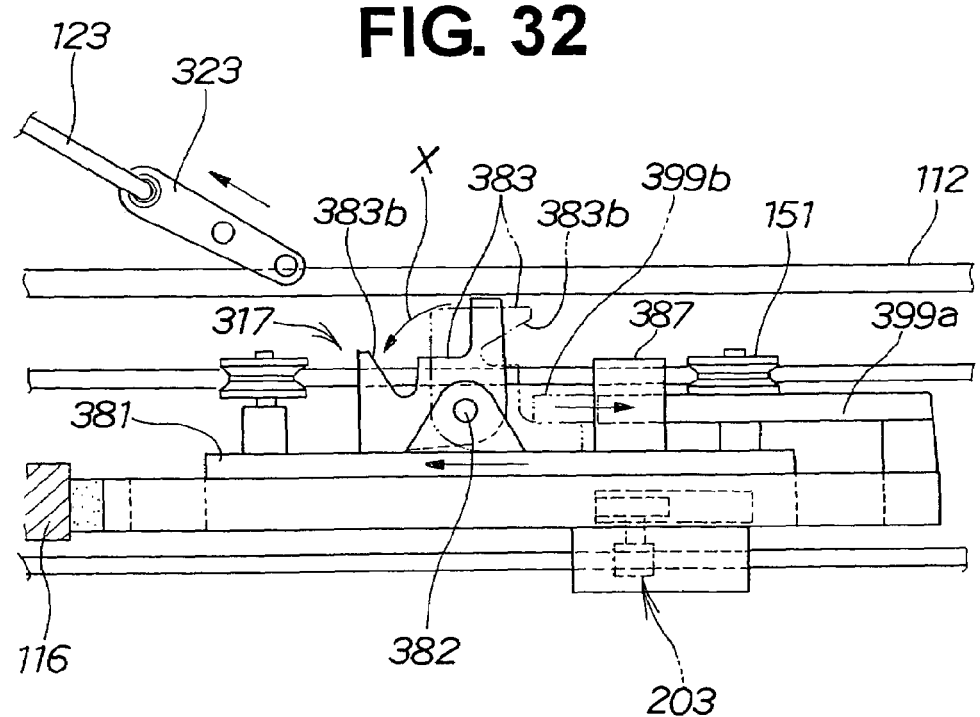
FIG. 32 is a view showing the operation of the auxiliary towing device shown in FIG. 30.

FIG. 30 to FIG. 32 show another embodiment of the auxiliary towing device 117 shown in FIG. 20 and FIG. 21. Parts the same as parts in the auxiliary towing device 117 shown in FIG. 21 have been given the same reference numerals and will not be described again here.

The auxiliary towing device 317 shown in FIG. 30 and FIG. 31 includes a wire engaging member 383 consisting of a hook member for hooking the auxiliary towing wire 123 by way of a link piece 323, and a slide member 399 for engaging with and disengaging from the wire engaging member 383 by sliding.

The wire engaging member 383 is L-shaped and has an engaging part 383a extending rearward and a hook part 383b made by a portion being cut away so that it is open to the rear. One end of the link piece 323 connected to the auxiliary towing wire 123 is engaged with this hook part 383b, and the auxiliary towing device 317 and the test vehicle 11 shown in FIG. 12 are thereby connected. The wire engaging member 383 is swingably attached by way of a pivot 386 to a support member 382 provided on a base member 381 suspended from guide rails 126 on rollers 151.

The slide member 399 has an integral extension part 399a extending upward from its rear end and also extending forward. The front end 399b of this extension part 399a is positioned above the upper face of the engaging part 383a of the wire engaging member 383 and engages with the engaging part 383a. The extension part 399a and its front end 399b constitute the limit removing mechanism shown in FIG. 20 and FIG. 21. The slide member 399 is slidably attached to the base member 381 by its extension part 399a being slidably supported by a guide member 387 provided on the base member 381.

Next, the operation of the auxiliary towing device 317 will be described, on the basis of FIG. 32.

When it hits the rear end of the towing device 116 positioned forward of the auxiliary towing device 317, that is, when the slide member 399 hits the rear end of the towing device 116, the slide member 399 slides rearward while supported on the guide member 387. With the rearward sliding of the slide member 399, the extension part 399a also slides rearward along the guide member 387 at the same time. As a result of this rearward sliding of the extension part 399a, the front end 399b thereof and the engaging part 383a of the wire engaging member 383 are disengaged. Because it is being pulled by the auxiliary towing wire 123, the wire engaging member 383 swings counterclockwise about the pivot 386 as shown by the arrow X. Consequently, the hook part 383b of the wire engaging member 383 and the link piece 323 disengage, and the auxiliary towing device 317 is uncoupled from the test vehicle 11 shown in FIG. 12.

That is, when the auxiliary towing device 317 collides with the rear end of the towing device 116, by way of the slide member 399 the limit removing mechanism works, and the connection of the wire engaging member 383 and the link piece 323 is released.

Because the cable gripping mechanism 203 is essentially the same in construction and operation as that shown in FIG. 22, FIG. 23A and FIG. 23B, it will not be described again here.

Thus, with the auxiliary towing device 317 of the embodiment shown in FIG. 30 through FIG. 32, because the limit removing mechanism for removing the limit on the swing of the wire engaging member 383 is integral with the slide member 399, it does not have to be made a separate constituent member like the limit removing mechanism of the embodiment shown in FIG. 20 and FIG. 21, and its construction can be made simple.

Figure 33:
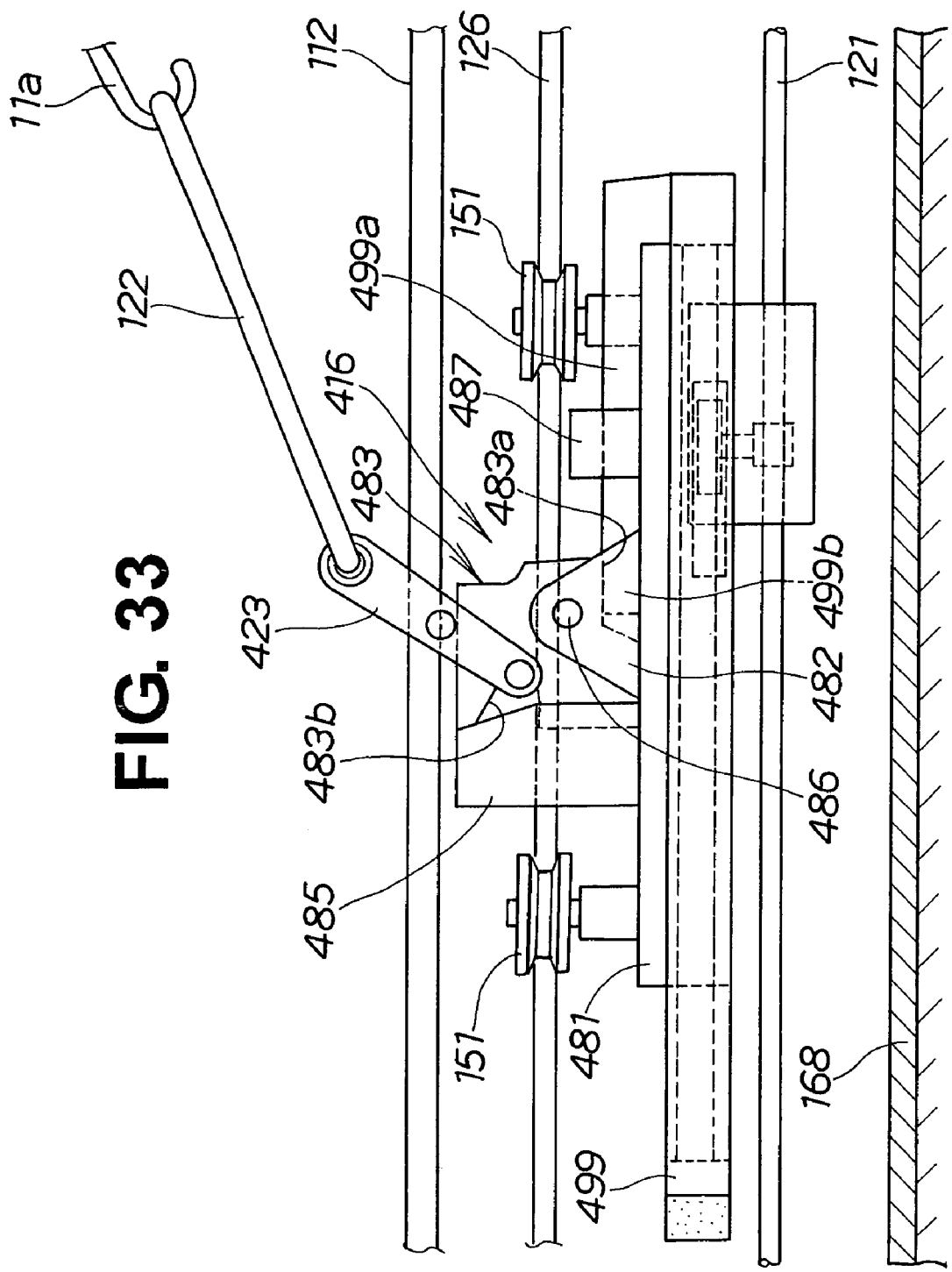
FIG. 33 is a side view showing a further embodiment of the towing device of the second embodiment.
Figure 34:
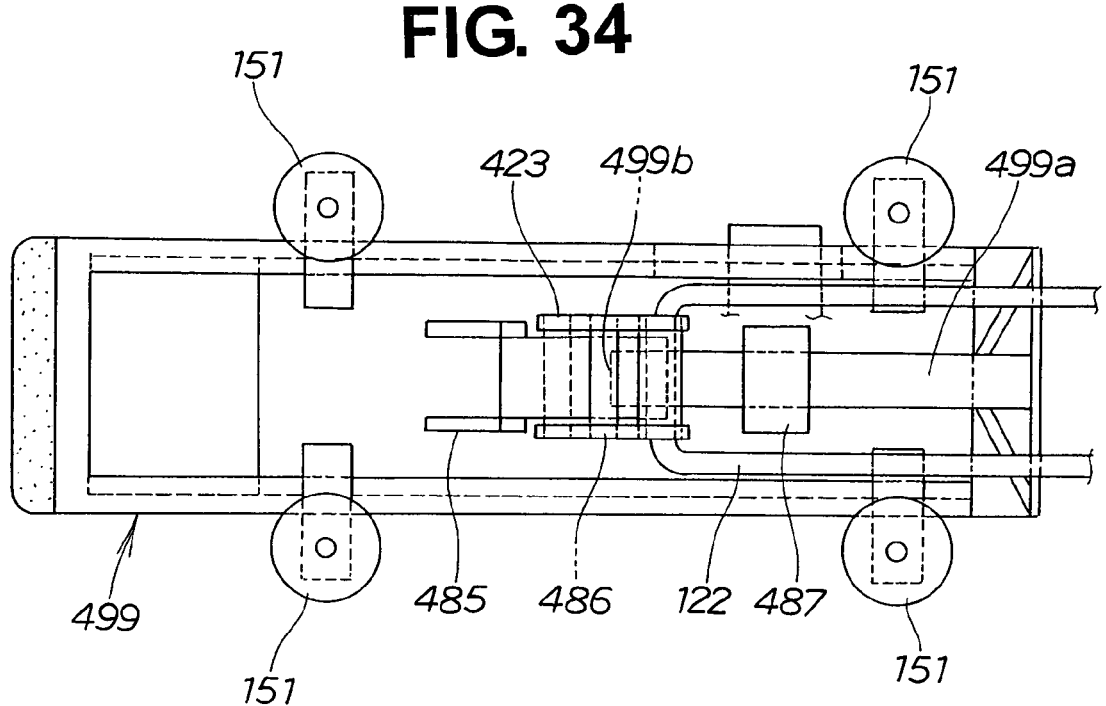
FIG. 34 is a plan view of a towing device shown in FIG. 33.

FIG. 33 and FIG. 34 show another embodiment of the towing device 116 shown in FIG. 14 and FIG. 15. Parts the same as parts in the towing device 116 shown in FIG. 15 have been given the same reference numerals and will not be described again here.

The towing device 416 shown in FIG. 33 and FIG. 34 has substantially the same construction as the auxiliary towing device 317 shown in FIG. 30 and FIG. 31. The towing device 416 of this embodiment has the characterizing feature that it is positioned below the road surface 112. The towing device 416 of this embodiment includes a wire engaging member 483 consisting of a hook member for hooking the towing wire 122 by way of a link piece 423, and a slide member 499 for engaging with and disengaging from the wire engaging member 483 by sliding.

The wire engaging member 483 has an engaging part 483a where the lower face of its rear part is cut away so that it is open to the rear and downward, and a hook part 483b where it is cut away so that it is open to the front. One end of the link piece 423 connected to the towing wire 122 is engaged with the hook part 483b, and the towing device 416 and the test vehicle 11 shown in FIG. 12 are thereby connected. The wire engaging member 483 is swingably attached by way of a pivot 486 to a support member 482 provided on a base member 481 suspended from guide rails 126 on rollers 151.

The slide member 499 has an integral extension part 499a extending forward from its rear end. The front end 499b of this extension part 499a fits in and engages with the engaging part 483a of the wire engaging member 483. As a result of this engagement the wire engaging member 483 does not swing. The front end 499b of this extension part 499a constitutes the limit removing mechanism shown in FIG. 14 and FIG. 15. The slide member 499 is slidably supported on the base member 481 by the extension part 499a being slidably supported by a guide member 487 provided on the base member 481. Because the towing device 416 is a device for pulling the test vehicle 11 shown in FIG. 12 by way of the towing wire 122, a large tensile force acts on the wire engaging member 483, and it is conceivable that lateral vibration could occur. Because of this, to prevent lateral vibration of the wire engaging member 483, the sides of the wire engaging member 483 are sandwiched by anti-vibration buttressing plates 485 to provide stability.

Figure 35:
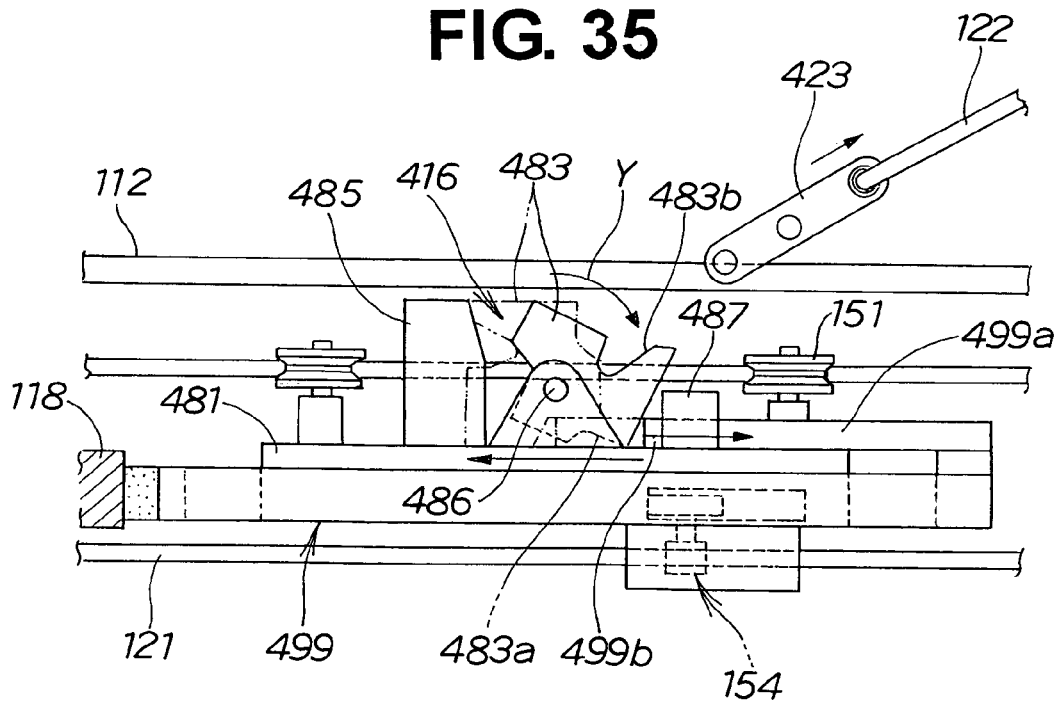
FIG. 35 is a view showing the operation of the towing device shown in FIG. 33.

Next, the operation of the towing device 416 will be described, on the basis of FIG. 35.

When it hits the braking device 118 positioned in front of the towing device 416, that is, when the slide member 499 hits the braking device 118, the slide member 499 slides rearward while supported by the guide member 487. With this rearward sliding, the extension part 499a also slides rearward along the guide member 487 at the same time. As a result of this retreat of the extension part 499a, the front end 499b thereof and the engaging part 483a consisting of a cutaway part of the wire engaging member 483 disengage. Because the wire engaging member 483 is being pulled by the towing wire 122, it swings about the pivot 486 in the clockwise direction as shown by the arrow Y, i.e. rearward. The hook part 483b of the wire engaging member 483 and the link piece 423 disengage, and the towing device 416 is uncoupled from the test vehicle 11 shown in FIG. 12.

That is, when the towing device 416 hits the braking device 118, the limit removing mechanism works by way of the slide member 499, and the connection of the wire engaging member 483 and the link piece 423 is disconnected.

Because the cable gripping mechanism 154 is essentially the same in construction and operation as that shown in FIG. 17, FIG. 18A and FIG. 18B, it will not be described again here.

Thus with the towing device 416 of the embodiment shown in FIG. 33 through FIG. 35, the upper end face of the towing device 416 can be disposed in a position below the road surface 112, and at the time of a crash test it does not constitute an obstruction to the traveling test vehicle. Also, because the limit removing mechanism for removing the limit on the swing of the wire engaging member 483 is formed integrally with the slide member 499, a separate limit removing mechanism is not necessary and the construction becomes simple.

FIG. 36 through FIG. 44 show a vehicle crash test apparatus of a third embodiment of the invention.

Figure 36:
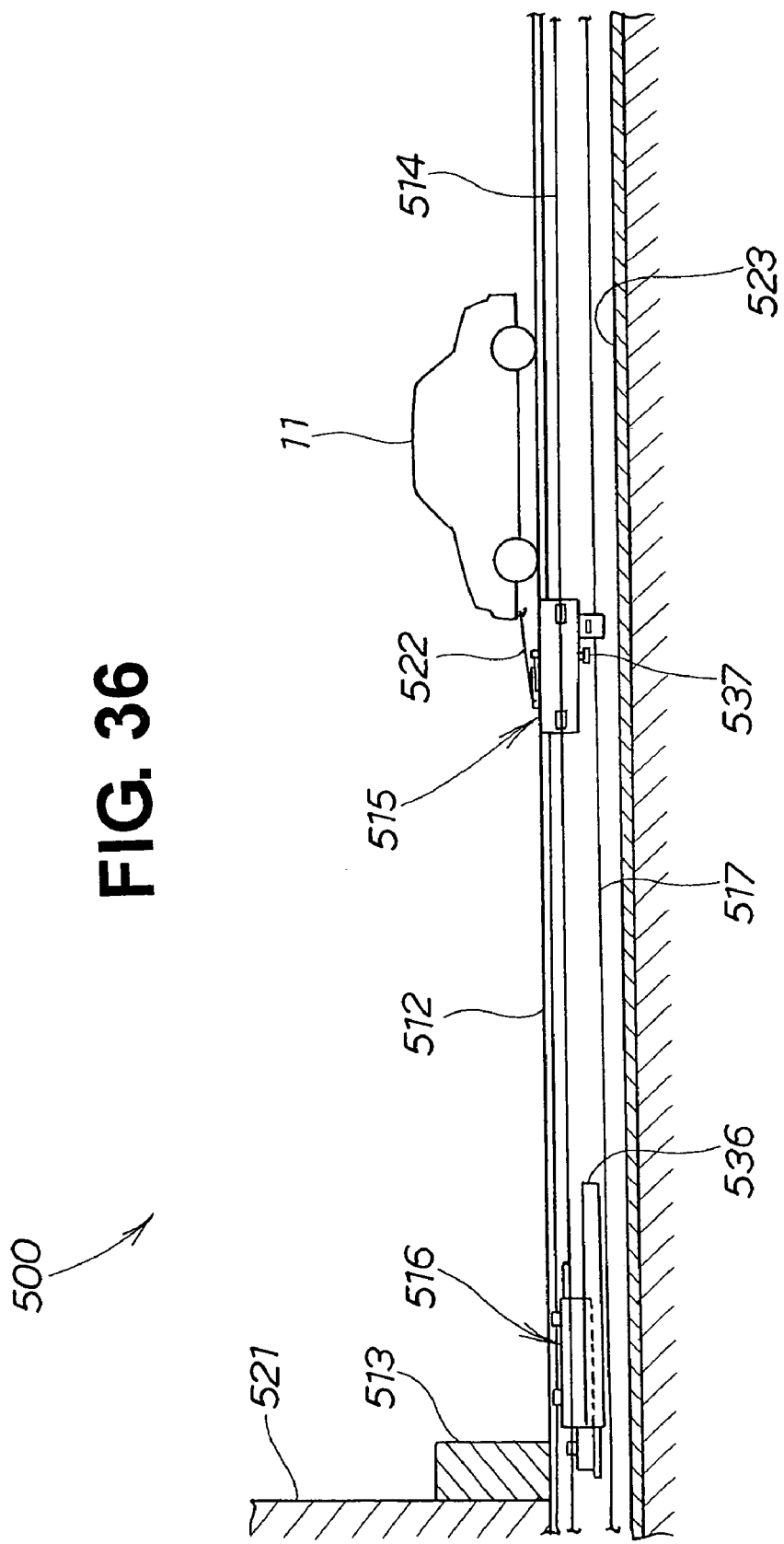
FIG. 36 is a schematic view of a vehicle crash test apparatus according to a third embodiment.

Referring to FIG. 36, the vehicle crash test apparatus 500 of this third embodiment has a road surface 512 on which travels a test vehicle 11. The road surface 512 has at one end thereof a barrier 513 for the test vehicle 11 to collide with. Below the road surface 512 is formed a channel 523. A towing device 515 for pulling the test vehicle 11 toward the barrier 513 along guide rails 514 is disposed in front of and below the test vehicle 11. A braking device 516 for stopping this towing device 15 is provided below the road surface 512 in the proximity of the barrier 513. A cable 517 is detachably connected to the towing device 515 and is drawn toward the barrier 513 by being wound onto a drum not shown in the drawings. The barrier 513 is fixed by a fixed wall 521. The test vehicle 11 is connected to the towing device 15 by a towing wire 522. The guide rails 514, the towing device 515, the braking device 516 and the cable 517 are disposed in the channel 523.

Figure 37:
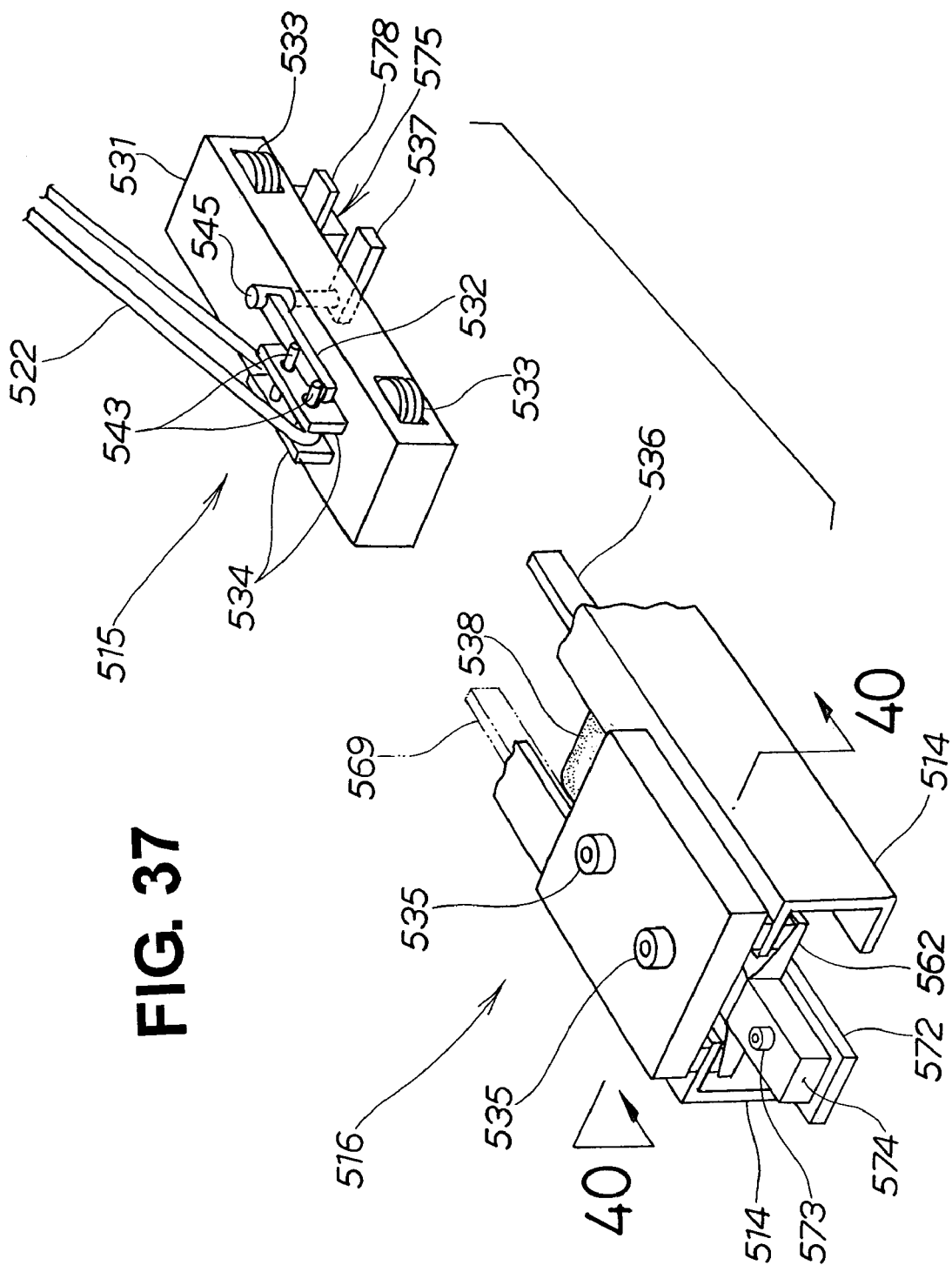
FIG. 37 is a perspective view of a towing device and braking device shown in FIG. 36.
Figure 38:
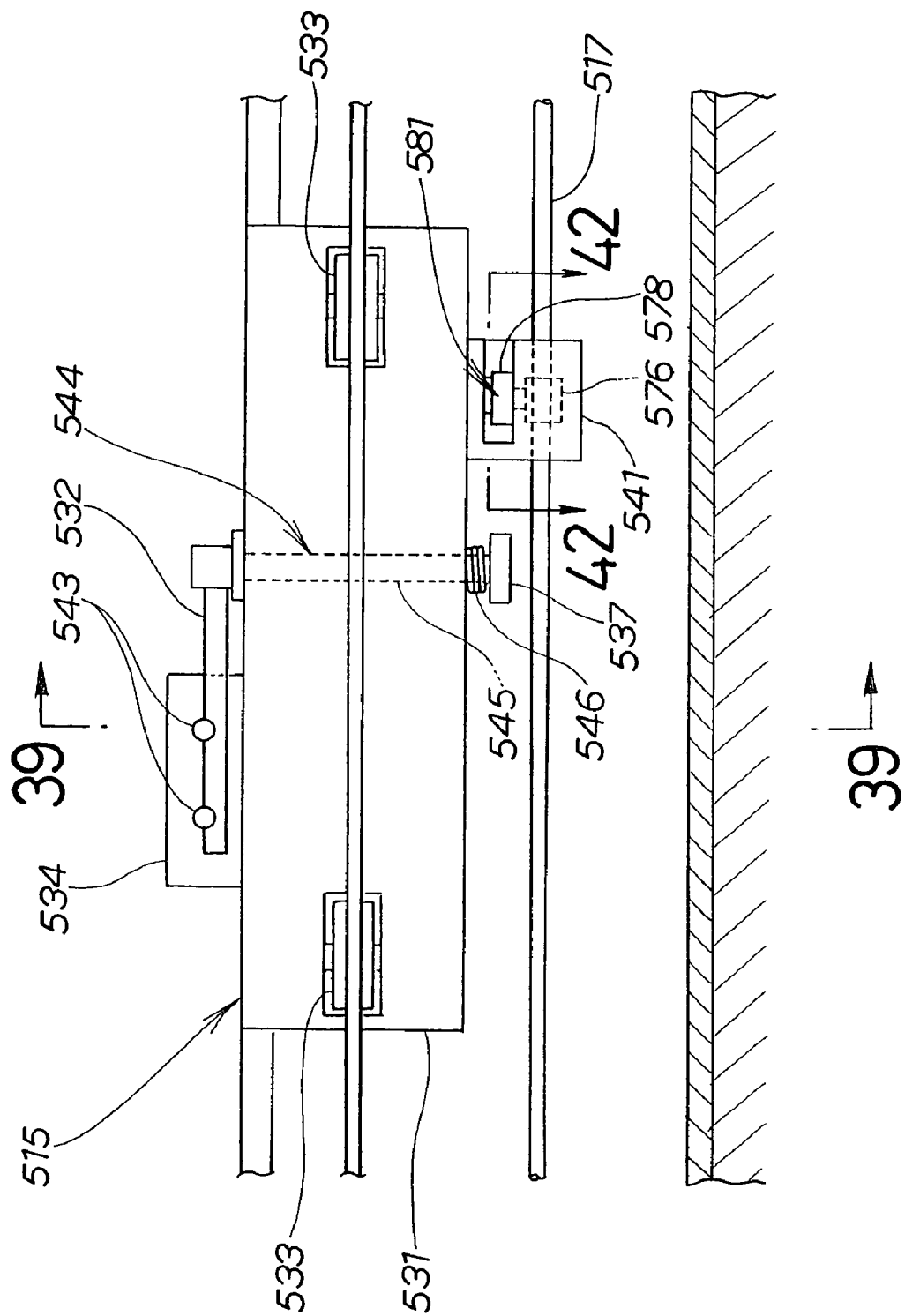
FIG. 38 is a side view of the towing device shown in FIG. 37.

As shown in FIG. 37 and FIG. 38, the towing device 15 has a device proper 531. A wire connecting member 532 is swingably attached to this device proper 531. One end of the towing wire 522 is connected to the wire connecting member 532. The device proper 531 has a plurality of rollers 533 partly exposed from its side faces. These rollers 533 roll along the guide rails 514, 514. The device proper 531 has vertical plates 534, 534 attached to its upper face in parallel with each other. These vertical plates 534, 534 are provided to prevent the towing wire 522 hooked on the wire connecting member 532 from coming off. A cable connecting part 541 for connecting the towing device 515 to the cable 517 is provided below the device proper 531.

Two bars 543, 543 for hooking the towing wire 522 around are fixed to the wire connecting member 532, which consists of an arm member, with a front-rear spacing between them.

A swing-driving member 544 for swinging the wire connecting member 532 is made up of a pivot 545 attached to the wire connecting member 532 and rotatably mounted to the device proper 531, a release arm 537 attached to the bottom of the pivot 545, and a twist coil spring 546 for pushing the wire connecting member 532 against one of the vertical plates 534.

When the towing device 515 pulls the test vehicle 11, the cable connecting part 541 connects the towing device 515 to the cable 517, and when the towing device 515 hits the braking device 516, by an arm tipping bar 536 attached to the braking device 516 abutting with a cable connection releasing mechanism (the details of which will be discussed later), the towing device 515 is disconnected from the cable 517.

The braking device 516 is attached repositionably by sandwiching with bolts 535, 535 to the upper parts of the guide rails 514, 514, so that its installation location can be changed easily.

The reference number 536 denotes an arm tipping bar for tipping the release arm 537 to release the connection of the towing device 515 and the towing wire 522. The reference number 538 denotes a cushion member for softening the impact of the collision when the towing device 515 is stopped by the braking device 516. The arm tipping bar 536 is a connection releasing member for releasing the connection between the wire connecting member 532 and the towing wire 522 and disconnecting the test vehicle 11 from the towing device 515 by swinging the wire connecting member 532 by tipping the release arm 537 of the swing-driving member 544.

Figure 39:
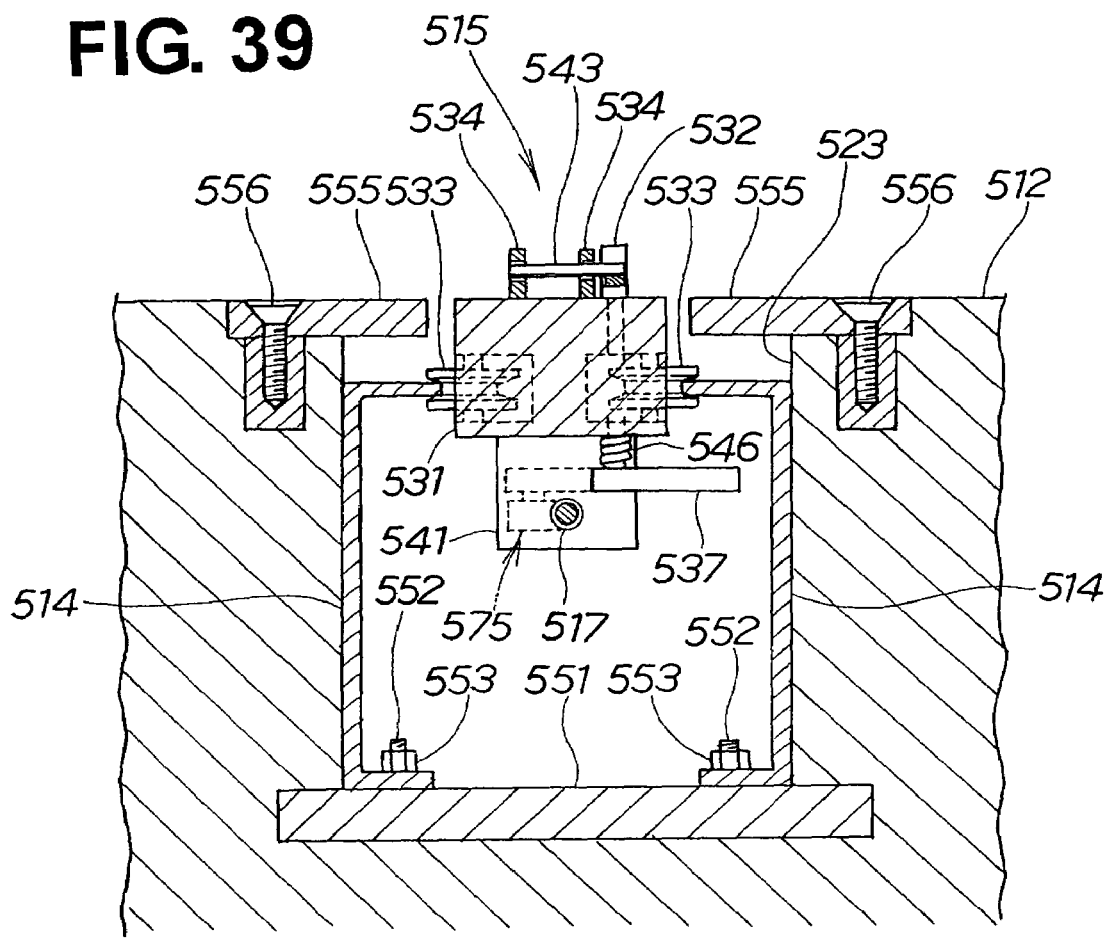
FIG. 39 is a sectional view of the towing device cut along the line 39—39 of FIG. 38.

As shown in FIG. 39, a bottom plate 551 is provided in the channel 523. The left-right pair of guide rails 514, 514 are fixed with bolts 552, 552 and nuts 553, 553 to this bottom plate 551. The towing device 515 is suspended from the guide rails 14, 14 by the multiple rollers 533. The reference numbers 555, 555 denote cover members attached with multiple bolts 556 to the road surface 512 so as to project out over the channel 523 from the road surface 512.

Figure 40:
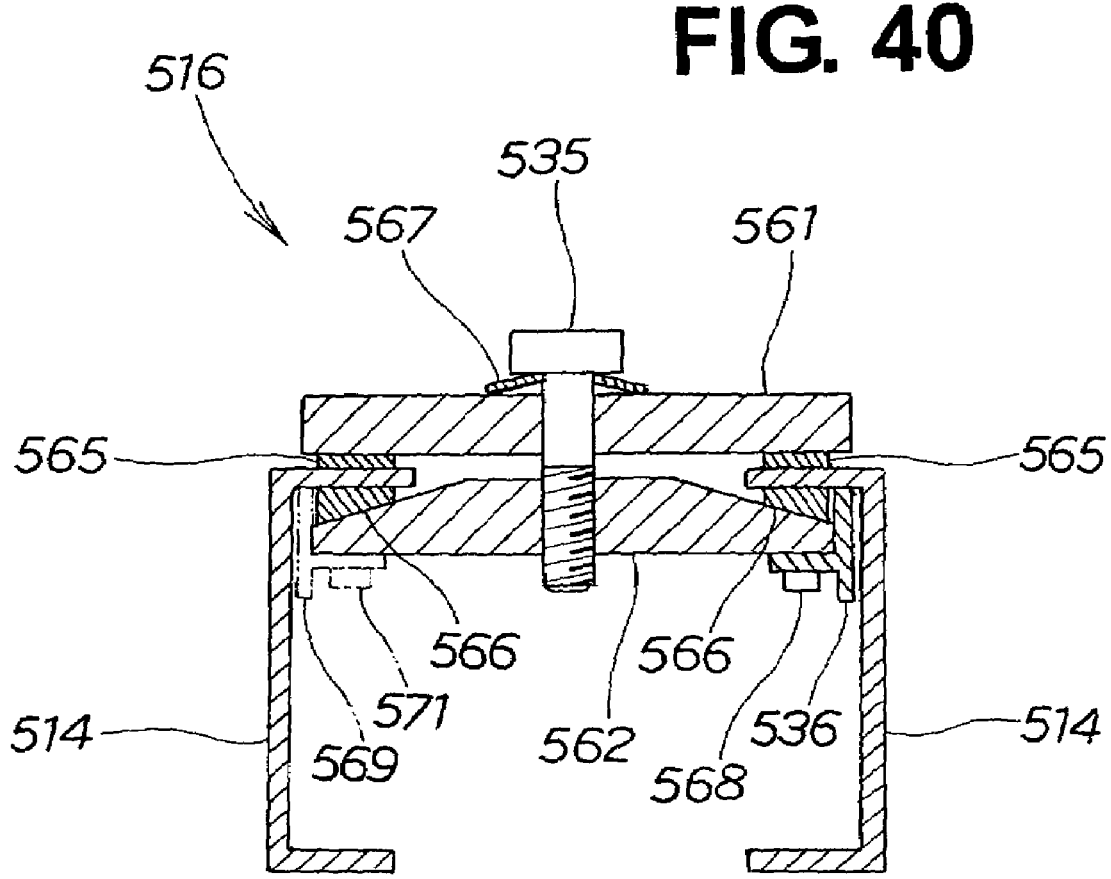
FIG. 40 is a sectional view of the braking device cut along the line 40—40 in FIG. 37.

The braking device 516, as shown in FIG. 40, is made up of an upper member 561 and a lower member 562 sandwiching upper parts of the guide rails 514, 514, the bolts 535, 535 for clamping the upper member 561 and the lower member 562 together, and the arm tipping bar 536, which is attached to the side of the lower member 562.

The reference numbers 565, 565 denote spacers interposed between the guide rails 514, 514 and the upper member 561. The reference numbers 566, 566 denote spacers interposed between the guide rails 514, 514 and the lower member 562. The reference number 567 denotes a plate spring. The reference number 568 denotes a bolt for attaching the arm tipping bar 536 to the lower member 562. The reference number 569 denotes an arm tipping bar, for example, in FIG. 39, when the release arm 537 is made to project from the opposite side face (the left side in the figure) of the towing device 515, attached to tip the release arm 537. In short, the arm tipping bar 536, 569 is attached in accordance with the position of the release arm 537. The reference number 571 denotes a bolt for fixing the arm tipping bar 569 to the lower member 562.

The braking device 516 can be set in a required position by the bolts 535, 535 being loosened and the braking device 516 being moved along the guide rails 514, 514 and the bolts 535, 535 then being tightened again.

As shown in FIG. 37, the braking device 516 also includes a support plate 572 attached to the bottom of the lower member 562 and extending in the direction of the barrier 513 (see FIG. 36), and a weight 574 attached with a bolt 573 to this support plate 572.

Because the arm tipping bar 536 (or arm tipping bar 569) is a member extending in cantilever style toward the towing device 515, the above-mentioned weight 574 is provided on the barrier side, the opposite side to the direction in which the arm tipping bar 536 extends, to balance the weight of this arm tipping bar 536. By this means, for example when the arm tipping bar 536 has hit the release arm 537 and a release arm 578 (discussed in detail later), the end of the arm tipping bar 536 can be prevented from vibrating and rattling with the weight 74.

Figure 41:
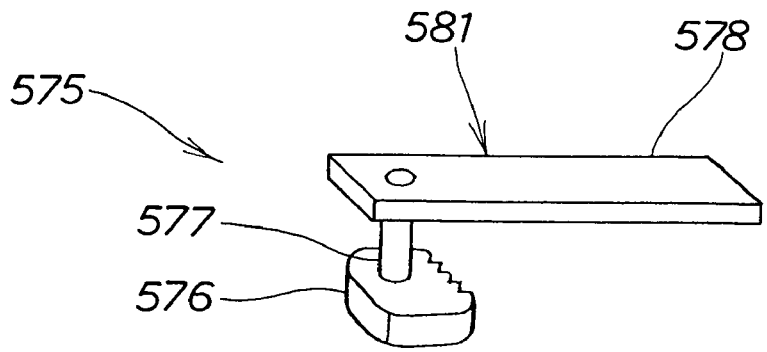
FIG. 41 is a perspective view of a cable gripping mechanism shown in FIG. 38.

FIG. 41 shows a cable gripping mechanism 575 for connecting the towing device 515 to the cable 517 shown in FIG. 39, or releasing this connection. The cable gripping mechanism 575 is made up of a cable pressing member 576 serving as a cable connecting member for pressing the cable 517, a pivot 577 attached to this cable pressing member 576, and a release arm 578 attached to the pivot 577. The pivot 577 and the release arm 578 constitute a cable connection releasing mechanism 581 for releasing the connection of the cable 517 and the towing device 515.

The operation of the cable gripping mechanism 575 will now be described, on the basis of FIG. 42A and FIG. 42B.

Figure 42A:
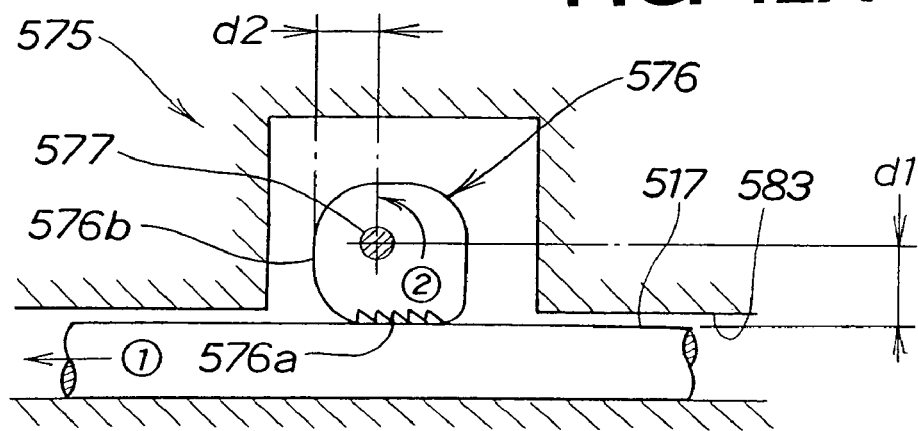
FIG. 42A and FIG. 42B are schematic views showing the operation of the cable gripping mechanism shown in FIG. 41.

As shown in FIG. 42A, the cable pressing member 576 has a rectangular shape with its four corners rounded. If the distance from the center of the pivot 577 to a first side 576a formed in the shape of saw teeth is written d1 and the distance from the center of the pivot 577 to a second side 576b is written d2, d1 and d2 are set so that they have the relationship d1>d2. The reference number 583 denotes a cable hole for the cable 517 to pass through provided in the cable connecting part 541 (see FIG. 39). With the first side 576a of the cable pressing member 576 the cable 517 is pressed against the inner face of the cable hole 583 and the cable 517 and the towing device 515 (see FIG. 39) are thereby connected. When the cable 517 is pulled in the direction of the arrow ①, the first side 576a shaped like saw teeth bites into the cable 517, and the connection becomes strong.

Figure 42B:
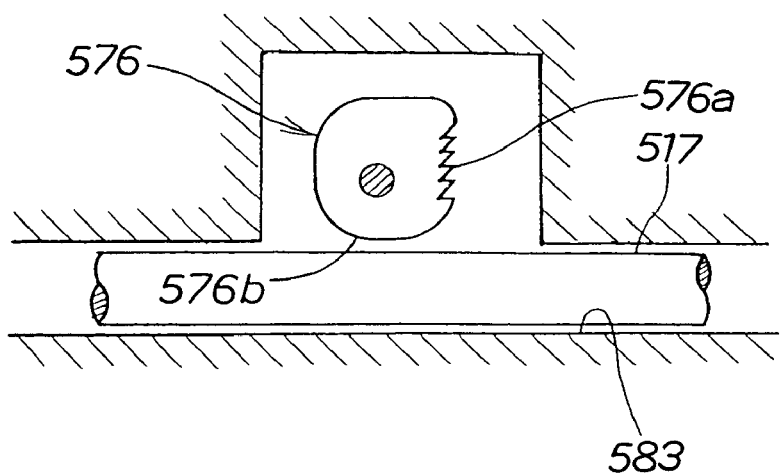

When from this state the release arm 578 shown in FIG. 41 is turned and the cable pressing member 576 is turned through 90° in the counterclockwise direction as shown by the arrow ②, the state shown in FIG. 42B is reached. That is, the second side 576b of the cable pressing member 576 faces the cable 517. Because, as mentioned above, d1>d2, a gap forms between the second side 576b of the cable pressing member 576 and the cable 517, and the cable 517 moves away from the inner face of the cable hole 583. Consequently, the connection between the cable 517 and the towing device 515 is released.

Next, the operation of the vehicle crash test apparatus 500 of the third embodiment described above will be described, on the basis of FIG. 43 and FIG. 44.

As shown in FIG. 43, the test vehicle 11 is pulled by the towing device 515 from the position shown with broken lines, and the test vehicle 11 is made to collide with the barrier 513 as shown with solid lines. The towing device 515 and the test vehicle 11 are disconnected immediately before impact. This disconnection will be described with reference to FIG. 44.

Figure 44:
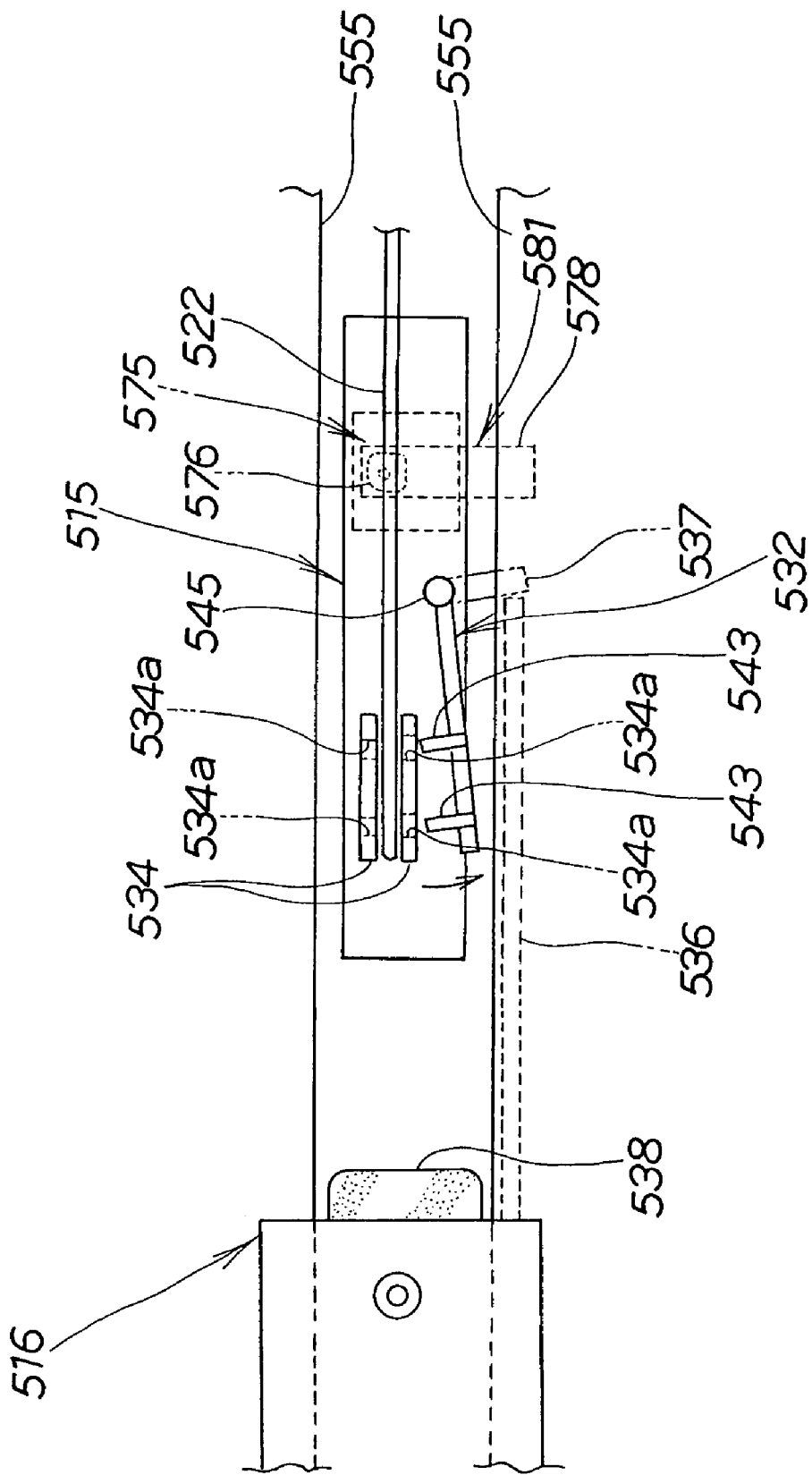
FIG. 44 is a view showing the state immediately before the towing device of the third embodiment of the invention hits the braking device.

As shown in FIG. 44, immediately before the towing device 515 collides with the braking device 516, when the release arm 537 of the towing device 515 hits the arm tipping bar 536 of the braking device 516, the wire connecting member 532 turns in the counterclockwise direction as shown with an arrow about the pivot 545. The bars 543, 543, which had been inserted in the respective bar insertion holes 534a, 534a of the vertical plates 534, 534, come out of the bar insertion holes 534a, 534a as the wire connecting member 532 turns. By this means, the towing wire 522 is detached from the bars 543, 543. As a result, the test vehicle 11 is disconnected from the towing device 515.

When the test vehicle 11 advances further, the release arm 578 strikes the arm tipping bar 536, and because the release arm 578 turns rearward, the connection between the cable 517 (see FIG. 43) and the towing device 515 is released.

After this, the towing device 15 stops, with the shock of the collision being softened by the cushion member 538 of the braking device 516.

Although in the third embodiment, as shown in FIG. 40, an example has been shown wherein the arm tipping bar 536 is attached with bolts 568 to the lower member 562 of the braking device 516, in this invention, alternatively, the part constituting the arm tipping bar may be provided integrally with the lower member 562, by extending a part of the lower member 562.

Thus, with the vehicle crash test apparatus of this third embodiment, by the braking device 516 and the arm tipping bar 536 being movably attached to the guide rails 514, 514, the braking device 516 and the arm tipping bar 536 can be set to a desired position easily and swiftly, and crash test conditions involving various different set positions of the braking device 516 and the arm tipping bar 536 can be set. Also, besides the set positions of the braking device and the connection releasing member being different depending on the respective test conditions, compared to when test equipment with which the braking device and the connection releasing member cannot be moved is used, the cost of crash tests can be reduced.

Although in the foregoing embodiments examples where shown in which the vehicle crash test apparatus had both a towing device and an auxiliary towing device, the invention is not limited to this, and alternatively just a towing device may be provided.

INDUSTRIAL APPLICABILITY

By forming a channel below a road surface, receiving in the channel a towing device for pulling a test vehicle, a left-right pair of guide rails for guiding the towing device in the direction of a barrier, and a braking device, and disposing the towing device so as to suspend it between the guide rails, the space between the guide rails can be used effectively. Also, the towing device and so on are disposed in positions below the road surface, travel of the test vehicle is not obstructed, crash tests can be carried out with good precision, and thus the invention is useful to the vehicle manufacturing industry.

What is claimed is:

1. A vehicle crash test apparatus comprising: a road surface for a test vehicle to travel on;
   a barrier disposed at one end of the road surface;
   a left-right pair of guide rails disposed below and in the proximity of the road surface; and
   a towing device suspended movably between the left and right guide rails, to lead a test vehicle on the road surface to the barrier, so that the test vehicle is pulled to the proximity of the barrier using the towing device, and is disconnected from the towing device at a position a predetermined distance in front of the barrier to cause and the test vehicle to collide with the barrier, wherein said towing device has a pivotally movable or removable wire holding portion for temporarily holding a towing wire connected to the test vehicle, and at least after the towing device is disconnected from the vehicle through pivotal movement or removal of the wire holding portion relative to a body of the towing device, the wire holding portion does not protrude above the road surface.

2. A vehicle crash test apparatus according to claim 1, wherein the towing device comprises:
   a main tractor part mounted movably on the left and right guide rails and forming the body of the towing device;
   a hook pivotally connected to the main tractor part for hooking the towing wire connected to the test vehicle, the hook forming the wire holding member hook holding member;
   a slide member disposed below the hook and movably mounted on the main tractor part to undergo sliding movement in a horizontal direction through a fixed distance relative to the main tractor part; and
   a slide member holding part provided on the main tractor part to hold the slide member in a high position,
   and wherein said slide member while being held at the high position by the slide member holding par and said hook cooperate with each other to hold therebetween a cable drawn toward the barrier to move the towing device toward the barrier, and when the slide member is caused to undergo horizontal sliding movement through the fixed distance, the slide member moves in a vertical downward direction relative to the main tractor part to thereby release the cable and allow the hook to be turned in a direction to release the towing wire.

3. A vehicle crash test apparatus comprising:
   a road surface for a test vehicle to travel on;
   a barrier disposed at one end of the road surface;
   a towing device disposed below the road surface;
   a guide rail disposed below the road surface, for guiding the towing device to the barrier; and
   a braking device disposed below the road surface, for stopping the towing device, so that the test vehicle is pulled to the proximity of the barrier using the towing device, and when the test vehicle is disconnected from the towing device at a position a predetermined distance in front of the barrier to cause the test vehicle to collide with the barrier, the towing device is stopped with the braking device.

4. A vehicle crash test apparatus according to claim 3, wherein the towing device has a test vehicle connection hook, and the width of the hook is smaller than the width of the guide rail.

5. A vehicle crash test apparatus according to claim 3, wherein the road surface has a channel formed to receive at least the towing device, the guide rail and the braking device, and the upper opening of the channel is covered with a removable cover except for at least a part along which the hook moves.

6. A vehicle crash test apparatus comprising
   a road surface for a test vehicle to travel on;
   a barrier disposed at one end of the road surface;
   a towing device for pulling the test vehicle;
   a hook provided on the towing device so that it projects above the road surface, to connect the towing device and the test vehicle; and
   a hook projection clearing device for clearing the projecting state of the hook when the towing device has reached a position a predetermined distance in front of the barrier, so that the test vehicle is pulled to the proximity of the barrier using the towing device, and part-way through this pulling the test vehicle is disconnected from the towing device and so caused to collide with the barrier wherein a braking device is provided on the barrier side to stop the towing device and the braking device has the hook tipping member.

7. A vehicle crash test apparatus according to claim 6, wherein the hook projection clearing device is made up of the hook swingably attached to the towing device and a hook tipping member for tipping the hook to below the road surface when the towing device has reached a position a predetermined distance in front of the barrier.

8. A vehicle crash test apparatus comprising:
a road surface for a test vehicle to travel on;
a barrier disposed at one end of the road surface;
a cable for conveying the test vehicle toward the barrier;
a towing device connected to the cable for pulling the test vehicle to the proximity of the barrier and then causing the test vehicle to collide with the barrier; and
an auxiliary towing device connected to the cable and connectable by a wire to the rear of the test vehicle,
the auxiliary towing device comprising:
a wire engaging member having a wire catching part for catching the wire;
a wire connection releasing device for releasing the catching of the wire by the engaging member;
a cable connecting device connectable to the cable;
a cable connection releasing device for releasing the connection to the cable effected by the cable connecting device; and
a release action starting device for causing the wire connection releasing and cable connection releasing actions to be carried out in succession.

9. A vehicle crash test apparatus comprising:
a road surface for a test vehicle to travel on;
a barrier disposed at one end of the road surface;
a towing device which pulls the test vehicle to the proximity of the barrier and is disconnected from the test vehicle at a position a predetermined distance in front of the barrier; and
a braking device for stopping the towing device, the towing device having a wire connecting member for connecting to it a towing wire for connecting it to the test vehicle, and a holding member for detachably holding an engaging part provided on the wire connecting member,
the towing device and the braking device having a release mechanism for releasing the holding of the wire connecting member by the holding member.

10. A vehicle crash test apparatus according to claim 9, wherein the holding member comprises a claw-shaped member swingably attached to a base part of the towing device, and the claw-shaped member is engagable with the engaging part.

11. A vehicle crash test apparatus according to claim 10, wherein the release mechanism is constructed so that a swing limiting member for limiting the swing of the claw-shaped member is removably insertable into the swing range of the claw-shaped member.

12. A vehicle crash test apparatus according to claim 9, wherein the holding member is engagable with the engaging part by being removably insertable into the base part of the towing device and the engaging part.

13. A vehicle crash test apparatus according to claim 9, wherein the towing device comprises a cable connecting member for connecting it to a cable for conveying it from the test vehicle side to the barrier side, and a cable connection releasing mechanism for releasing the connection to the cable effected by the cable connecting member.

14. A vehicle crash test apparatus comprising:
a road surface for a test vehicle to travel on;
a barrier disposed at one end of the road surface;
a towing device which pulls the test vehicle to the proximity of the barrier and is disconnected from the test vehicle at a position a predetermined distance in front of the barrier; and
a braking device for stopping the towing device, the towing device comprising:
a swingable wire engaging member for engaging with one end of a towing wire for connecting it to the test vehicle; and
a slide member having an integral part for engaging and disengaging with respect to an engaging part formed on the wire engaging member so that by the slide member sliding rearward, its engagement with the engaging part is released, and the connection of the test vehicle and the towing device is released.

15. A vehicle crash test apparatus according to claim 14, wherein the towing device is disposed so that the top face of the wire engaging member is in a position below the road surface.

16. A vehicle crash test apparatus comprising
a road surface for a test vehicle to travel on;
a barrier disposed at one end of the road surface;
a towing device which pulls the test vehicle to the proximity of the barrier and is disconnected from the test vehicle at a position a predetermined distance in front of the barrier; and
a braking device for stopping the towing device,
the towing device having a wire connecting member for connecting it to a wire connected to the test vehicle for towing, a holding member for detachably holding the wire connecting member to the towing device, and a cable connecting member for connecting the towing device to a cable for conveying it from the test vehicle side to the barrier side,
the braking device having a release action starting member for causing both releasing of the holding of the wire connecting member by the holding member and releasing of the connection of the towing device to the cable effected by the cable connecting member.

17. A vehicle crash test apparatus comprising:
a road surface for a test vehicle to travel on;
a barrier disposed at one end of the road surface;
a towing device for pulling the test vehicle to the proximity of the barrier;
a guide rail for guiding the towing device movably with respect to the barrier;
a connection releasing member for disconnecting the test vehicle from the towing device at a position a predetermined distance in front of the barrier; and
a braking device for stopping the towing device,
the braking device and the connection releasing member being installed integrally, and the braking device and the connection releasing member being movably attached to the guide rail.

18. A vehicle crash test apparatus according to claim 17, wherein the towing device includes:
a cable connecting member for connecting the towing device to a cable for conveying it from the test vehicle side in the direction of the barrier side; and
a cable connection releasing mechanism for releasing the connection of the tractor means to the cable effected by the cable connecting member such that the connection releasing member provided on the braking device causes the cable connection releasing mechanism to operate, the cable connection releasing mechanism releases the connection of the towing device from the cable, and after the towing device has stopped, the braking device and the towing device are movable in an integral state.

19. A vehicle crash test apparatus according to claim 17, wherein the connection releasing member is provided in a cantilever style so as to project in a direction of the traction device from the braking device, and a weight for balancing the weight of the connection releasing member is provided on the barrier side of the braking device.

20. A vehicle crash test apparatus comprising:
a road surface for a test vehicle to travel on;
a barrier disposed at one end of the road surface;
a towing device for pulling the test vehicle to the proximity of the barrier and then causing the test vehicle to collide with the barrier; and
an auxiliary towing device, connectable by a wire to the rear of the test vehicle, for stabilizing the travel of the test vehicle by pulling it rearward by way of the wire, the auxiliary towing device comprising:
a wire engaging member having a wire catching part formed therein, the wire catching part having an open space opening to the rear for freeing the wire to the rear, the wire engagement member being pivotally movable toward the barrier;
a swing limiting member for limiting the swing of the wire engaging member; and
a limit removing mechanism for removing the limit imposed by the swing limiting member.

21. A vehicle crash test apparatus according to claim 20, wherein the swing limiting member is removably insertable into a range of pivotal movement of the wire engaging member.

22. A vehicle crash test apparatus according to claim 20, wherein the auxiliary towing device further comprises a cable connecting member for connecting the auxiliary towing device to a cable for conveying of the auxiliary towing device from the test vehicle side in a direction toward the barrier, and a cable connection releasing mechanism for releasing the connection to the cable effected by the cable connecting member.

23. A vehicle crash test apparatus according to claim 8, wherein the release action starting device comprises a slide member front-rear slidably attached to guide parts provided on both side faces of a base part of the auxiliary towing device, and has on the rear end of the slide member a release part for actuating the wire connection releasing mechanism and the cable connection releasing device.

24. A vehicle crash test apparatus according to claim 8, wherein after the release action starting device has operated, the auxiliary towing device is movable along a left-right pair of guide rails provided below the road surface.

* * * * *

UNITED STATES PATENT AND TRADEMARK OFFICE
CERTIFICATE OF CORRECTION

PATENT NO. : 6,997,036 B2
DATED : February 14, 2006
INVENTOR(S) : Kojima et al.

It is certified that error appears in the above-identified patent and that said Letters Patent is hereby corrected as shown below:

<u>Title page, Item [54] and Column 1, line 1,</u>
Title, delete "VEHICLE IMPACT TESTING DEVICE" and insert -- VEHICLE CRASH TEST APPARATUS --.

<u>Title page,</u>
Item [75], Inventors, should read:
-- Takashi Kojima, Sayama-shi, Saitama (JP);
  Makoto Iwazaki, Sayama-shi, Saitama (JP);
  Yasuo Odawara, Sayama-shi, Saitama (JP) --.
Item [56], References Cited, U.S. PATENT DOCUMENTS, delete
"6,604,771 B1" and insert -- 6,604,771 B2 --.

<u>Column 1,</u>
Lines 26, 28, 30, 35, 58, 59 and 67, delete "damper" and insert -- clamper --.

Signed and Sealed this

Ninth Day of May, 2006

JON W. DUDAS
*Director of the United States Patent and Trademark Office*